United States Patent [19]

Kamon

[11] Patent Number: 4,827,433

[45] Date of Patent: May 2, 1989

[54] PROCESSING DEVICE FOR CHANGING MAGNIFICATION OF IMAGE DATA

[75] Inventor: Kouichi Kamon, Tokyo, Japan

[73] Assignee: Ricoh Company, Ltd., Tokyo, Japan

[21] Appl. No.: 44,420

[22] Filed: Apr. 30, 1987

[30] Foreign Application Priority Data

| Apr. 30, 1986 | [JP] | Japan | 61-100503 |
|---|---|---|---|
| Apr. 30, 1986 | [JP] | Japan | 61-100504 |
| Apr. 30, 1986 | [JP] | Japan | 61-100505 |
| Apr. 30, 1986 | [JP] | Japan | 61-100506 |
| May 1, 1986 | [JP] | Japan | 61-101721 |
| May 7, 1986 | [JP] | Japan | 61-104014 |

[51] Int. Cl.$^4$ .................... G06F 15/68; H04N 1/00
[52] U.S. Cl. .................... 364/523; 364/518; 355/55; 358/296
[58] Field of Search ............ 364/518, 523; 355/55, 355/56; 358/293, 295, 296, 297, 298

[56] References Cited

U.S. PATENT DOCUMENTS

| 4,479,149 | 10/1984 | Yoshioka et al. | 358/294 |
|---|---|---|---|
| 4,651,170 | 3/1987 | Chandler et al. | 346/108 |
| 4,653,898 | 3/1987 | Goto et al. | 355/8 |
| 4,658,299 | 4/1987 | Tanaka et al. | 358/256 |
| 4,700,237 | 10/1987 | Yoshioka et al. | 358/287 |
| 4,707,745 | 11/1987 | Sakano | 358/283 |
| 4,739,415 | 4/1988 | Toyono et al. | 358/296 |
| 4,740,844 | 4/1988 | Yoshimura | 358/287 |
| 4,742,371 | 5/1988 | Furuta et al. | 355/4 |
| 4,760,458 | 7/1988 | Watanabe et al. | 358/256 |
| 4,763,134 | 8/1988 | Murahashi et al. | 346/1.1 |

Primary Examiner—Gary V. Harkcom
Assistant Examiner—Randy W. Lacasse
Attorney, Agent, or Firm—Oblon, Fisher, Spivak, McClelland & Maier

[57] ABSTRACT

A processing device for changing magnification of image data applicable to a digital copier, a facsimile transceiver and other image processing apparatuses changes a magnification electrically, i.e., produces magnification-changed image data by estimating data with a changed magnification from data which are read with a 1 magnification. Nearby ones of original image data are sampled at a predetermined pitch and in synchronism with a data clock DCLK on the basis of a magnification R, which is specified on a 1% basis, so that magnification-changed image data $O_{ij}$ are computed and outputted in synchronism with the data clock. This realizes real-time processing, i.e., produces magnification-changed image data timed to the reading of an original image. Computations for MTF compensation are performed in matching relation to magnifications Rx and Ry, which respectively are specified in the main scanning and subscanning directions, so as to suppress deterioration of an image due to the change of magnification. Moreover, the computation of magnification-charged image data and that of MTF compensation in the main scanning direction are executed in a pair, and so are done the computation of magnification-changed image data and that of MTF (modulation transfer function) compensation in the subscanning direction. This ensures optimum MTF compensation in both of the main scanning and subscanning directions even if the magnifications Rx and Ry are different from each other, allowing a minimum of degradation of image quality with regard to the whole image.

49 Claims, 37 Drawing Sheets

Fig. 4A

|   | Y |   |
|---|---|---|
| V | X | W |
|   | Z |   |

MAIN SCANNING X / SUBSCANNING Y
COEFFICIENTS

Fig. 4B

|   | $O_{i-1k}$ |   |
|---|---|---|
| $O_{ik-1}$ | $O_{ik}$ | $O_{ik+1}$ |
|   | $O_{i+1k}$ |   |

Fig. 5A

|   | −1 |   |
|---|---|---|
| −1 | 5 | −1 |
|   | −1 |   |

COEFFICIENTS FOR
$50 \leq R < 100$

Fig. 5B

|   | $-\frac{1}{2}$ |   |
|---|---|---|
| $-\frac{1}{2}$ | 3 | $-\frac{1}{2}$ |
|   | $-\frac{1}{2}$ |   |

COEFFICIENTS FOR
$100 \leq R < 200$

Fig. 5C

|   | $-\frac{1}{4}$ |   |
|---|---|---|
| $-\frac{1}{4}$ | 2 | $-\frac{1}{4}$ |
|   | $-\frac{1}{4}$ |   |

COEFFICIENTS FOR
$200 \leq R < 300$

Fig. 5D

|   | $-\frac{1}{8}$ |   |
|---|---|---|
| $-\frac{1}{8}$ | $\frac{3}{2}$ | $-\frac{1}{8}$ |
|   | $-\frac{1}{8}$ |   |

COEFFICIENTS FOR
$300 \leq R < 400$

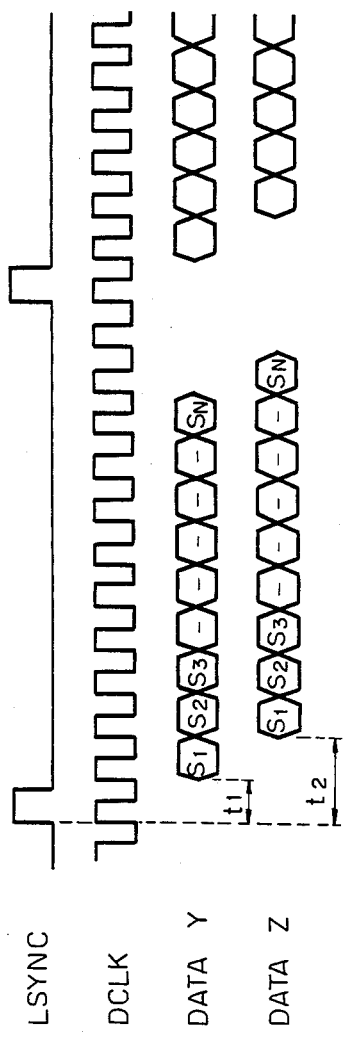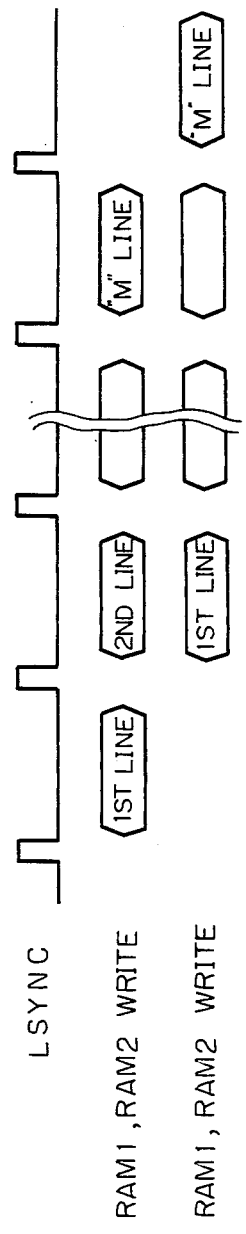

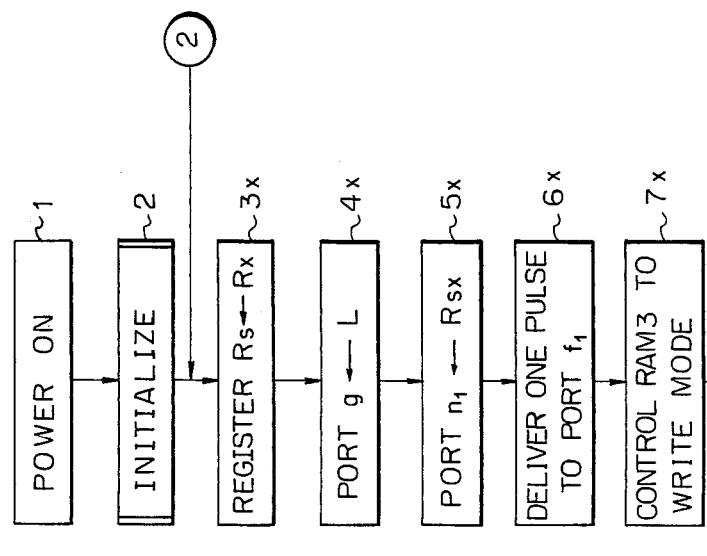

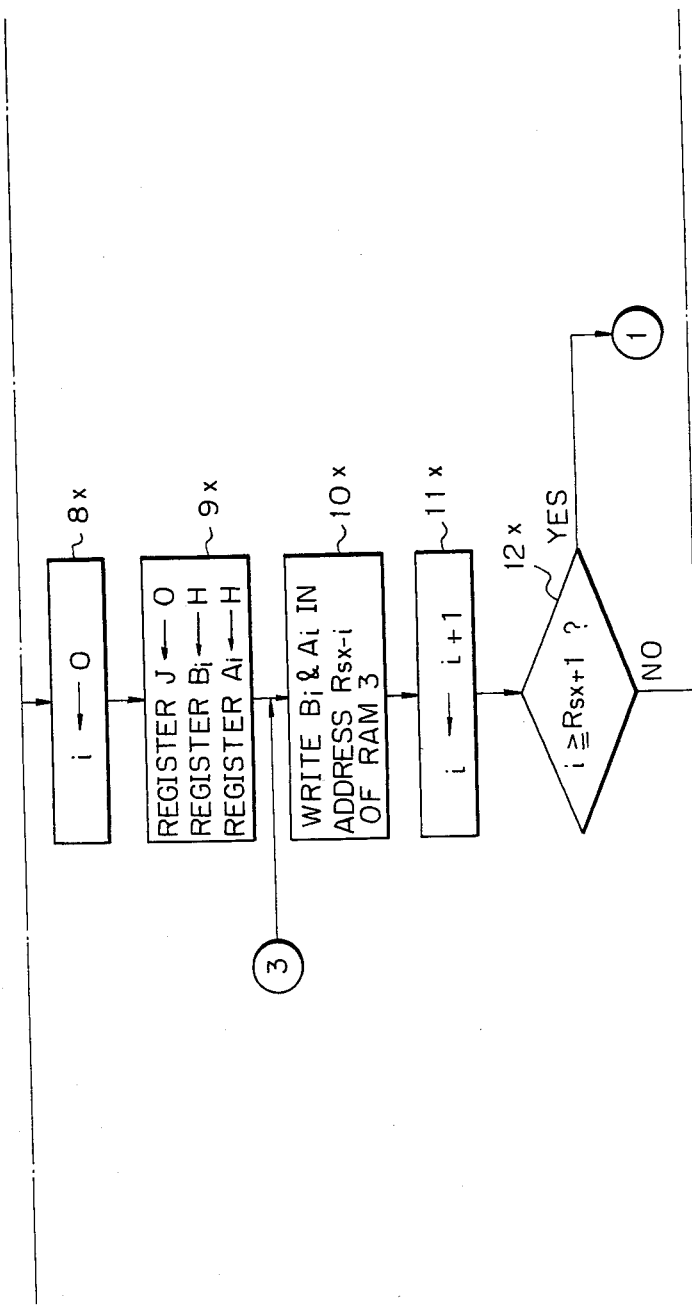

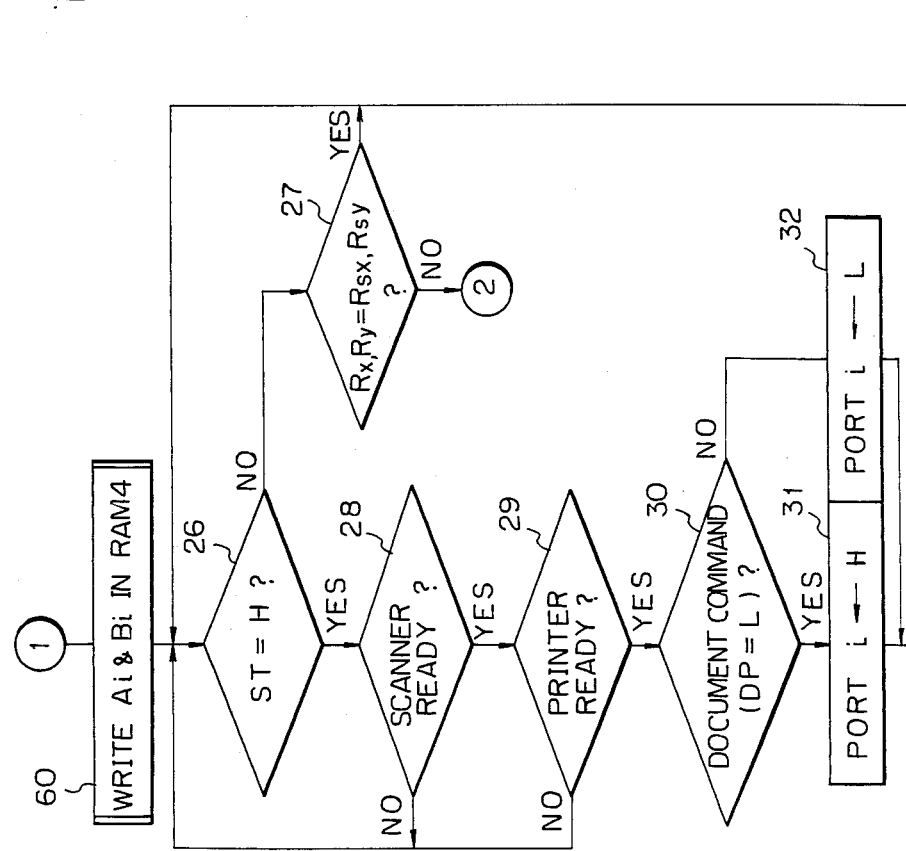

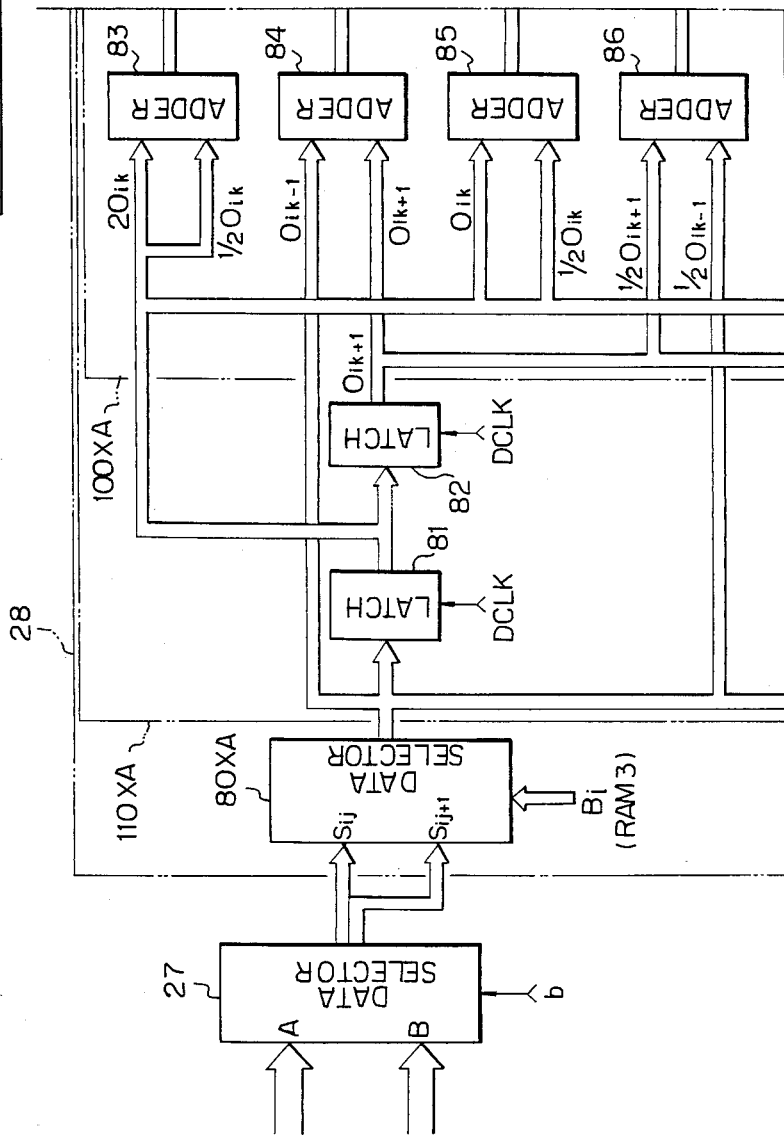

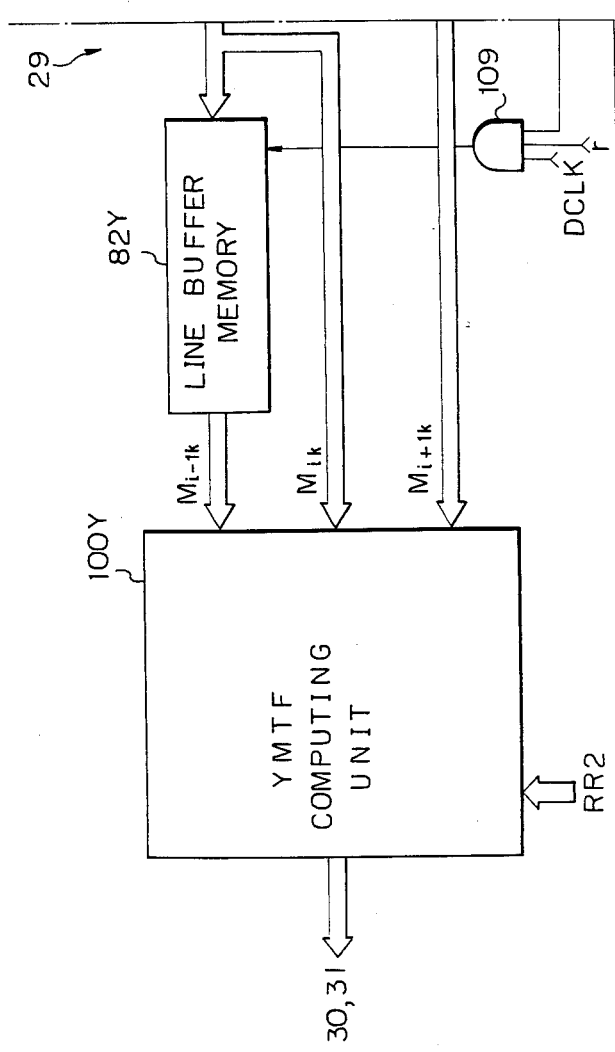

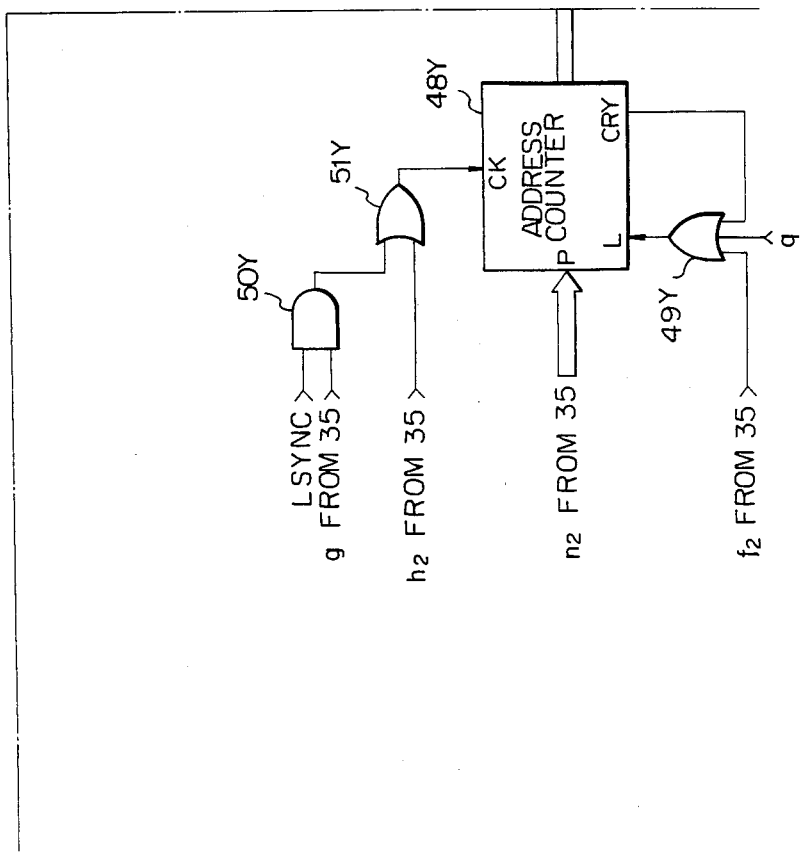
Fig. IIE-3

Fig. 13A-1
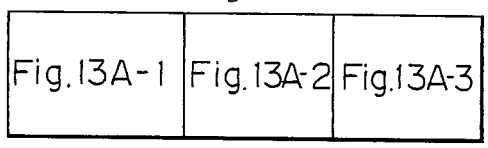
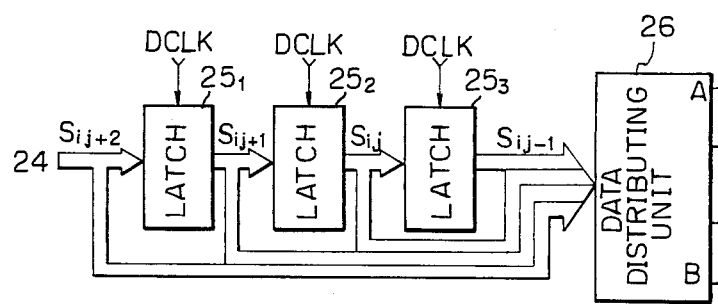
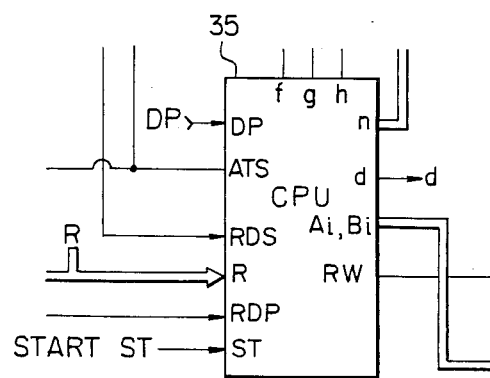

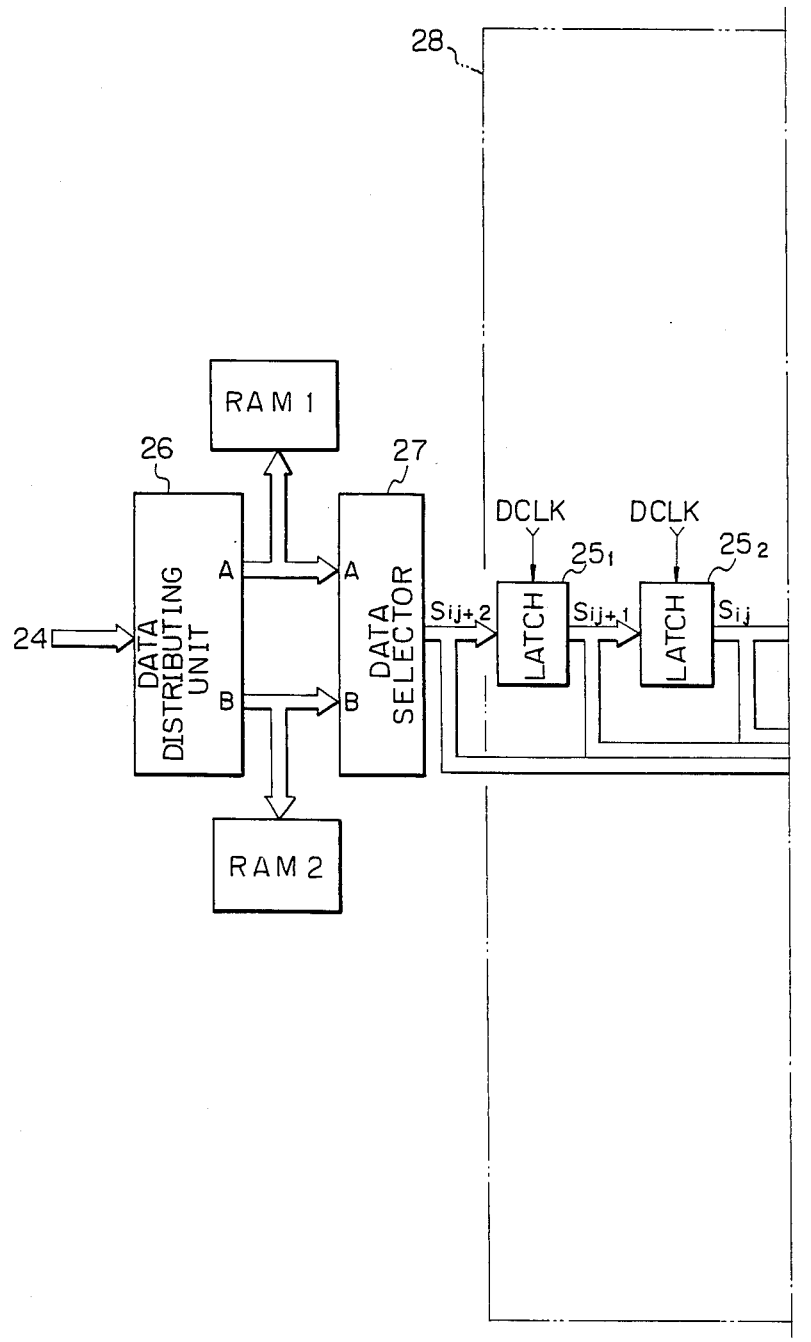

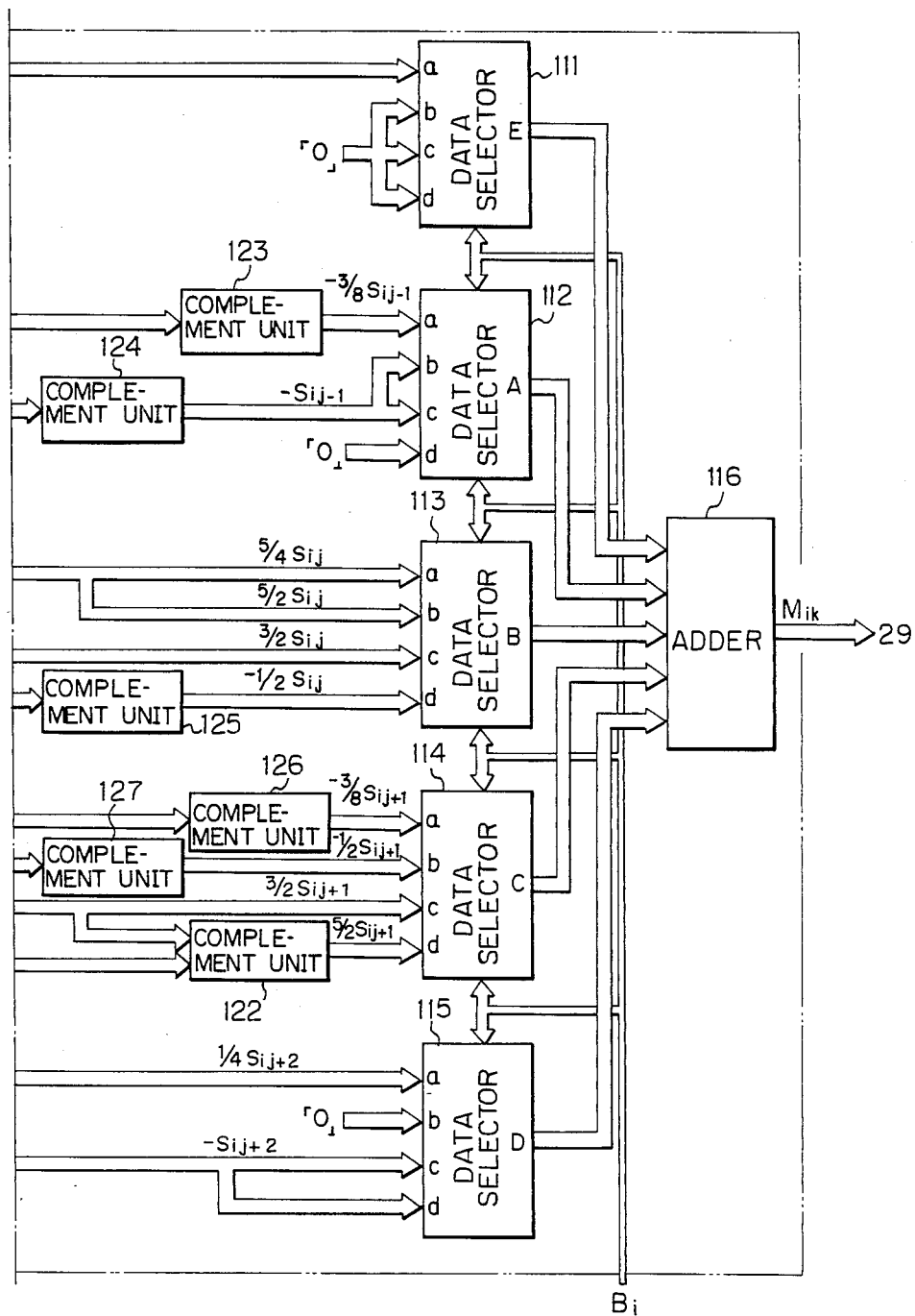

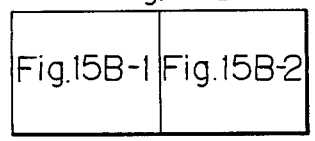
Fig.15B-1
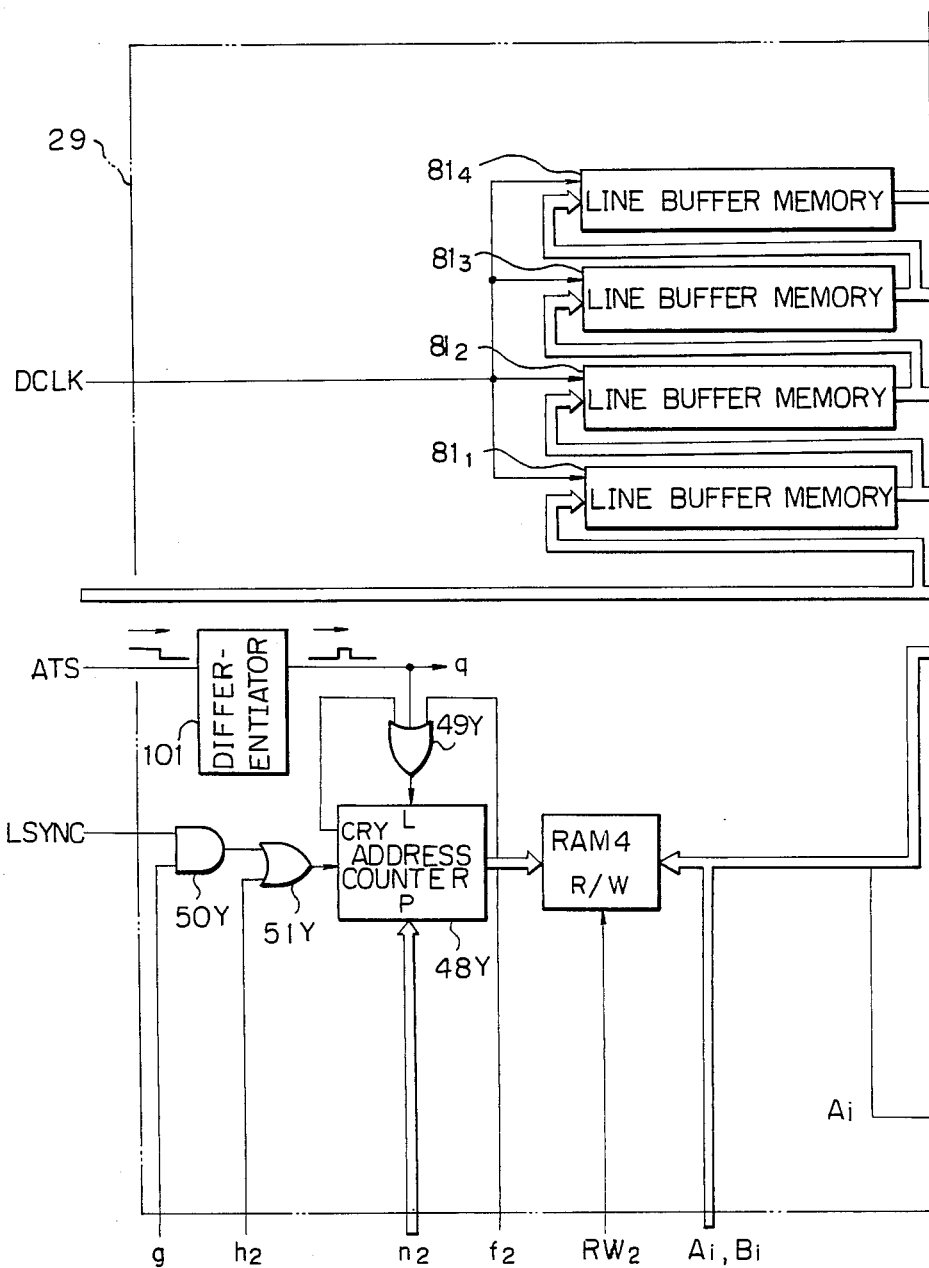

PROCESSING DEVICE FOR CHANGING MAGNIFICATION OF IMAGE DATA

BACKGROUND OF THE INVENTION

The present invention relates to a processing device for changing magnification of image data which is applicagle to a digital copier, a facsimile apparatus and other image processing apparatuses.

Referring to FIG. 1 of the drawings, a prior art image reader is shown which resembles in configuration an upper part of a copier. The image reader, generally 1, includes a glass platen 2 to be loaded with a document, and a presser plate 3 adapted to press the document against the glass platen 2. An operating board 4 is provided with several kinds of keys such as a read start button and a density selection key, and several kinds of displays for displaying conditions selected as well as operating conditions of the image reader 1. As an operator depresses the start button, the image reader 1 will begin to read a document on the glass platen 2 to produce an image signal.

FIGS. 2 and 3 show typical examples of the construction of the image reader 1, particularly its optical arrangement. Specifically, FIGS. 2 and 3 show, respectively, an optical arrangement of the type using a direct contact type image sensor and a one of the type using a reduction type image sensor. In another construction known in the art, a document is moved relative to a stationary optical system. In the arrangement shown in FIG. 2, the optical system serves as a 1-magnification optical system. While a luminescent lamp 5 illuminates a document which is laid on the glass platen 2, a reflection 8 from the document is incident to an image sensor 7 by way of a lens 6. The image sensor 7 has a width which is equal to or greater than that of a document (in a direction perpendicular to the sheet surface of FIG. 2, i.e., a main scanning direction X), so that it is capable of reading one line of image data at a time in the widthwise direction. With respect to one line, the sampling number and the sampling pitch Px are determined by the number of pixels of the image sensor 7. On reading one line of data, a carriage 9 on which the lamp 5, lens 6 and image sensor 7 are mounted is driven in a direction indicated by an arrow (subscanning direction Y) so as to read the next line. Alternatively, the carriage 9 may be continuously driven in the subscanning direction Y, as also known in the art. While the interline pitch Py is dependent on the velocity of the carriage 9, the charge storage time of the sensor 7 and other factors, it is usually the same as the sampling pitch Px mentioned above.

In the arrangement shown in FIG. 3, a lens 14 reduces the width of an optical image which is representative of a document to match it to the size of the image sensor 7. The optical system of FIG. 3 is shown to use three mirrors, but two or five mirrors may be used as desired. As regards the readout in the main scanning direction X, the system of FIG. 3 is operated with the same principle as that of FIG. 2. As for the readout in the subscanning direction Y, a first carriage on which the lamp 5 and a first mirror 11 are mounted and a second carriage on which mirrors 12 and 13 are mounted are driven independently of each other such that the optical path from a document on the glass platen 2 to a lens 14 remains constant in length.

In a prior art variable-magnification system, a reduction ratio is varied in the main scanning direction X by varying the length of the optical path of an optical system and, in the subscanning direction Y, by varying the velocity of a movable body. Such an implementation, however, cannot be adopted when it comes to the system of FIG. 2 which uses a direct contact type image sensor. Even the system of FIG. 3 has a problem that the range of magnifications available is limited for structural reasons, e.g., the magnification cannot be noticeably changed despite substantial shifts of the lens 14 and sensor 7. Another problem with the FIG. 3 system is that the lens 14 and sensor 7 have to be moved and positioned by extremely accurate mechanisms in order to eliminate deformation of images read out.

In the light of the above, the current trend in the imaging art is toward the use of electrical variable magnification in place of the above-described optical variable magnification. The electrical variable magnification principle is such that data with a changed magnification are estimated based on a 1-magnification data read out, thereby producing image data for a particular magnification selected. However, the electrical variable magnification scheme currently proposed cannot fully meet the demand for accurate change of magnification and, if elaborated to accomplish accurate magnification changes, it would require complicated hardware and fail to readily implement so-called zoom type variable magnification which is effected on a 1% basis, and a wide range of magnifications.

The problems discussed above may be reduced by adopting the following sequence of steps: counting a data clock DCLK, which is representative of pixel unit divisions of original image data, to use each count as a position i of image data of a particular magnification, computing an integer $J_i$ and a decimal $R_i$ of an equation $100i/[\text{specified magnification } R(\%)] = J_i + R_i$ every time one pulse of the data clock DCLK is produced, i.e., every time the number i is increased, sampling image data at a position $x = J_i$ of the original image data and image data next thereto, computing image data of a particular magnification by using the sampled original image data and the decimal $R_i$, and determining the resultant data as image data of a particular magnification which is located at the "i" position in terms of the data clock DCLK. Such a procedure allows image data of a particular magnification to be produced in synchronism with the data clock DCLK associated with original image data, whereby the image data of a particular magnification can be printed, transferred, transmitted or otherwise processed by raster scanning which is synchronous to the readout or the transfer of the original image data. Moreover, the magnification R can be selected on a 1% basis and over a wide range.

As described above the sampling position $x = J_i$ of original image data and the deviation $R_i$ between the position i of image data of a particular magnification and the position x are computer every time a pulse of the data clock DCLK appears, i.e., every time the original image data is shifted by one pixel. This brings about a problem that should the number of figures of the deviation $R_i$ be substantial, the computing time would limit the frequency of the data clock DCLK available. Specifically, one period of the data clock DCLK should be sufficiently longer than the sum of the computing time mentioned above and a time necessary for image data of a particular magnification to be produced based on the sampled original image data and deviation $R_i$. Since the period of the data clock DCLK is dependent on the image reading speed, an increase in the period of the data clock DCLK would slow down the image reading operation as well as image data recording, transfer, transmission and other speeds. In addition, the substantial number of figures of the deviation Ri translates into a substantial number of signal bits which are needed for Ri processing, resulting in complicated signal lines and complicated hardware for computations.

Generally, when an image is read by a scanner, the spatial frequency characteristic of an image which is represented by the data read is changed to deteriorate the image. A countermeasure heretofore adopted against such an occurrence is applying MTF (Modulation Transfer Function) compensation to image data at a predetermined stage of operation. This kind of compensation is such that a coefficient pattern (filter) is set up such as shown in FIG. 4A and, for example, pixel data Oik observed (here, data representative of density) as shown in FIG. 4B is corrected to become data Milk which is equal to $Y.O_{i-1k} + V.O_{ik-1} + W.O_{ik+1} + Z.O_{i+1k} + X.O_{ik}$. The compensation coefficients V to Z (filter coefficients) may be exemplified by those shown in FIG. 5B. Since those compensation coefficients have optimum values which correspond to the spatial frequency characteristic (sampling density) of original image data, values corresponding to the original image sampling density of a scanner are selected. Hence, for a new sampling frequency at the time of a change of magnification (sampling density of magnification-changed image data corresponding to original image), the compensation coefficients have to be changed due to the change in adequate MTF compensation characteristic. Especially, it is difficult to directly apply the compensation coefficients adapted for a 1 magnification (FIG. 5B) to a wide range of magnifications from 50% to 400%.

Should the MTF compensation be effected with a reduced or enlarged magnification and with the same compensation coefficients neglecting the above requisite, the edges of an image would be excessively accentuated by the MTF compensation during enlargement, resulting in oscillation (stripe pattern) of the image.

To eliminate the above occurrence, different compensation coefficients may be used for individual magnifications, as shown in FIGS. 5A to 5D by way of example. However, such a scheme cannot be implemented without assigning different hardware or computing programs to the magnification-changed image data computation which relies on interpolation, and the MTF compensation.

Further, when the magnification is to be changed by one ratio in the main scanning direction and by another ratio in the subscanning direction, a single kind of MTF compensation cannot provide adequate MTF-compensated values because the optimum MTF compensation coefficients depend on the direction.

SUMMARY OF THE INVENTION

It is an object of the present invention to provide a processing device capable of changing magnification of image data with relatively high accuracy, with relatively minute ratios, and over a relatively wide range of ratios and, yet, performing magnification change processing on a real-time basis.

It is another object of the present invention to provide a processing device capable of changing magnification of image data on a real-time basis with relatively high accuracy, with relatively minute ratios, and over a relatively wide range of ratios and, yet, allowing the frequency of a data clock to be increased as desired.

It is another object of the present invention to provide a processing device capable of changing magnification of image data on a real-time basis with relatively high accuracy, with relatively minute ratios, and over a relatively wide range of ratios and, yet, simplifying computations of image data to thereby simplify hardware required for the computations and enhance rapid computations.

In is another object of the present invention to provide a processing device capable of changing magnification of image data on a real-time basis with relatively high accuracy, with relatively minute ratios, and over a relatively wide range of ratios and, yet, matching MTF compensation to any magnification.

It is another object of the present invention to provide a processing device capable of changing magnification of image data with relatively high accuracy, with relatively minute ratios, and over a relatively wide range of ratios, and matching MTF compensation to any magnification, and effecting adequate MTF compensation even if the magnification differs from the main scanning direction to the subscanning direction.

It is another object of the present invention to provide a processing device capable of changing magnification of image data with relatively high accuracy, with relatively minute ratios, and over a relatively wide range of ratios, and matching MTF compensation to any magnification, and reducing the number of means which are necessary for magnification computations and MTF compensation computations.

It is another object of the present invention to provide a generally improved processing device for changing magnification of image data.

The basic concept of variable magnification in accordance with the present invention will be described first.

Assuming the number of pixels in the main scanning direction X is N and that in the subscanning direction Y is M, the image data obtained with the image reader as shown in any of FIGS. 2 and 3 (hereinafter referred to as original image data) are distributed as represented by FIG. 6 in correspondence to an original image. When the magnification of the original image data of FIG. 6 is changed by R % in the main scanning direction, [N×R/100] new data (hereinafter referred to as magnification-changed image data) are produced.

As regards magnification changing algorithm, three typical methods are available as will be described. The electrical variable magnification principle is assumed to be applied to the main scanning direction only.

To begin with, any of the three methods requires that the position of a new sampling point O after the change of magnification be recognized to determine original image data at the old sampling points of several pixels which neighbor the new sampling point, and distances therebetween. As shown in FIG. 7, assume that the new sampling point O is located between original image data Sij and Sji+1 and at distance of, respectively, $r_1$ and $r_2$, and that the sampling pitch of original image data is P.

[A] Nearest Pixel Substitution

This method is to select original image data nearest in position to the point O as magnification-changed image data at the point O; in FIG. 7, if $r_1 \leq r_2$, then Oik=Sij and, if $r_1 > r_2$, then Oik=Sij+1. The image data at the sample point of the original image which is nearest to the sampling point O of the magnification-changed image data is determined to be the magnification-changed image data Oik at the point O. Here, Oik is the data representative of density.

[B] Nearby Pixels Distance Linear Distribution

This method is to distribute a density level on the basis of the distances between the point O and pixels adjacent thereto. In FIG. 7, the magnigication-changed image data Oik is produced by $$Oik = (1 - r_1/P)Sij + (1 - r_2/P)Sij_{+1} \quad \text{Eq. (1)}.$$

[C] Cubic Function Convolution

This method is to effect interpolation using an interpolating function $h(\gamma)$ which is shown in FIG. 3. The interpolation function $h(\gamma)$ is approximated relative to $\gamma$ which is standardized by the sampling pitch P, as follows:

$$h(\gamma) = \begin{cases} 1 - 2|\gamma|^2 + |\gamma|^3 & 0 \leq |\gamma| \leq 1 \\ 4 - 8|\gamma|^2 + 5|\gamma|^2 - |\gamma|^3 & 1 \leq |\gamma| \leq 2 \\ 0 & 2 \leq |\gamma| \end{cases} \quad \text{Eq. (2)}$$

Using $h(\gamma)$, the magnification-changed image data Oij is produced as $$Oik = [h(1 + r_1/P)Sij_{-1} + h(r_1/P)Sij + h(r_2/P)Sij_{+1} + h(1 + r_2/P)Sij_{+2}]/[h(1 + r_1/P) + h(r_1/P) + h(r_2/P) + h(1 + r_2/P)] \quad \text{Eq. (3)}$$

Besides the three methods [A], [B] and [C] explained above, various other methods such as nearby pixel distance inversely proportional method and a nearby pixel area distribution method are available. However, since such methods are rather analogous to the method [B], let the methods [A], [B] and [C] be the representatives.

All of the methods stated above have known for long and practiced in a computer image processing art. While such methods are readily applicable to computer image processing and others wherein image area are once stored in a page memory or like mass storage and, then, processed for a magnification change, implementing such processing with an exclusive hardware and without a page memory is impracticable without encountering various limitations. In a digital copier, a facsimile apparatus and others, when magnification is changed in the event of reading, data entered by raster scanning (on a line basis) have to be processed by raster scanning (on a line basis) even after magnification change processing. Further, the data clock (pixel synchronizing pulse) has to be maintained constant with no regard to magnification. That is, data undergone the magnification change have to be identical in format and speed with those which underwent an optical magnification change, meaning that real-time processing is needed.

The situation is different, however, when the change of magnification is considered in relation to an entire digital copier system or an entire facsimile system. For example, if the printing rate of a printer can be changed in the event of a change of magnification, a data clock after the magnification change can be changed also. In addition, in a system having a transmission capability, it is not always necessary that the data be comprised of raster scanned data after a magnification change. However, so long as magnification changes are considered in relation to an image reader or with the variable magnification processing separated from the others, the previously mentioned limitations concerning raster scan processing are unavoidable. Embodiments which will be described later are applicable to an image reader on which such limitations are imposed.

FIGS. 9 and 10 are timing charts representative of exemplary data before and after a change of magnification, the data satisfying the above-discussed limitations. In the figures, LSYNC denotes a horizontal synchronizing signal (line synchronizing pulses or subscanning synchronizing pulses) during one period of which one line of image data are read in the main scanning direction. DCLK denotes a data clock (pixel synchronizing pulses). Assume that data before a magnification change (pixel basis) Y, i.e., data $Si_o$ to $Si_N$ are sequentially applied to a variable magnification processing section within one period of the signal LSYNC and time to the data clock DCLK, as shown in FIG. 9. As a result, data Z undergone magnification change processing are produced. In this instance, although the data Z may be delayed relative to the data Y, they need be synchronous to the signal DCLK. Also, while no particular limitation is imposed on the delay time $(t_2 - t_1)$, it has to be prevented from changing from line to line, and in addition, the times $t_2$ and $t_1$ have to be constant. Further, as regards data input and output on a line basis, data read out of line buffer memories RAM1 and RAM2 may be delayed relative to data which are written in the same.

In any case, what is most important and most difficult to achieve is that magnification-change image data be maintained synchronous to the signal DCLK with to regard to magnification.

Such a requirement may be met relatively easily if only several fixed magnifications are used. However, in a modern copying system and others, there is an increasing demand for a wider range of magnifications and so-called zoom type variable magnification, i.e., fractional changes of magnification on the order of 1%. Even a digital copier or a facsimile apparatus, therefore, has to be provided with some implementation for satisfying the above requirement. In such a situation, it is difficult to meet the previously stated demand in relation to actual application of the magnification changing methods mentioned earlier.

In accordance with the present invention, there is provided a processing device for changing magnification of image data, comprising computing means for computing an integer Ji and a decimal Ri of an equation 100i/[specified magnification R (%)]=Ji+Ri, where i is an integer, $0 \leq Ri < 1$, and Ji is an integer; sampling position designating means for changing i by 1 at a time in synchronism with a data clock which determines a pixel unit of original image data, under a condition of R<100, incrementing a designated position x for sampling original image data by 2 when an equation $Ji - Ji_{-1} = 2$ is reached and incrementing the position x by 1 when an equation $Ji - Ji_{-1} = 1$ is reached, and, under a condition of $R \leq 100$, incrementing the position x by 1 when an equation $Ji - Ji_{-1} = 1$ is reached and maintaining an existing value of the position x when an equation $Ji - Ji_{-1} = 0$ is reached; sampling means for counting the data clock to sample original image data located at the position x and at least one original data which neighbors that original image data; and magnification-changed image data setting means for determining magnification-changed image data at a position i based on a correlationship between Ri, original image data at the position x, and at least one original image data which neighbors that original image data, in synchronism with the data clock.

In the above construction, the computing means and the sampling position designating means specify the sampling position x. The sampling means samples original image data which are located at the position x and the position next thereto. The magnification-changed image data setting means determines magnification-changed image data with a predetermined logic, e.g., any of the approaches [A] to [C] previously stated. All of the sampling position designating means, sampling means, and magnification-changed image data setting means are operated in synchronism with the data clock DCLK, so that magnification-changed data are synchronous to the data clock DCLK. This allows those data to be produced on a real-time basis and, therefore, the data can be processed by raster scanning.

The computing means may be constructed to increment i by 1 every time one pulse of the data clock DCLK appears so as to computer Ji and Ri or, alternatively, to computer Ji and Ri with respect to each of $i=0$ to $R-1$ before actual image reading, store them in a memory, sequentially change i by 1 at a time, and read out Ji and Ri which are associated with those numbers. In any case, Ji and Ri are sequentially specified time to the data clock DCLK.

As previously stated, the computing means computes the largest integer Ji in a form of an integer i and a decimal Ji of the equation 100i/[specified magnification $R(\%)]=J_i+R_i$ and, based on this Ji and the previous interger $J_{i-1}$, the sampling position designating means determines a sampling position x (i.e., Ji) of original image data. Hence, any number of magnifications R (%) can be set over a wide range on a 1% basis. Stated another way, 1% basis, zoom type variable magnification is accomplished over a considerably wide range. In some embodiments of the present invention which will be described, the minimum unit of magnification change is assumed to be 1%, and the magnification is assumed to be variable over a range of 50% to 400%.

In accordance with the present invention, there is provided another processing device for changing magnification of image data, comprising storing means for storing one line of original image data; means for controlling the storing means to a write mode and a read mode alternately; address counting means for applying a write/read position X to the storing means; computing means for computing an integer Ji and a decimal Ri of an equation 100i/[specified magnification R $(\%)]=J_i+R_i$, where i is an integer, $0 \leq R_i < 1$, and Ji is an integer; sampling position designating means for, while the storing means is in a write mode, applying a data clock DCLK which determines a pixel unit of original image data to the address counting means as count pulses and, while the storing means is in a read mode, changing i by 1 at a time in synchronism with the data clock DCLK, under a condition of R<100, feeding count pulses 2DCLK having a twice higher frequency than the data clock DCLK to the address counting means as count pulses when an equation $J_i-J_{i-1}=2$ is reached and feeding the data clock DCLK to the address counting means when an equation $J_i-J_{i-1}=1$ is reached, and, under a condition of R≧100, feeding the data clock DCLK to the address counting means when the equation $J_i-J_{i-1}=1$ is reached and interrupting count pulses to the address counting means when an equation $J_i-J_i=0$ is reached, thereby designating the read position x of original image data; and magnification-changed image data setting means for determining magnification-changed image data at a position i based on a correlationship between Ri, original image data at a designated position x which is read out of the storing means, and at least one original image data which neighbors that original image data, in synchronism with the data clock DCLK.

Specifically, in this processing device, magnification-changed image data are produced by storing one line of original image data in a buffer memory and by controlling the read address of the buffer memory to read and sample the original data. In a reduce mode, the amount of change of the image data read address, i.e., the pitch of original image data readout corresponding to a magnification is determined by selectively feeding the data clock and the clock 2DCLK to an address counter which is associated with the buffer memory.

In accordance with the present invention, there is provided another processing device for changing magnification of image data, comprising storing means for storing one line of original image data; means for controlling the storing means to a write mode and a read mode alternaely; address counting means; adding means for applying a sum of count data produced by the address counting means and count data produced by the up-down counting means to the storing means as address data; computing means for computing an integer Ji and a decimal Ri of an equation 100i/[specified magnification $(\%)]=J_i+R_i$, where i is an integer, $0 \leq R_i < 1$, and Ji is an integer; sampling position designating means for, while the storing means is in a write mode, feeding a data clock DCLK which determines a pixel unit of original image data to the address counting means as count pulses and, while the storing means is in a read mode, changing i by 1 at a time in synchronism with the data clock DCLK, under a condition of R<100, delivering an up-count command to the up-down counting means and delivering the data clock DCLK to the address counting means as count pulses, and, under a condition of R≦100, delivering a down-count command to the up-down counting means and delivering the data clock DCLK to the address counting means, not applying the data clock DCLK to the up-down counting means when an equation $J_i-J_{i-1}-1$ is reached, and applying the data DCLK to the up-down counting means as well when an equation $J_i-J_{i-1}=0$ is reached, thereby designating the read position x of original image data; and magnification-changed image data setting means for determining magnification-changed image data at a position i based on a correlationship between Ri, original image data at a designate position x read out of the storing means, and at least one original image data which neighbors that original image data, in synchronism with the data clock DCLK.

In short, a processing device with the above construction up-counts or down-counts the data clock DCLK depending on a magnification, thereby determining the read position x.

In accordance with the present invention, there is provided another processing device for changing magnification of image data, comprising computing means for computing, based on a specified magnification R(%), original image data sampling position information each corresponding to a respective one of magnification-changed image data sampling position i, and deviation information representative of a deviation between the original image data sampling position and the magnification-changed data sampling position; magnification change processing information storing means for storing the original image data sampling position information and deviation information in correspondence with the data sampling positions i; reading means for changing i by 1 at a time in synchronism with a data clock associated with original image data and reading the original image data sampling position information and deviation information out of the magnification change processing information storing means in correspondence to sampling means for counting the data clock DCLK to sample original image data, which is specified by the original image data sampling information read out, and at last one original image data which neighbors the original image data; and magnification-changed image data setting means for determining magnification-changed image data at the position i based on a correlationship between the original image data sampled and the deviation information read out, in synchronism with the data clock DCLK.

In the above construction, the computing means sets up in the magnificaation change processing information storing means original image data sampling position information and deviation information corresponding to a magnification R (%); the reading means reads them out in synchronism with the data clock; the sampling means samples the original image data timed to the data clock DCLK and based on the original image data sampling position information read out; and the magnification-changed image data setting means produces magnification-changed image data timed to the data clock DCLK and based on the deviation information read out as well as on the original image data sampled, by using a predetermined logic such as any of the approaches [A] to [C].

All of the reading means, sampling means, and magnification-changed image data setting means are operated in synchronism with the data clock DCLK, so that the magnification-changed image data are synchronous to the data clock DCLK, meaning such data are produced by real-time processing. The resultant data can be processed by raster scanning. When original image data are transferred timed to the data clock DCLK, i.e., when an image is read, the original image data sampling position information and the deviation information which are written in the storing means beforehand are read out in synchronism with the data clock DCLK. This saves a period of time otherwise consumed by the computation of such information and correspondingly shortens the period of the data clock DCLK required. Hence, the image reading speed and/or transfer speed and the magnification-changed image data transfer speed associated therewith can be increased to enhance high-speed image processing.

In the above processing device, the computing means computes an integer Ji and a decimal Ri of an equation 100i/[specified magnification R (%)]=Ji+Ri, where i is an integer of 0 to R−1, 0≦Ri<1, and Ji is an integer, to hold a value $Ji_{-1}$ of an instant when is is smaller by 1, to compute as original image data sampling position information data Ai which is representative of an amount of change of the sampling position of original image data that corresponds to a value of R and that of Ji−$Ji_{-1}$, and to compute as deviation information data Bi which is representative of a particular one of a plurality of subdivisions between 0 and 1.

Such computing means allows any desired number of magnifications to be adopted over a desired range, the minimum unit being 1. This realizes 1% basis zoom type variable magnification over a wide range.

The original image data sampling information written in the storing means are the data Ai which are representative of a deviation between the previous sampling position $Ji_{-1}$ and the current sampling position Ji, i.e., a pitch (numbers of pixels) between two sampling positions. All that is required is sampling original image data at a particular pitch which is represented by the data Ai, eliminating the need for determining the sampling positions as counted from the beginning of a line. Further, since the deviation information written in the storing means are the data Bi each indicating a particular narrow division, computations which use very small numerical values are needless. Such simplifies hardware for computations while increasing the data computing rate.

In this processing device, to accommodate the data Ai and Bi, the sampling means comprises buffer memory means for storing one line of original image data; means for controlling the buffer memory means to a write mode and a read mode alternately; address counting means for applying a write/read address to the buffer memory means; and sampling means for, while the buffer memory means is in a write mode, delivering the data clock DCLK to the address counting means as count pulses and, while the buffer memory means is in a read mode, changing i by 1 at a time in synchronism with the data clock DCLK, under a condition of R<100, delivering to the address counting means one of the data clock DCLK and count pulses 2DCLK which have a twice higher frequency than the data clock DCLK, in correspondence to the data Ai, and, under a condition of R≧100, setting up or interrupting the delivery of the data clock DCLK to the address counting means in response to the data Ai, thereby designating the read position x of original image data.

As stated above, in this processing device, magnification-changed image data are produced by storing one line of original image data in a buffer memory and by controlling the read address of the buffer memory to sample the original image data read thereoutof. In a reduce mode, the amount of change of the image data read address, i.e., the original image reading pitch corresponding to a magnification is determined by selectively feeding the data clock and the clock 2DCLK to an address counter which is associated with the buffer memory.

Further, in this processing device, the sampling means comprises buffer memory means for storing one line of original image data; means for controling the buffer memory means to a write mode and a read mode alternately; address counting means; up-down counting means; adding means for applying a sum of count data produced by the address counting means and count data produced by the up-down counting means to the buffer memory means as address data; and sampling position designating means for, while the buffer memory is in a write mode, delivering the data clock DCLK to the address counting means as count pulses and, while the buffer memory means is in a read mode, changing i by 1 at a time in synchronism with the data clock DCLK, under a condition of R<100, delivering an up-count command to the up-down counting means, delivering the data clock DCLK to the address counting means as count pulses, and setting up or interrupting the delivery of the data clock DCLK to the up-down counting means in response to the data Ai, and, under a condition of $R \geq 100$, delivering a down-count command to the up-down counting means, delivering the data clock DCLK to the address counting means, and setting up or interrupting the delivery of the data clock DCLK to the up-down counting means in response to the data Ai, thereby designating the read position x of original image data.

Specifically, the sampling means stated above includes a line buffer memory as the previously stated one does, but the read address is set up by an address counter, an up-down counter, and an adder which applies a sum of count data of the address counter and that of the up-down counter to the line buffer memory as address data. The sampling position designating means, while the buffer memory is in a write mode, delivers the data clock DCLK to the address counter as count pulses and, while the buffer memory is in a read mode, under a condition of $R<100$, delivers an up-count command to the up-down counter and delivers the data clock DCLK to the address counter as count pulses, and does not feed count pulses to the up-down counter when the data Ai is representative of $Ji-Ji_{-1}=1$, and, under a condition of $R \geq 100$, delivers a down-count command to the up-down counter and delivers the data clock DCLK to the address counter, and does not deliver the data clock DCLK to the up-down counter when the data Ai is representative of $Ji-Ji_{-1}=1$ while delivering the data clock DCLK to the up-down counter as well when it is representative of $Ji-Ji_{-1}=0$, thereby designating a original image data reading position. That is, the data clock DCLK is counted up or down depending on the magnification to thereby determine the read position x of the line buffer memory.

In accordance with the present invention, there is provided another processing device for changing magnification of image data, comprising computing means for computing an integer Ji and a decimal Ri of an equation 100i/[specified magnification $R(\%)]=Ji+Ri$, where i is an integer, $0 \leq Ri<1$, and Ji is an integer, and computing data Bi which is representative of the decimal in terms of a division a denominator of which is a 2's power; sampling position designating means for changing i by 1 at a time in synchronism with a data clock which determines a pixel unit of original image data, under a condition of $R<100$, incrementing a designated position x for sampling original image data by 2 when an equation $Ji-Ji_{-1}=2$ is reached and incrementing the position x by 1 when an equation $Ji-Ji_{-1}=1$ is reached and, under a condition of $R \geq 100$, incrementing the position x by 1 when the equation $Ji-Ji_{-1}=1$ is reached, and holding an existing value of the position x when an equation $Ji-Ji_{-1}=0$ is reached; sampling means for counting the data clock to sample original image data at the position x and at least one original image data which neighbors that original image data; and magnification-changed image data setting means for extracting those bits of the original image data at the position x and neighboring data which correspond to the data Bi, and determining magnification-changed image data at a position i based on those extracted bits.

In the above contruction, the computing means and the sampling position designating means designate the original image data sampling position x at a pitch which corresponds to the magnification $R(\%)$; the sampling means samples original image data at the position x and the next position; the magnification-changed image data setting means sets up magnification-changed image data by using a predetermined logic such as any one of the approaches [A] and [B]. All of the sampling position designating means, sampling means, and magnification-changed data setting means are operated in synchronism with the data clock DCLK, so that magnification-changed image data are synchronous to the data clock DCLK, meaning that such image data are produced by real-time processing. Magnification-changed image data, therefore, can be processed by raster scanning.

Further, since the decimal Ri is computed as the data Bi in terms of a division the denominator of which is 2's power and, based on this data Bi, the bits of original image data are extracted. Data extracted in this manner automatically serve as numerical values for the computation of magnification-changed image data, i.e., products of original image data and decimals each corresponding to Ri, which may be the first and second terms of the right member of the Eq. (1) or the terms of the right member of the Eq. (3). All that is required is, therefore, adding numerical values which are represented by those data bits, eliminating the need for divisions and multiplications. This cuts down the number of bits necessary for computation while speeding up the computation, resulting in simple hardware and rapid computation.

The computing means may compute Ji and Ri by incrementing i by 1 every time one pulse of data clock DCLK appears. Alternatively it compute them by computing Ji and R with respect to each of $i=0$ to $R-1$ before actual image reading, storing such data in a memory, sequentially incrementing i in synchronism with the data clock DCLK, and reading Ji and Ri which correspond to those numbers. In any case, Ji and Ri are sequentially specified in synchronism with the data clock DCLK.

As stated above, the largest integer Ji is computed by the computing means in a form of integer Ji and decimal Ri of the equation 100i/[specified magnification $R(\%)]=Ji+Ri$, and the sampling position x (i.e., Ji) is specified by the sampling position designating means based on the above-mentioned Ji and the previous integer $Ji_{-1}$. Hence, any desired number of magnifications $R(\%)$ can be provided over a wide range with 1 selected as the minimum unit, i.e, 1% basis zoom type variable magnification is realized.

In accordance with the present invention, there is provided another processing device for changing magnification of image data, comprising storing means for storing one line of original image data; means for controlling the storing means to a write mode and a read mode alternately; address counting means for applying a write/read position x to the storing means; computing means for computing an integer Ji and a decimal Ri of an equation 100i/[specified magnification $R(\%)]=Ji+Ri$, where i is an integer, $0 \leq Ri<1$, and Ji is an integer, and computing data Bi which is representative of the decimal Ri in terms of a division a denominator of which is a 2's power; sampling position designating means for, while the storing means is in a write mode, delivering data clock DCLK which determines a pixel unit of original image data to the address counting means as count pulses and, while the storing means is in a read mode, changing i by 1 at a time in synchronism with the data clock DCLK, under a condition of $R<100$, delivering count pulses 2DCLK having a twice higher frequency than the data clock DCLK to the address counting means as count pulses when an equation $J_i - J_{i-1}$ is reached and delivering the data clock DCLK to the address counting means when an equation $J_i - J_{i-1} = 1$ is reached, and, under a condition of $R \geq 100$, delivering the data clock DCLK to the address counting means when the equation $J_i - J_{i-1} = 1$ is reached and interrupting the delivery of the count pulses to the address counting means when an equation $J_i - J_{i-1} = 0$ is reached, thereby designating the read position x or original image data.

Specifically, in this processing device, magnification-changed image data are produced by storing one line of original image data in a buffer memory, and controlling the read address of the buffer memory to read and sample the original image data. In a reduce mode, the amount of change of the image data read address, i.e., the original image data reading pitch corresponding to a magnification is determined by selectively applying the data clock DCLK and the clock DCLK to an address counter which is associated with the buffer memory.

In accordance with the present invention, there is provided another processing device for changing magnification of image data, comprising storing means for storing one line of original image data; means for controlling the storing means to a write mode and a read mode alternately; address counting means; up-down counting means; adding means for applying a sum of count data produced by the address counting means and count data produced by the up-down counting means to the storing means as address data; computing means for computing an integer $J_i$ and a decimal $R_i$ of an equation 100i/[specified magnification R(%)]=$J_i+R_i$, where is an integer, $0 \leq R_i < 1$, and $J_i$ is an integer, and computing data $B_i$ which is representative of the decimal in terms of a division a denominator of which is a 2's power; sampling position designating means for, while the storing means is in a write mode, delivering a data clock DCLK which determines a pixel unit of original image data to the address counting means as count pulses and, while the storing means is in a read mode, incrementing i by 1 at a time in synchronism with the data clock DCLK, under a condition of R<100, delivering an up-count command to the up-down counting means and delivering the data clock DCLK to the address counting means as well when an equation $J_i - J_{i-1} = 2$ is reached, and not delivering count pulses to the up-down counting means when an equation $J_i - J_{i-1} = 1$ is reached, and, under a condition of $R \geq 100$, delivering a down-count command to the up-down counting means and delivering the data clock DCLK to the address counting means, not delivering the data clock DCLK to the up-down counting means when the equation $J_i - J_{i-1} = 1$ is reached, and delivering the data clock DCLK to the up-down counting means as well when an equation $J_i - J_{i-1} = 0$ is reached, thereby designating the read position x of original image data; and magnification-changed image data setting means for extracting those bits of the original image data at the position x and at least one original image data which neighbors that original image data that correspond to the data $B_i$, and determining magnification-changed image data at a position i based on the bits extracted.

In this processing device, the data clock DCLK is counted up or down depending on the magnification so as to determine the read position x of a line buffer memory.

In accordance with the present invention, there is provided another processing device for changing magnification of image data, comprising computing means for computing original image data sampling position information for producing magnification-changed image data which correspond to a specified magnification R; sampling position designating means for designating an original image data sampling position x based on the original image data sampling position information; sampling means for sampling original image data at the position x designated; magnification-changed image data setting means for determining magnification-changed image data which corresponds to the original image data sampled; and MTF-compensating means provided with MTF compensation computation data which cover a predetermined range of magnifications R, for applying MTF compensation to image data before or after a change of magnification on the basis of the computation data.

In this processing device, MTF compensation which matches with a particular magnification R specified is effected to prevent image quality from being degraded by a change of magnification.

In this processing device, to implement the real-time processing, the computing means computes an integer $J_i$ and a decimal $R_i$ of an equation 100i/[specified magnification R(%)]=$J_i+R_i$, where i is an integer, $0 \leq R_i < 1$, and $J_i$ is an integer; the sampling position designating means changes i by 1 at a time in synchronism with a data clock which determines a pixel unit of original image data, under a condition of R<100, incrementing the position x by 2 when an equation $J_i - J_{i-1} = 2$ is reached, and increments the position x by 1 when an equation $J_i - J_{i-1}$ is reached, and, under a condition of R>100, incrementing the position x by 1 when the equation $J_i - J_{i-1} = 1$ is reached, and holding an existing value of the position x when an equation $J_i - J_{i-1} = 0$ is reached; the sampling means counts the data clock to sample original image data at the position x and at least one original image data which neighbors that original image data; the magnification-changed data setting means determines magnification-changed image data at a position i based on a correlationship between $R_i$, original image data at the position x, and at least one original image data which neighbors that original image data, in synchronism with the data clock.

The computing means and the sampling position designating means specify the original image data sampling position x at a pitch which corresponds to a magnification R(%). The sampling means samples original image data which is located at the position x and the next position x. The magnification-changed data setting means sets up magnification-changed image data by using a predetermined logic such as any of the approaches [A] to [C]. All of the sampling position designating means, sampling means, and magnification-changed image data setting means are operated in synchronism with the data clock DCLK, so that magnification-changed image data are synchronous to the data clock DCLK, meaning that such data are produced by real-time processing. This kind of image data are feasible for raster scanning.

The computing means may compute $J_i$ and $R_i$ by incrementing i by 1 every time one pulse of the data clock DCLK appears. Alternatively, it may compute $J_i$ and $R_i$ for each of i=0 to R−1 prior to actual image reading, store them in a memory, sequentially increment i by one, and read out $J_i$ and $R_i$ which correspond to each of the numbers. In any case, Ji and ri are sequentially specified timed to the data clock DCLK.

As previously stated, the computing means computes the largest Ji in a form of integer Ji and decimal Ri of the equation 100i/[specified magnification R(%)]=Ji+Ri, and the sampling position designating means designates the original image data sampling position x (i.e., Ji) based on that Ji and the previously computed integer $Ji_{-1}$. Hence, any desired number of magnifications R(%) can provided over any desired range. This realizes 1% basis zoom type variable magnification over a substantial range.

In this processing device, the sampling means comprises buffer memory means for storing one line of original image data; means for controlling the buffer memory means to a write mode and a read mode alternately; address counting means for applying a write/read position to the buffer memory means; and sampling position designating means for, while the buffer memory means is in a write mode, delivering the data clock DCLK to the address counting means as count pulses and, while the buffer memory means is in a read mode, changing i by 1 at a time in synchronism with the data clock DCLK, under a condition of R<100, delivering one of the data clock DCLK and count pulses 2DCLK having a twice higher frequency than the data clock DCLK to the address counting means as count pulses in response to the data Ai, and, under a condition of R≧100, setting up or interrupting the delivery of the data clock DCLK to the address counting means in response to the data Ai, thereby designating the read position x of original image data.

Before an original image is read, the computing means stated above computes and stores in a memory data (Ai) for x designation and data (Bi) for magnification-changed image data computation which correspond to the integer Ji and the decimal Ri. As image reading begins, data are read out of the memory with i used as addresses and are applied to the sampling position designating means as well as to the magnification-varied image data setting means. As previously stated, the magnification-changed image data setting means determines magnification-changed image data at the position i based on a correlationship between Ri (data Bi), original image data at the position x read out of the memory, and at least one original image data next to that original image data, in synchronism with the data clock DCLK.

Specifically, in this processing device, magnification-changed image data are produced by storing one line of original image data in a buffer memory, and controlling the read address of the buffer memory to read and sample the original image data. In a reduce mode, the amount of change of the image data read address, i.e., the original image reading pitch corresponding to a magnification is determined by selectively applying the data clock DCLK and the clock 2DCLK to an address counter which is associated with the buffer memory.

Further, in this processing device, the sampling means comprises buffer memory means for storing one line of original image data; means for controlling the buffer memory means to a write mode and a read mode alternately, address counting means; up-down counting means; adding means for applying a sum of count data produced by the address counting means and count data produced by the up-down counting means to the buffer memory means as address data; and sampling position designating means for, while the buffer memory means is in a write mode, delivering the data clock DCLK to the address counting means as count pulses and, while the buffer memory is in a read mode, changing i by 1 at a time in synchronism with the data clock DCLK, under a condition of R<100, delivering an up-count command to the up-down counting means, delivering the data clock DCLK to the address counting means as count pulses, and setting up or interrupting the delivery of the data clock DCLK to the up-down counting means in response to the data Ai, and, under a condition of R≧100, delivering a downcount command to the up-down counting means, delivering the data clock DCLK to the address counting means, and setting up or interrupting the delivery of the data clock DCLK to the up-down counting means in response to the data Ai, thereby designating the read position x of original image data.

In short, the data clock DCLK is counted up up or down depending on the magnification so as to determine the read position x of a line buffer memory.

In accordance with the present invention, there is provided another processing device for changing magnification of image data, comprising first computing means for computing original image data sampling position information for producing magnification-changed image data which correspond to a specified magnification Rx in a main scanning direction; second computing means, for computing original image data sampling position information for producing magnification-changed image data which correspond to a specified magnification Ry in a subscanning direction; first sampling position designating means for designating a sampling position x of original image data on the basis of the original image data sampling position information which is computed by the first computing means; second sampling position designating means for designating a sampling position y of original image data on the basis of the original image data sampling position information which is computed by the second computing means; first sampling means for sampling original image data at the position x; second sampling means for sampling original image data at the position y; first magnification-changed image data which corresponds to the original image data sampled by the first sampling means; second magnification-changed image data setting means for determining magnification-image data which corresponds to the original image data sampled by the second sampling means; main scanning direction MTF-compensating means provided with main scanning direction MTF compensation computation data which cover a predetermined range of magnifications Rx, for applying MTF compensation to image data before or after a change of magnification in the main scanning direction on the basis of the computation data; and subscanning direction MTF-compenating means provided with subscanning direction MTF compensation computation data which cover a predetermined range of magnifications Ry, for applying MTF compensation to image data before or after a change of magnification in the subscanning direction on the basis of the computation data.

As stated above, in this processing device, the MTF compensation computation in the main scanning direction which corresponds to a magnification Rx and the MTF compensation computation in the subscanning direction which corresponds to a magnification Ry are executed independently of each other. This suppresses the deterioration of image quality due to the change of magnification and even if the magnifications in the main scanning and subscanning directions are different from each other, allows a minimum of deterioration of image quality to occur.

In this processing device, to implement the real-time processing, the first computing means computes an integer Ji and a decimal Ri of an equation $100i/$[specified magnification $R(\%)]=Ji+Ri$, where is an integer, $0 \leq Ri < 1$, and Ji is an integer; the first sampling position designating means changes i by 1 at a time in synchronism with a data clock which determines a pixel unit of original image data, under a condition $R < 100$, increments the position x by 2 when an equation $Ji-Ji_{-1}=2$ is reached, and increments the position x by 1 when an equation $Ji-Ji_{-1}=1$ is reached, and, under a condition of $R \geq 100$, increments the position x by 1 when the equation $Ji-Ji_{-1}=1$ holds, and maintains an existing value of the position x when an equation $Ji-Ji_{-1}=0$ holds; the first sampling means counts the data clock to sample original image data at the position x and at least one image data which neighbors that original image data; the first magnification-changed image data setting means determines magnification-changed image data at a position i based on a correlationship between Ri, original data at the position x, and at least one original image data which neighbors that original image data, in synchronism with the data clock.

The first computing means and the first sampling position designating means specify the original image data sampling position x at a pitch corresponding to the main scanning magnification Rx. The first sampling means samples original image data at the position x and the next position. The first magnification-changed image data setting means sets up magnification-changed image data using a predetermined logic such as any one of the approaches [A] to [C]. All of the first sampling position designating means, first sampling means, and first magnification-changed image data setting means are operated in synchronism with the data clock DCLK, so that magnification-changed data are synchronous to the data clock DCLK, meaning that such data are produced by real-time processing. This kind of data can be processed by raster scanning.

The first computing means may compute Ji and Ri by incrementing 1 by 1 every time the data clock DCLK appears. Alternatively, it may compute Ji and Ri for each of i=0 to Rx−1 before an image is actually read, store the data in a memory, sequentially increment i by 1 in synchronism with the data clock DCLK, and read Ji and Ri associated with each of the numbers. In any case, Ji and Ri are sequentially specified in synchronism with the data clock DCLK.

As stated above, the first computing means computes the largest integer Ji in a form of integer Ji and decimal Ri, and the first sampling position designating means designates the original image data sampling position x (i.e., Ji) based on that Ji and $Ji_{-1}$ which is the integer Ji previously computed. Hence, any desired number of magnifications $Rx(\%)$ can be provided over any desired range with 1 used as a minimum unit. That is, 1% basis zoom type variable magnification is realized over a substantial range.

The second computing means computes sampling position information in the subscanning direction based on the magnification Ry, the second sampling position designating means designates the sampling position y, and the second sampling device samples data at the position y designated, each adopting the processing logic similar to that which the processing elements associated with the main scanning direction adopt, as described. Data are extracted with the data clock DCLK in the previous description of the main scanning processing interpreted as a line clock LSYNC.

The first sampling means comprises buffer memory means for storing one line of original image data; means for controlling the buffer memory means to a write mode and a read mode alternately; address counting means for applying a write/read position to the buffer memory means; and sampling position designating means for, while the buffer memory means is in a write mode, delivering the data clock DCLK to the address counting means as count pulses and, while the buffer memory means is in a read mode, changing i by 1 at a time in synchronism with the data clock DCLK, under a condition of $R<100$, delivering one of the data clock DCLK and count pulses 2DCLK having a twice higher frequency than the data clock DCLK to the address counting means as count pulses in response to the data Ai and, under a condition of $R \geq 100$, setting up or interrupting the delivery of the data clock DCLK to the address counting means in response to the data Ai, thereby designating the read position x of original image data.

The first computing means computes and store in a memory data (Ai) for x designation and data (Bi) for magnification-changed image data computation which correspond to the integer Ji and the decimal Ri, before an image is actually read. As image reading begins, data are read out of the memory with i used as addresses and are applied to the sampling position designating means and the magnification-changed data setting means. As mentioned earlier, the magnification-changed image data setting means determines magnification-changed image data at a position i based on a relationship between Ri (data Bi), original image data at the position x read out of the memory, and at least one image data next to that original image data, in synchronism with the data clock DCLK.

In short, this processing device produces magnification-changed image data by storing one line of original image data in a buffer memory, and controlling the read address of the buffer memory to read and sample the original image data. In a reduce mode, the amount of change of the original image data read address is determined by selectively delivering the data clock DCLK and the clock 2DCLK to an address counter which is associated with the buffer memory.

Further, in this processing device, the sampling means comprises buffer memory means for storing one line of original image data; means for controlling the buffer memory means to a write mode and a read mode alternately; address counting means; up-down counting means; adding means for applying a sum of count data produced by the address counting means and count data produced by the up-down counting means to the buffer memory means as address data; and sampling position designating means for, while the buffer memory means is in a write mode, delivering the data clock DCLK to the address counting means as a count pulses and, while the buffer memory means is in a read mode, changing i by 1 at a time in synchronism with the data clock DCLK, under a condition of $R<100$, delivering an up-count command to the up-down counting means, delivering the data clock DCLK to the address counting means as count pulses, and setting up or interrupting the delivery of the data clock DCLK to the up-down counting means in response to the data Ai, and, under a condition of R≧100, delivering a down-count command to the up-down counting means, delivering the data clock DCLK to the address counting means, and setting up or interrupting the delivery of the data clock DCLK to the up-down counting means in response to the data Ai, thereby designating the read position x of original image data.

In short, the data clock DCLK is counted up or down depending upon the magnification so as to determine the read position x of a line buffer memory.

The read position y in the subscanning direction is determined in the same manner as the read position x.

In accordance with the present invention, there is provided another processing device for changing magnification of image data, comprising computing means for computing original image data sampling position information Ji for producing magnification-changed image data which correspond to a specified magnification, and deviation information Ri representative of a deviation between a sampling position and a magnification-changed image allocated position; sampling position designating means for designating a sampling position of original image data based on the original image data sampling position information; sampling means for sampling original image data at the sampling position designated; and magnification-changed image data setting means for producing magnification-changed image data to which a magnification change and MTF compensation were applied simultaneously, by appling original image data sampled by the sampling means to an MTF compensation magnification change equation which is a combination of interpolation computation corresponding to the deviation information Ri and MTF compensation computation.

Considering the fact that the magnification-changed image data computation relying on interpolation which is based on Ri uses a plurality of nearby original image data as its parameters, and so does the MTF compensation computation, the processing device described above produced MTF-compensated magnification-changed image data straight out by using an equation which covers MTF compensation computation together with interpolation computation. This remarkably cuts down the number of computing steps required and correspondingly reduce the number of means for implementing such computations.

To implement the real-time processing as stated above, and to provide optimum image quality even when the magnification differs from the main scanning direction to the subscanning direction, the computing means computes an integer Ji and a decimal Ri of an equation $100/[\text{specified magnification } R (\%)] = Ji + Ri$, where i is an integer, $0 \leq Ri < 1$, and Ji is an integer; the sampling position designating means changes i by 1 at a time in synchronism with a data clock which determines a pixel unit of original image data, under a condition of R<100, increments the sampling position of original image data by 2 when an equation $Ji - Ji_{-1} = 2$ is reached, and increments the designated position by one when an equation $Ji - Ji_{-1} = 1$ is reached, and, under a condition of R>100, increments the designated position by 1 when the equation $Ji - Ji_{-1} = 1$ is reached, and holds an existing value of the designated position when an equation $Ji - Ji_{-1} = 0$ is reached; the sampling means samples original image data at the designated position and at least one original image data which neighbors that original image data, by counting the data clock; and the magnification-changed data setting means determines magnification-changed image data at a position i based on a correlationship between Ri, original image data at a position i based on a correlationship between Ri, original image data at the designated position, and at least one original image data which neighbors that original image data, in synchronism with the data clock.

In this construction, the computing means and the sampling position designating means specify the original image data sampling position x at a pitch which corresponds to the magnification Rx in the main scanning direction. The sampling means samples original data at the position x and the next position. The magnification-changed image data setting means sets up magnification-changed image data by using a predetermined logic, e.g. the approach [C] which is modified to be applicable to MTF compensation computation also. All of the sampling position designating means, sampling means, and magnification-changed image data setting means are operated in synchronism with the data clock DCLK, magnification-changed image data are synchronous to the data clock DCLK, meaning that such image data are produced by real-time processing. This kind of data are feasible for raster scanning.

The computing means may compute Ji and Ri by incrementing i by 1 every time one pulse of the data clock DCLK appears. Alternatively, before an image is actually read, it may compute Ji and Ri for each of i=0 to Rx−1 beforehand, store such data in a memory, sequentially change i by one in sychronism with the data clock DCLK, and read out Ji and Ri which are associated with each of those numbers. In any case, Ji and Ri are sequentially specified in synchronism with the data clock DCLK.

As previously stated, the computing means computes the largest Ji in a form of integer Ji and decimal Ri, and he sampling position designating means designates the original image sampling position x (i.e., Ji) based on that Ji and the previously computed integer $Ji_{-1}$. Hence, any desired number of magnifications Rx (%) can be provided over a substantial range with 1 used as a minimum unit. This realizes 1% basis zoom type variable magnification over a considerable range.

The second computing means computes sampling position information in the subscanning direction based on the magnification Ry, the second sampling position designating means designates the sampling position y, and the second sampling means samples the sampling position, each using a processing logic similar to that which is adapted for the main scanning direction processing elements. They extract data with the data clock DCLK in the previous description of the main scanning processing interpreted as a line clock LSYNC.

The sampling means of this processing device comprises buffer memory means for storing one line of original image data; means for controlling the buffer memory to a write mode and a read mode alternately; address counting means for applying a write/read address to the buffer memory means; and readout controlling means for, while the buffer memory means is in a write mode, delivering the data clock DCLK to the address counting means as count pulses and, while the buffer means is in a read mode, changing i by 1 at a time in synchronism with the data clock DCLK, under a condition of R<100, delivering one of the data clock DCLK and count pulses 2DCLK having a twice higher frequency than the data clock DCLK to the address counting means as count pulses in response to the data Ai, and, under a condition of R≧100, setting up or interrupting the delivery of the data clock DCLK to the address counting means in response to said data Ai, thereby designating the read position of original image data.

The computing means computes and stores in a memory data (Ai) for x designation and data (Bi) for magnification-changed data computation which correspond to the integer Ji and the decimal Ri, before an image is actually read. As image reading begins, the data are read out of the memory with i used as addresses and are applied to the sampling position designating means and the magnification-changed image data setting means. As previously described, the magnification-changed image data setting means determines magnification-changed image data at a position i based on a correlationship between Ri (data Bi), original image data at the position x read out of the memory, and original image data located next to that original image data, in synchronism with the data clock.

In short, this processing device stores one line of original image data in a buffer memory, and controls the read address of the buffer memory to read and sample the original image data to thereby produce magnification-changed image data. In a reduce mode, the amount of change of the original image data read address, i.e., the original image data reading pitch corresponding to a magnification is determined by selectively delivering the data clock DCLK and the clock 2DCLK to an address counter which is associated with the buffer memory.

Further, the sampling means of this processing device comprises buffer memory means for storing one line of original image data; means for controlling the buffer memory means to a write mode and a read mode alternately; address counting means; up-down counting means; adding means for applying a sum of count data produced by the address counting means and count data produced by the up-down counting means to the buffer memory means as address data; and readout controlling means for, while the buffer memory means is in a write mode, delivering the data clock DCLK to the address counting means as count pulses and, while the buffer memory means is in a read mode, changing i by 1 at a time in synchronism with the data clock DCLK, under a condition of R<100, delivering an up-count command to the up-down counting means, delivering the data clock DCLK to the address counting means as count pulses, and setting up or interrupting the delivery of the data clock DCLK to the up-down counting means in response to the data Ai, and, under a condition of R≧100, delivering a down-count command to the up-down counting means, delivering the data clock DCLK to the address counting means, and setting up or interrupting the delivery of the data clock DCLK to the up-down counting means in response to the data Ai, thereby designating the read position of original image data.

In short, the data clock DCLK is counted up or down depending upon the magnification so as to determine the read position x of a line buffer memory.

The read position y in the subscanning direction is determined in the same manner as the read position x in the main scanning direction, as described above.

The above and other objects, features and advantages of the present invention will become more apparent from the following detailed description taken with the accompanying drawings.

BRIEF DESCRIPTION OF THE DRAWINGS

FIG. 4A is a view showing a distribution of compensation coefficients for MTF compensation;

FIG. 4B is a view showing a distribution of a pixel to be MTF-compensated and those pixels which are referenced for the compensation;

FIGS. 5A, 5B, 5C and 5D are views each showing a distribution of MTF compensation coefficients;

FIG. 9 is a timing chart representative of a relationship between data Y outputted by a scanner, synchronizing clocks LSYNC, DCLK, and data Z outputted by a latch;

FIG. 10 is a timing chart representative of a relationship between data written in and read out of line buffer memories RAM1 and RAM2 and the line synchronizing pulse LSYNC;

FIGS. 11A and 11A-1–11A-4 collectively represent a block diagram showing one embodiment of the present invention;

Figure 1:
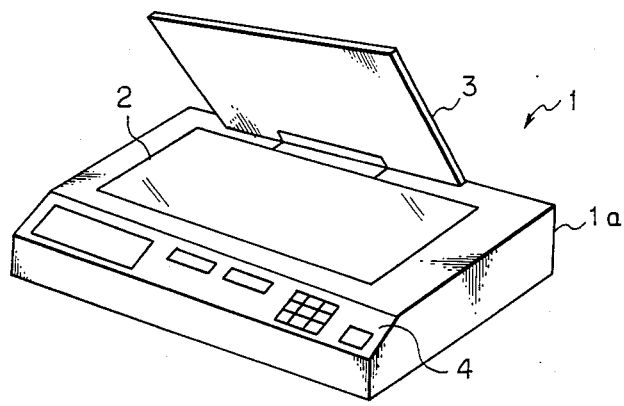
FIG. 1 is an external perspective view of a prior art image reader.
Figure 2:
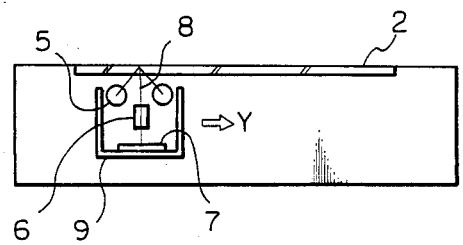
FIG. 2 is a side elevation showing major mechanical elements of a prior art image reader.
Figure 3:
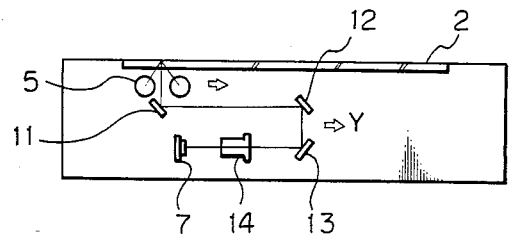
FIG. 3 is a view similar to FIG. 2, showing major mechanical elements of another prior art image reader.
Figure 6:
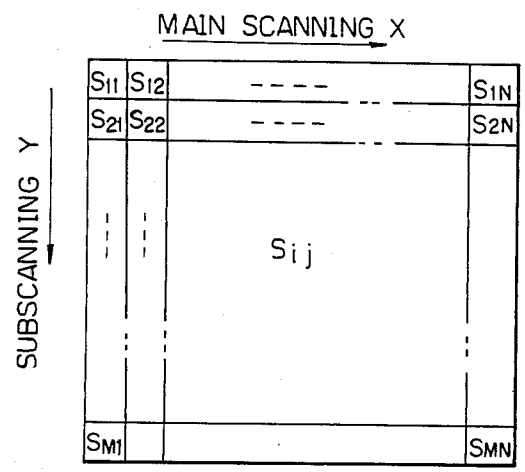
FIG. 6 is a view showing one page of original image data stored in a memory for the change of magnification of image data which relies on a prior art electrical approach, the data on the memory being shown in correspondence to an image.
Figures 1, 11A:
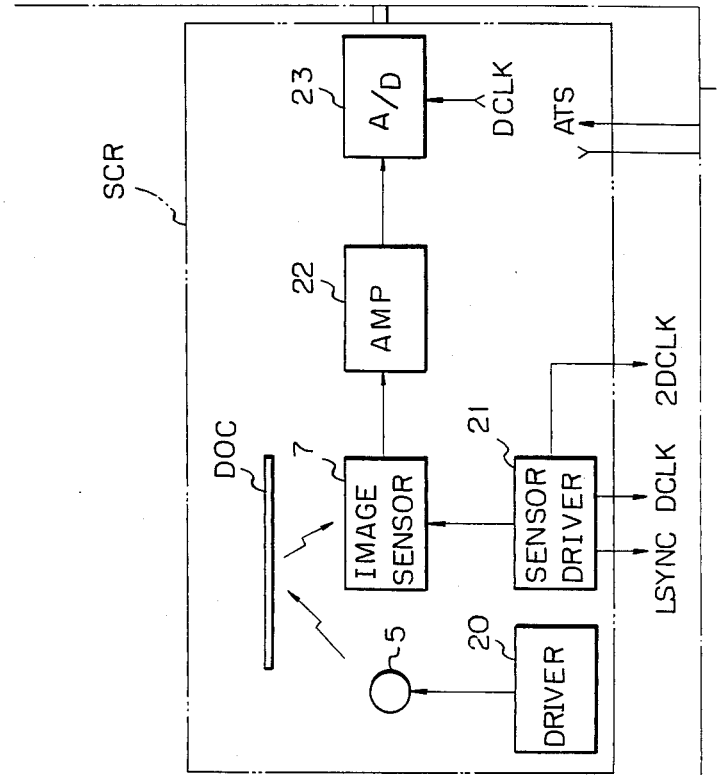
Figures 2, 11A:
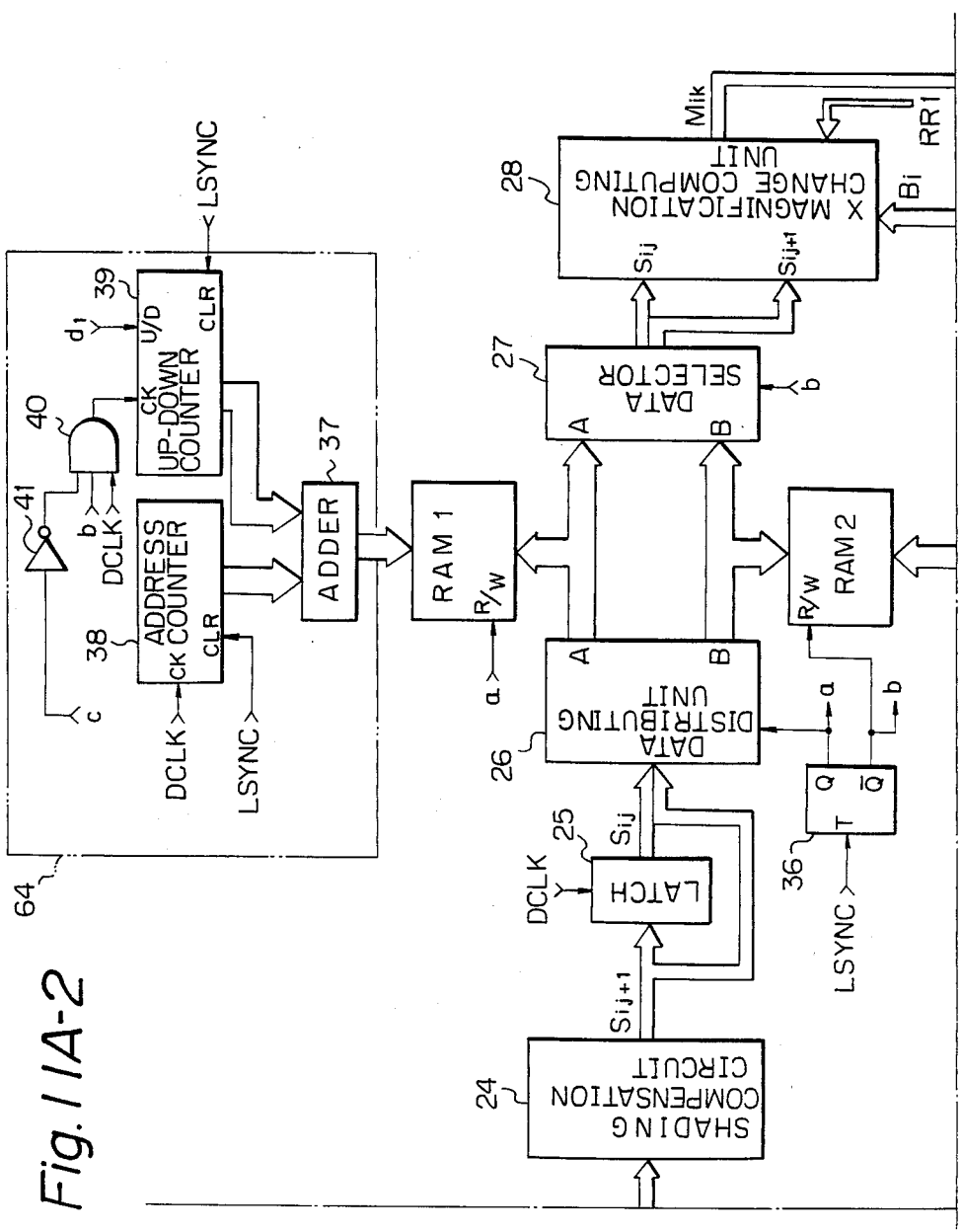
Figures 3, 11A:
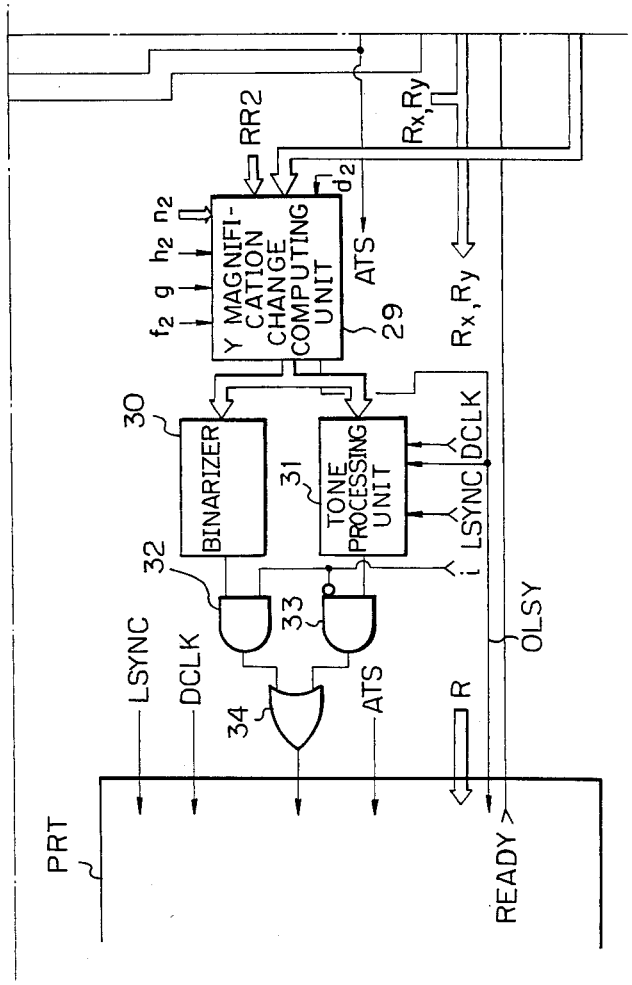
Figures 4, 11A:
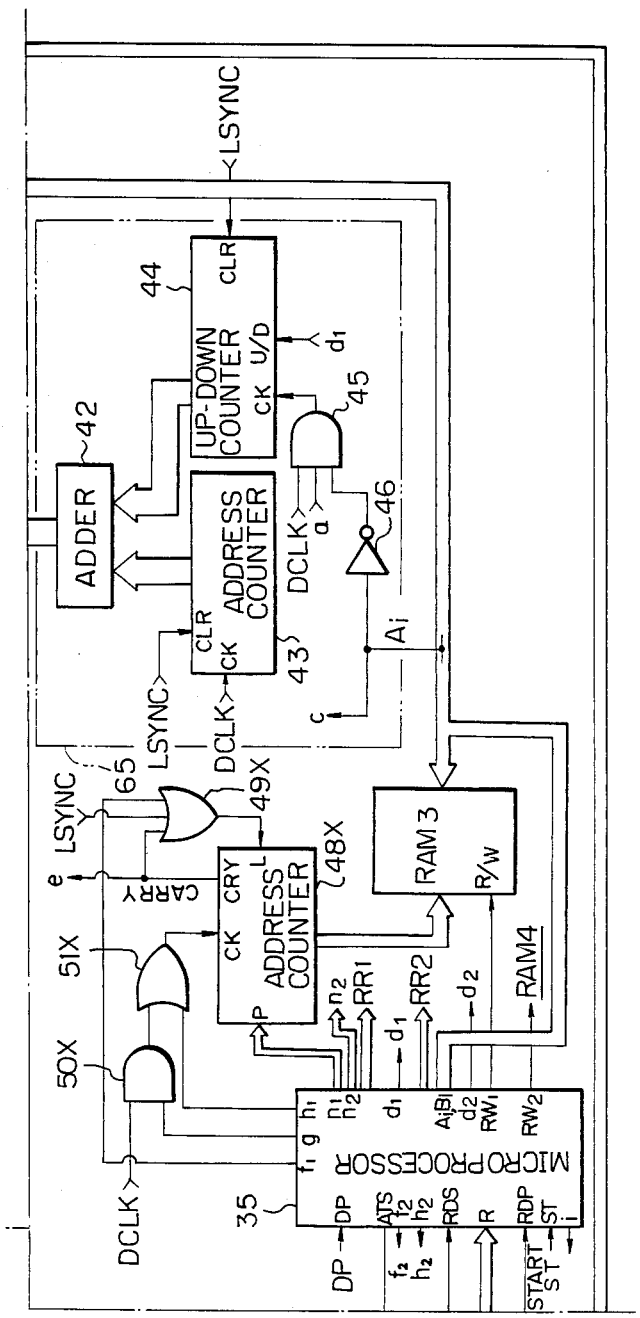
Figures 3, 11B:
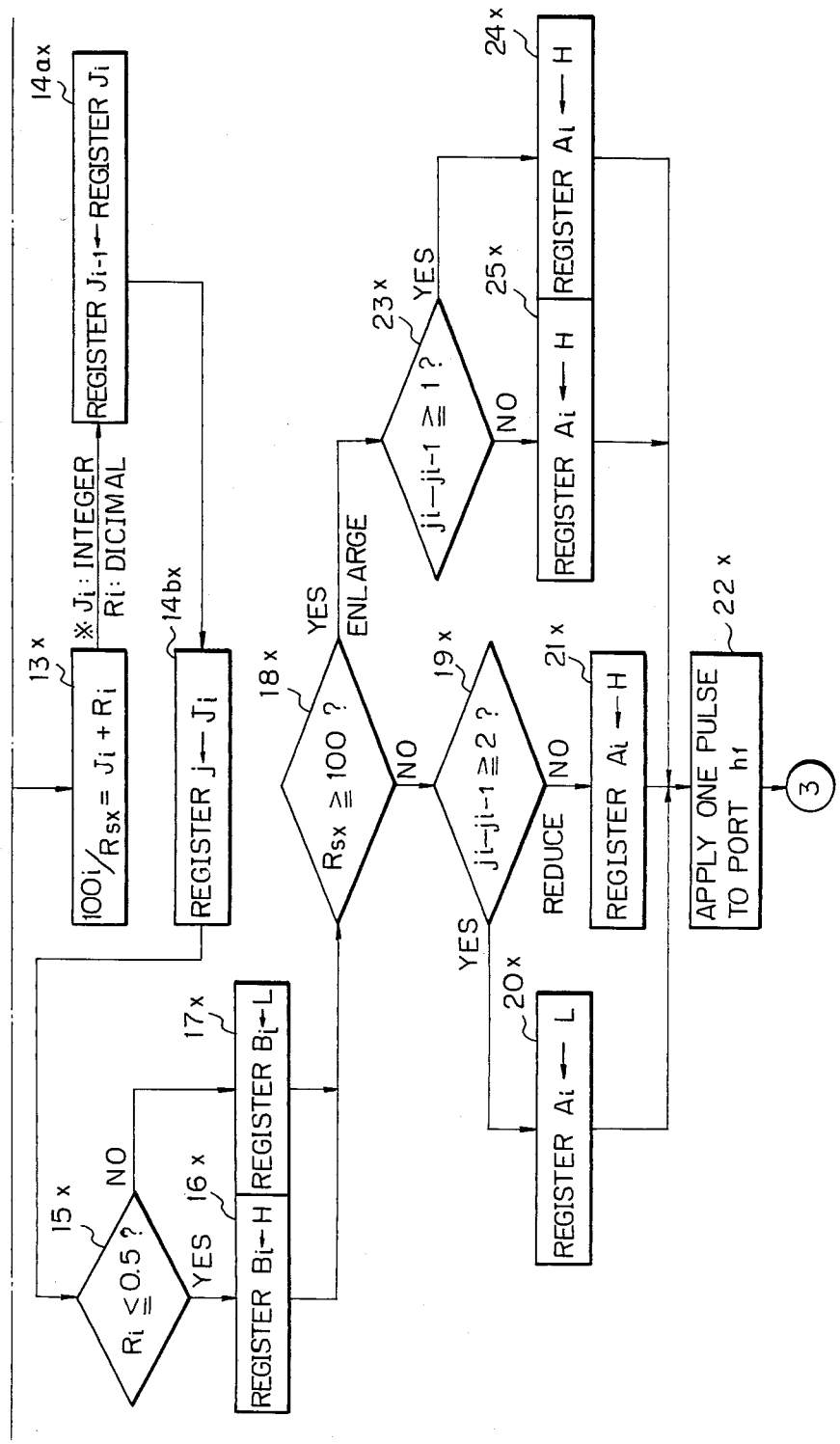
Figures 2, 11C:
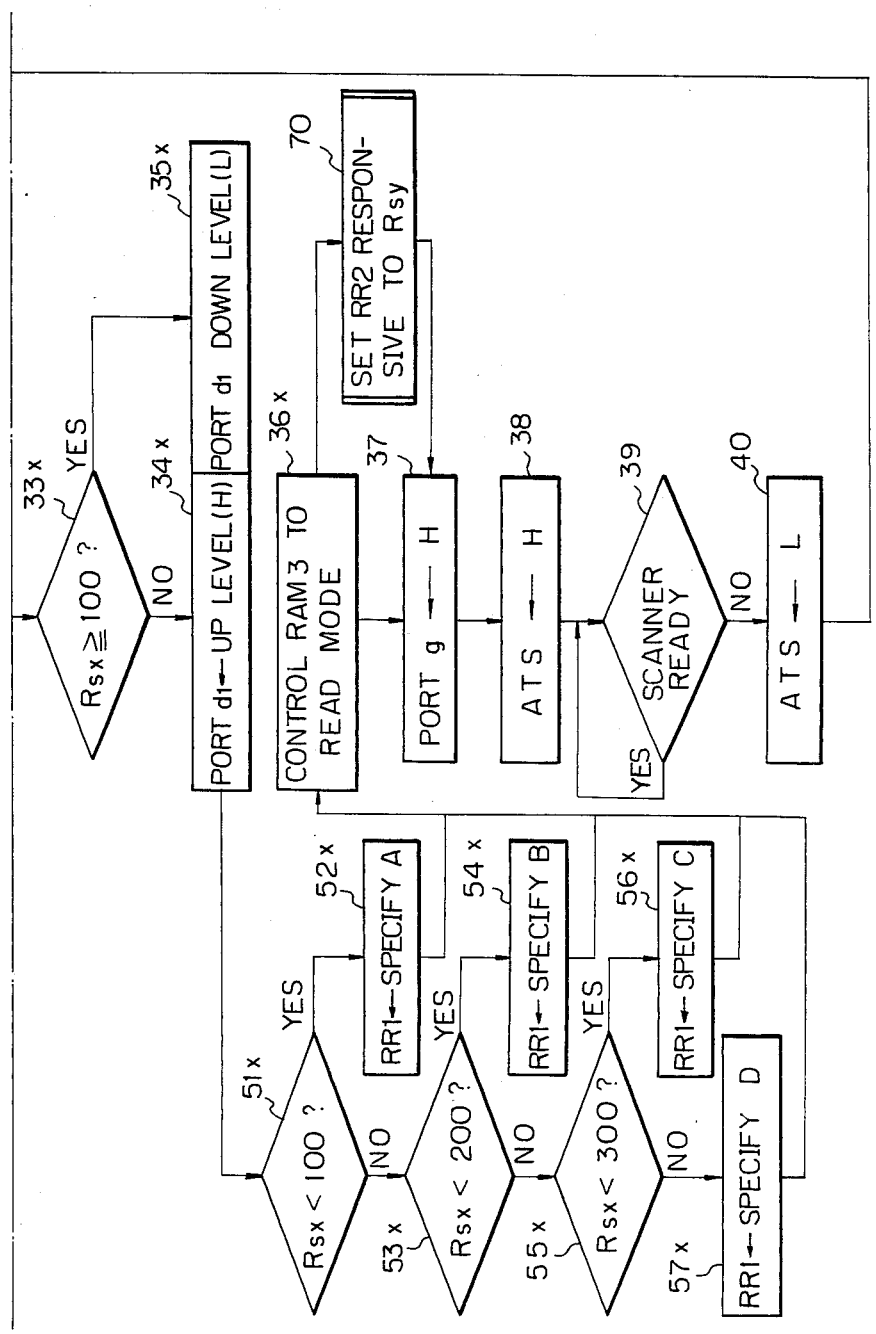
Figures 2, 11D:
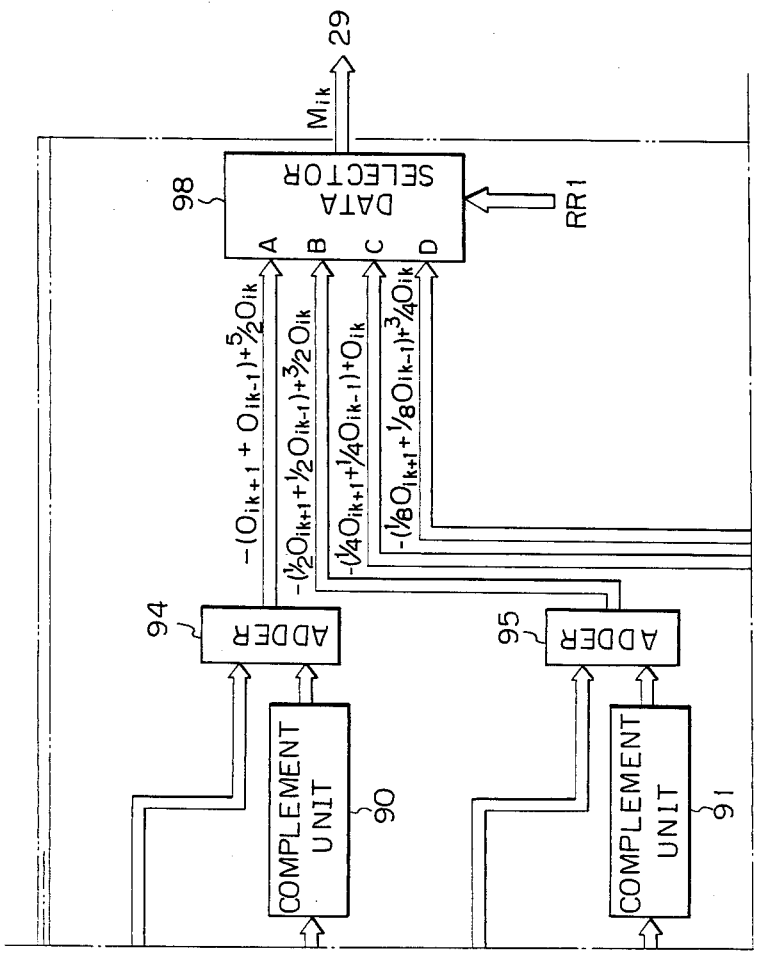
Figures 3, 11D:
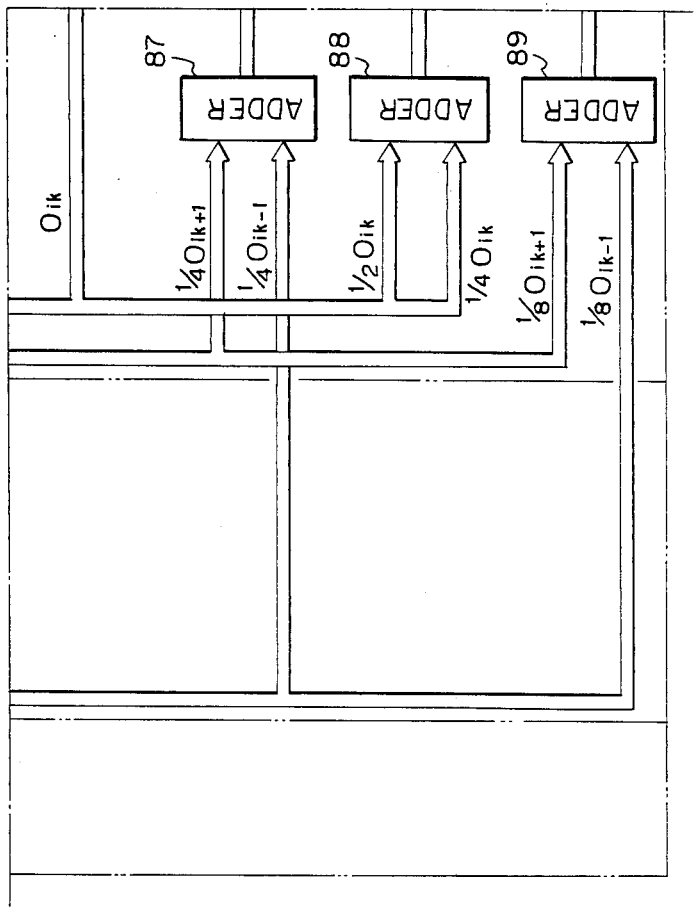
Figures 4, 11D:
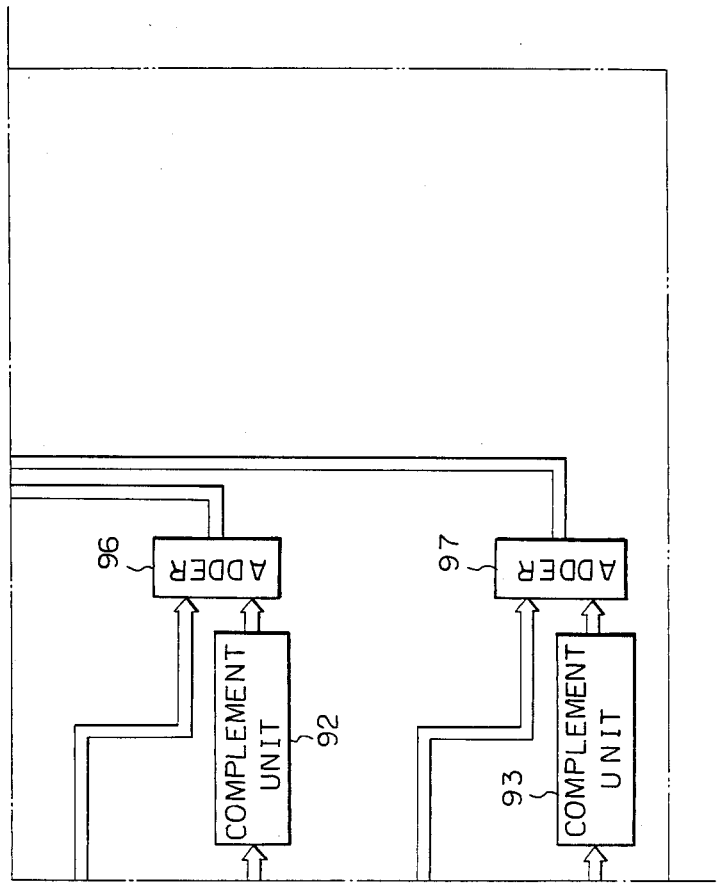
Figures 2, 11E:
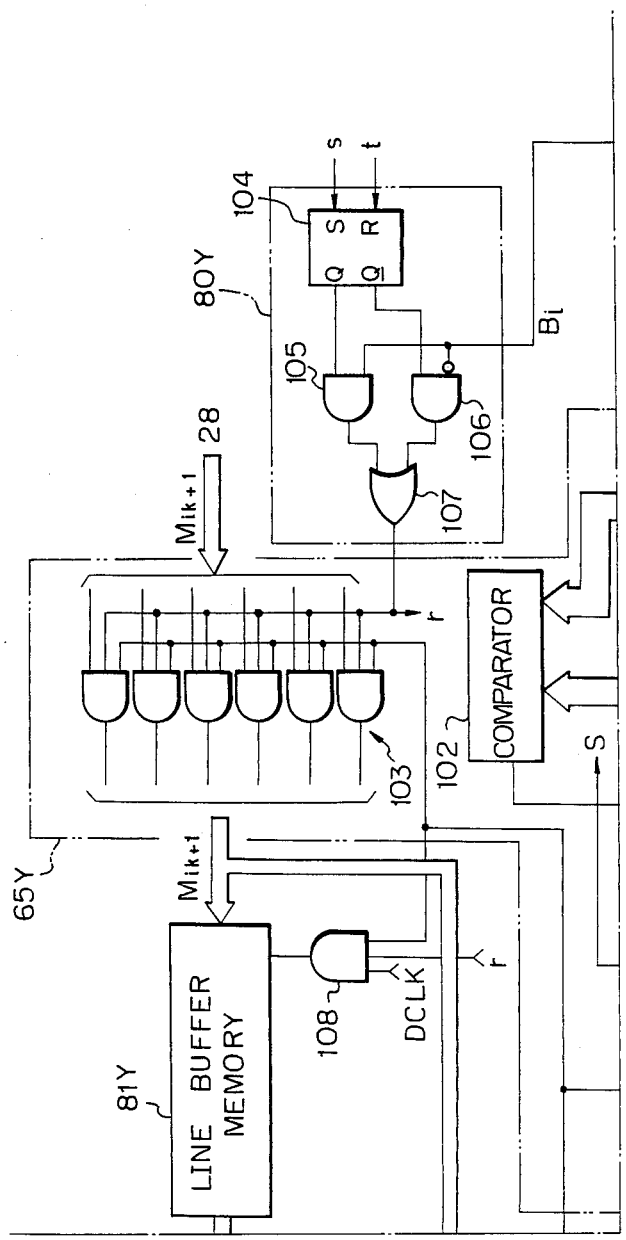
Figures 4, 11E:
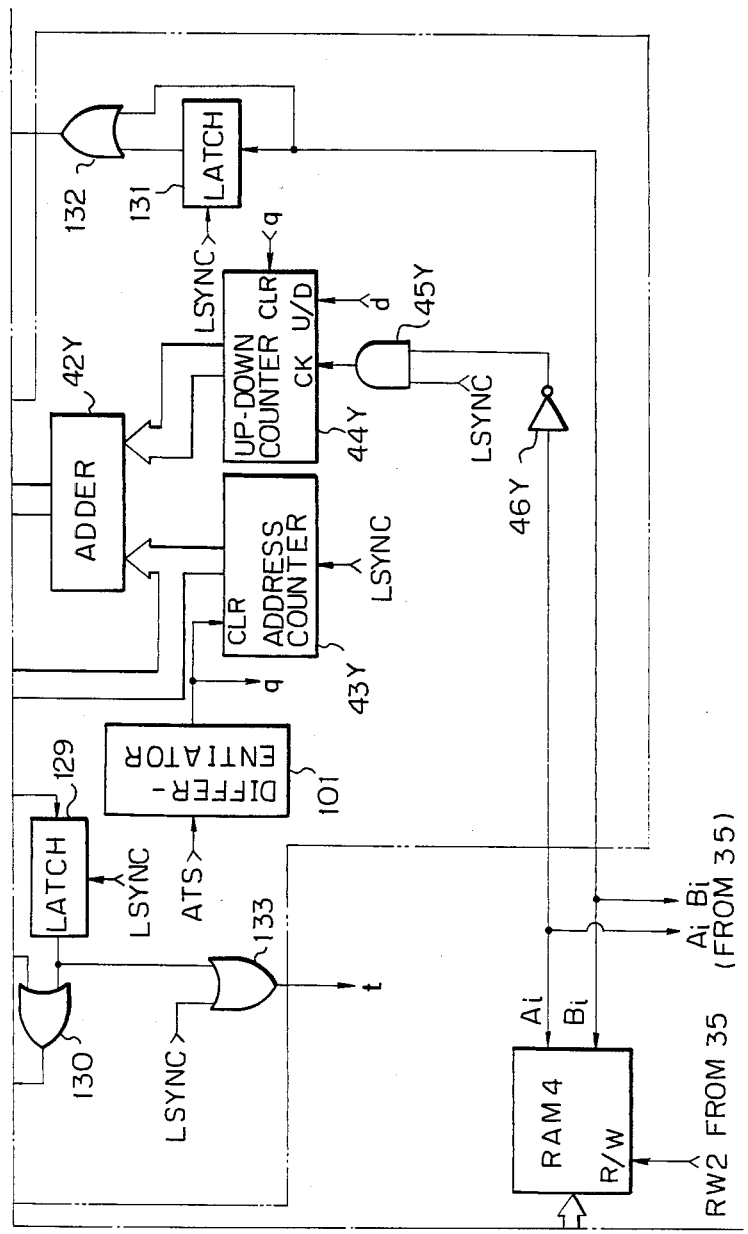
Figures 1, 12A:
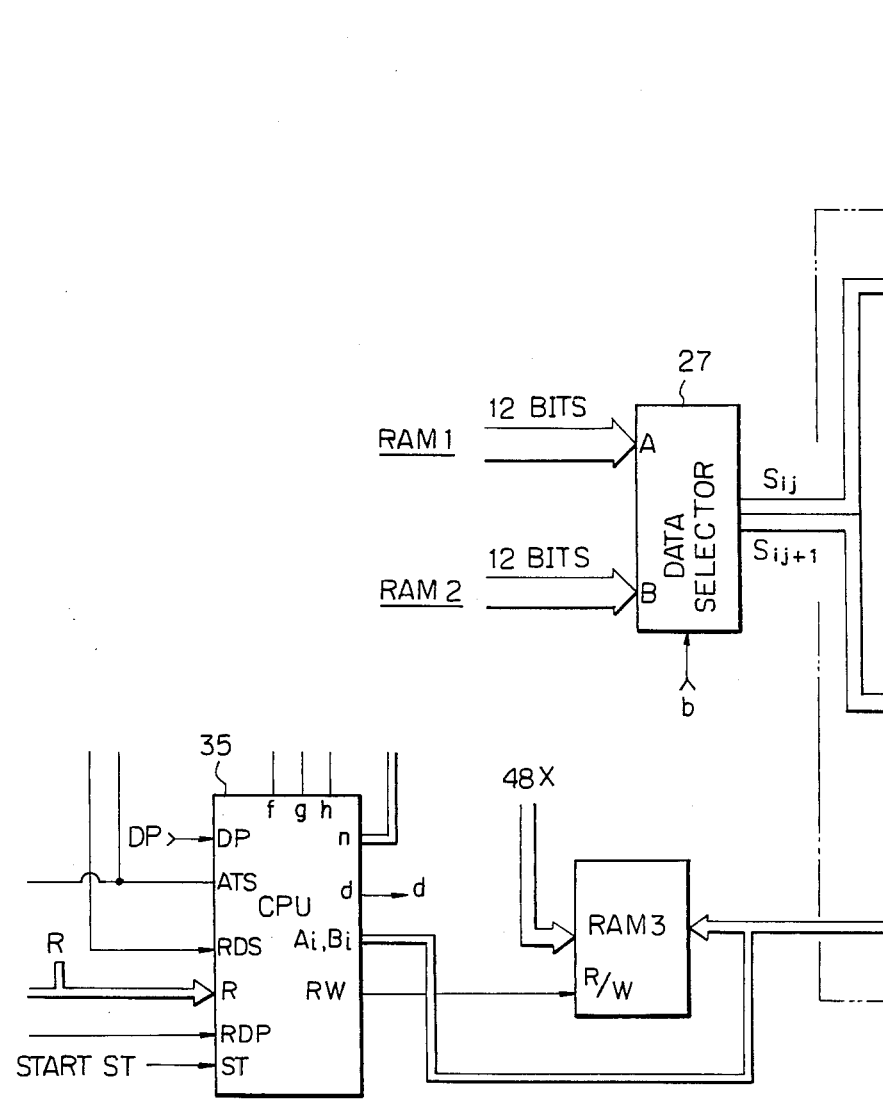
Figures 2, 12A:
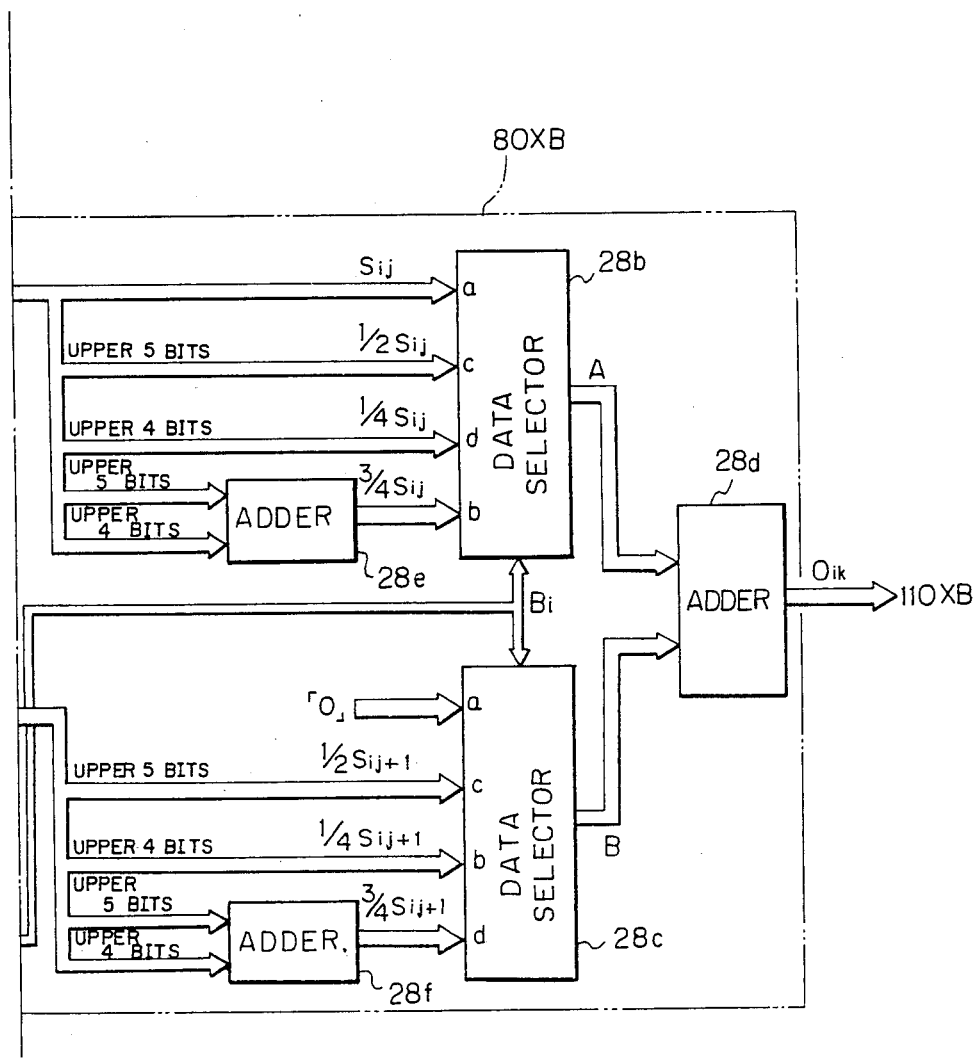
Figure 12B:
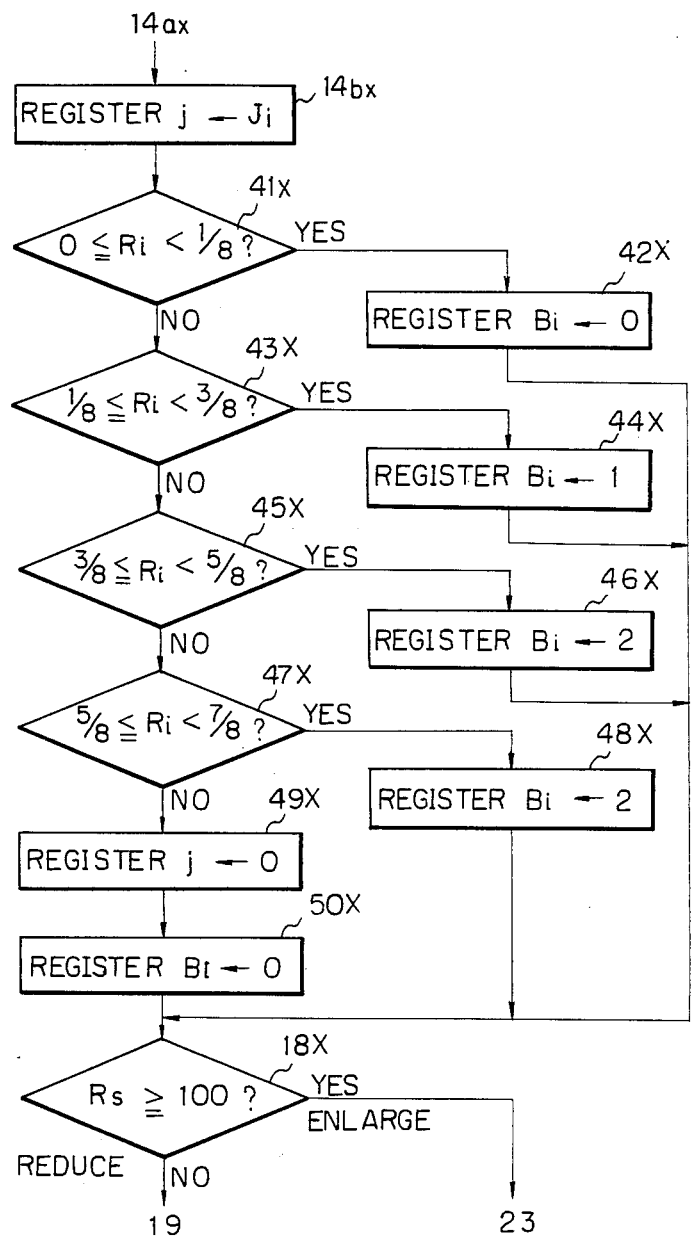
Figure 12C:
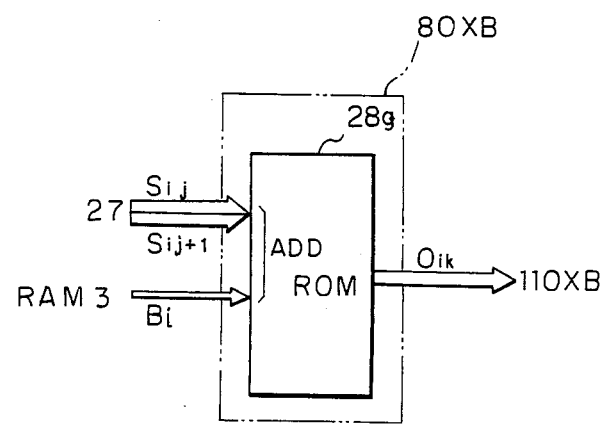
Figures 2, 13A:
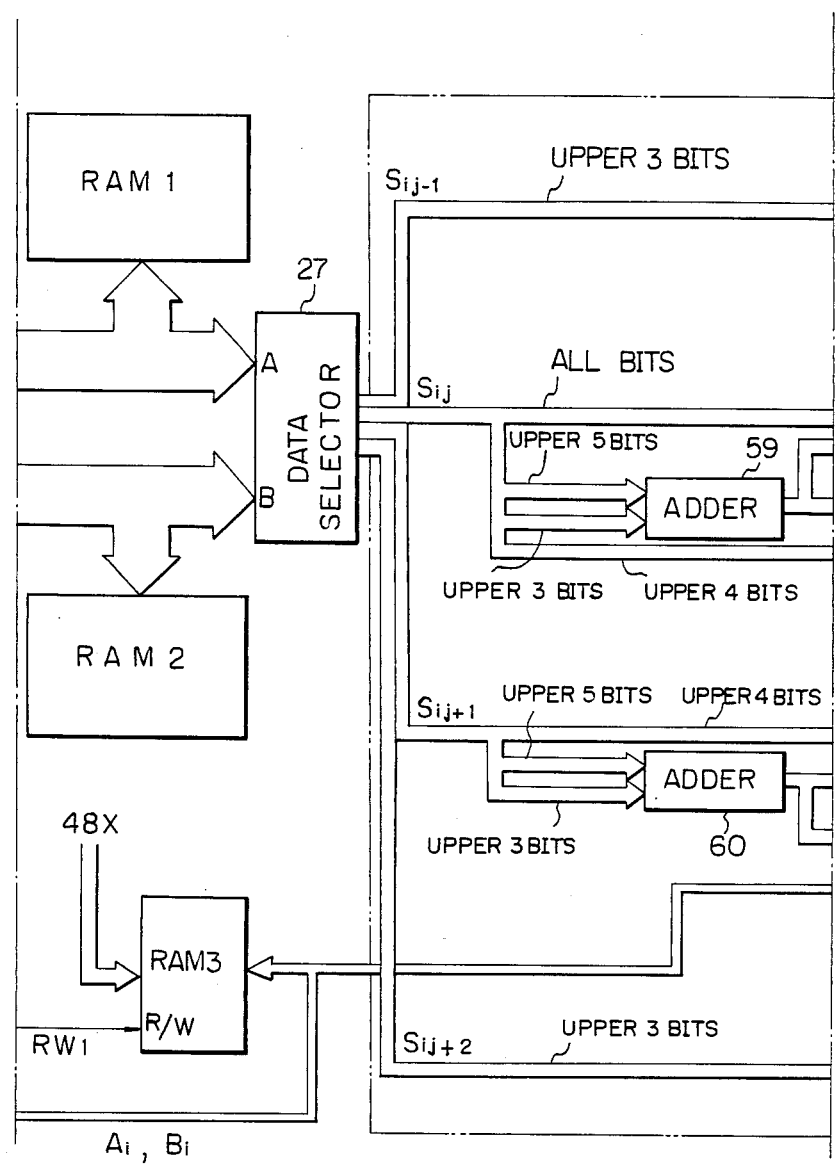
Figures 3, 13A:
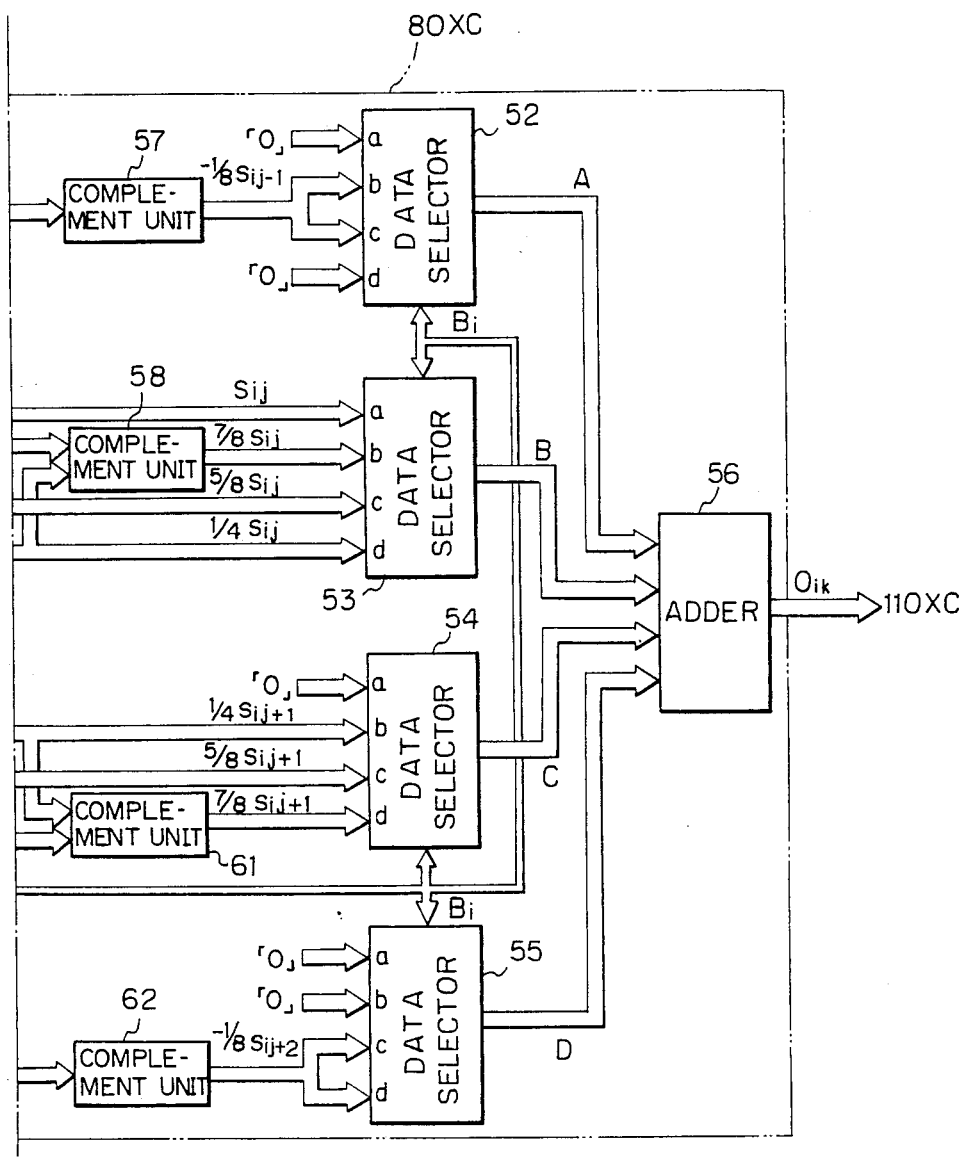
Figure 13B:
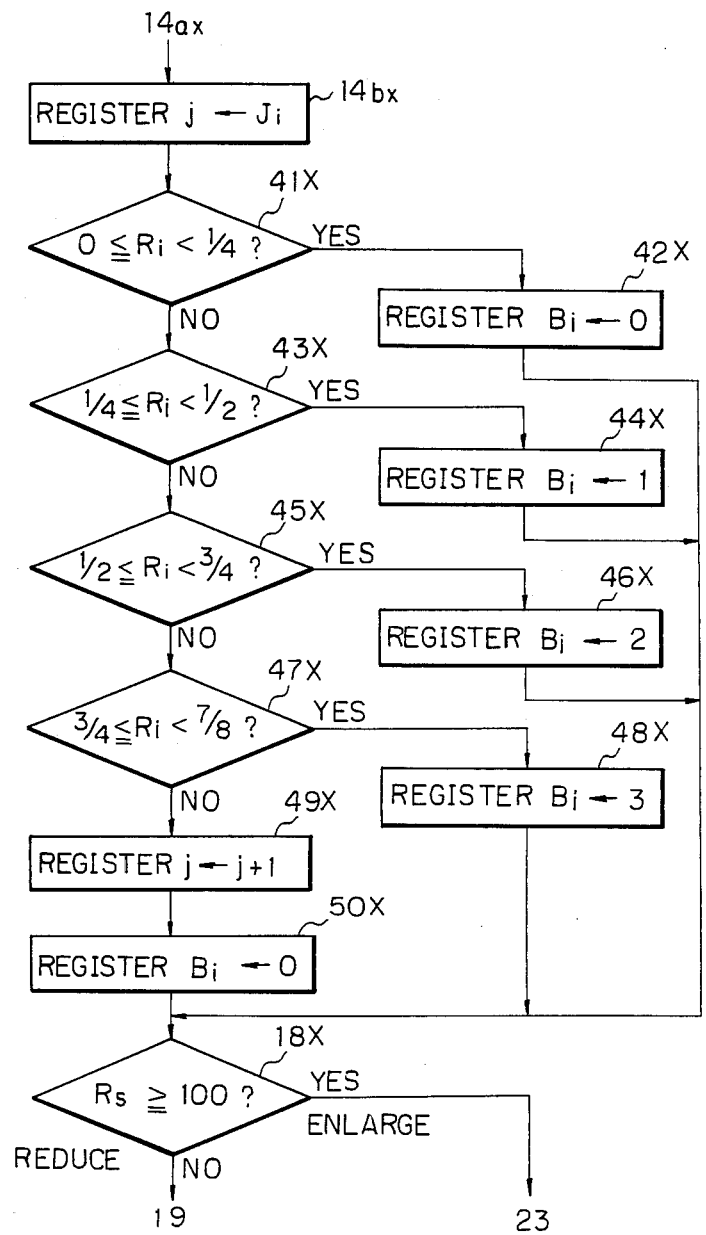
Figure 13C:
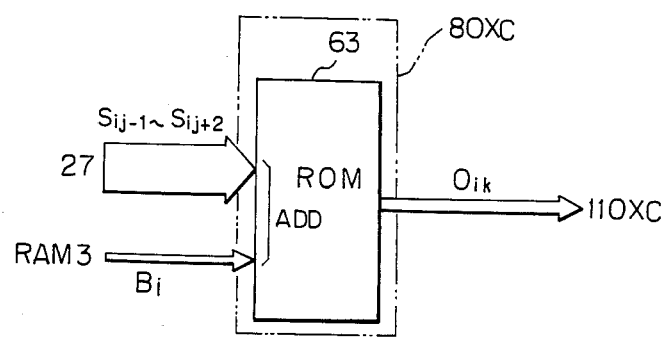
Figure 14:
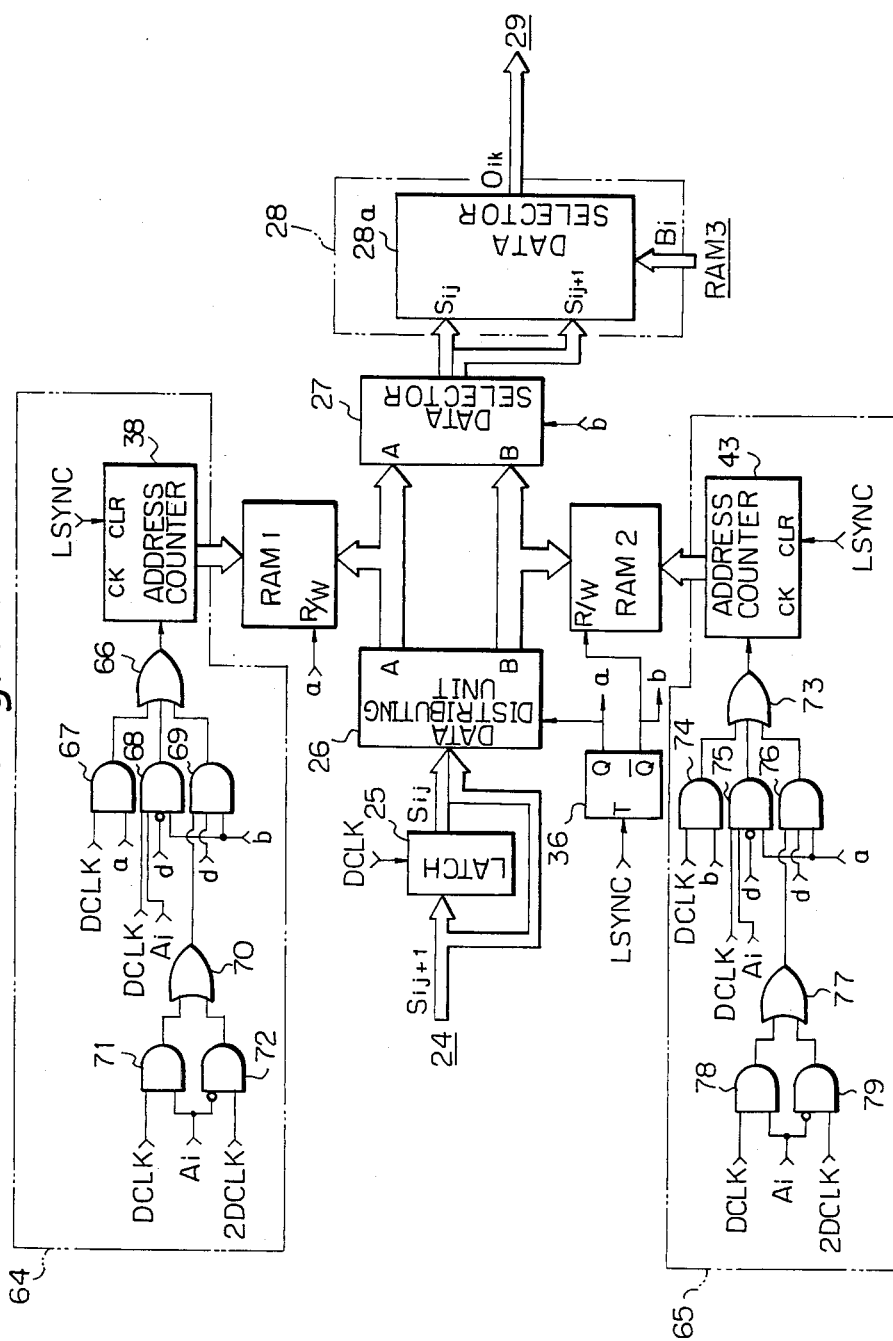
Figures 2, 15A:
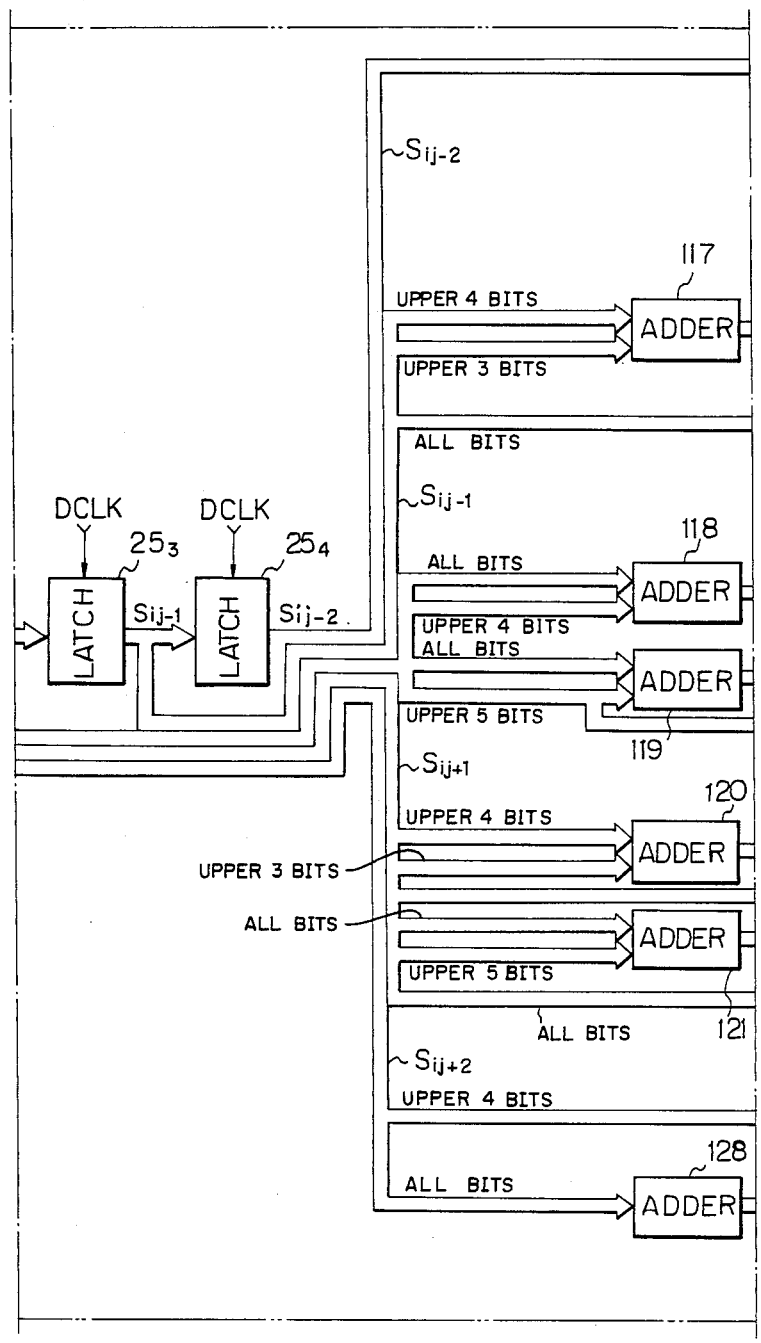
Figures 2, 15B:
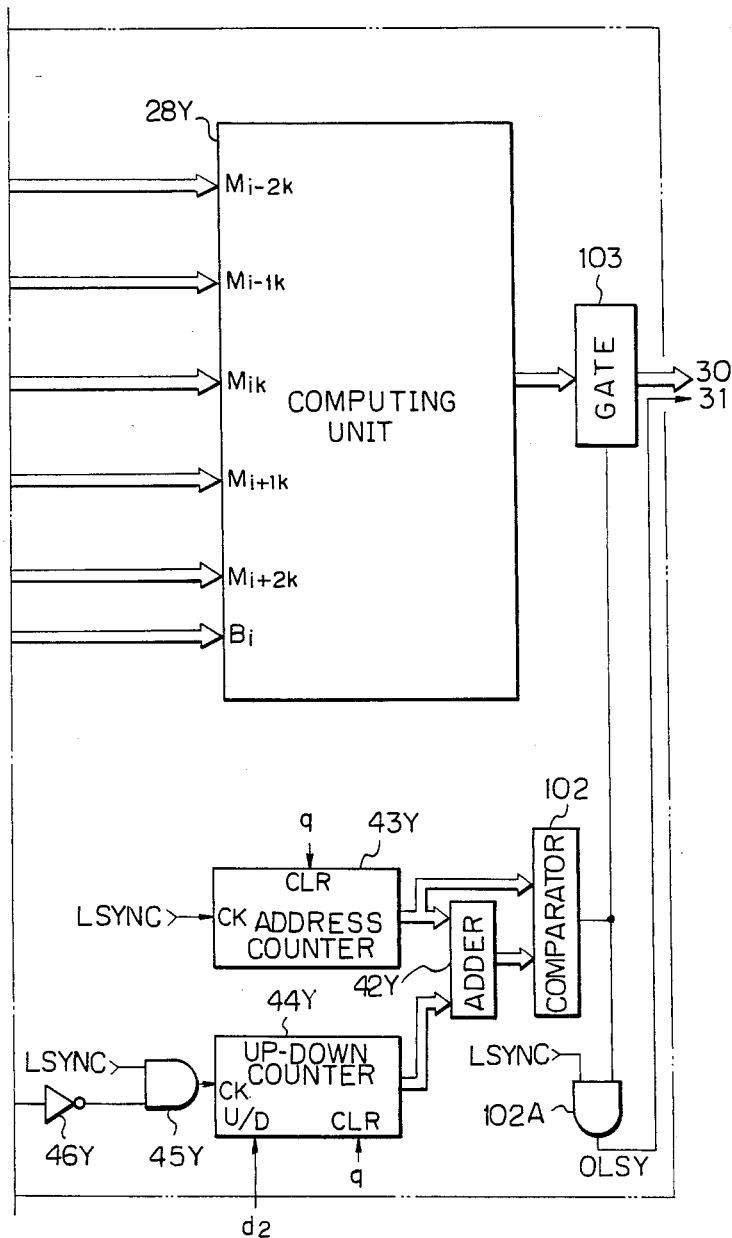
Figure 16:
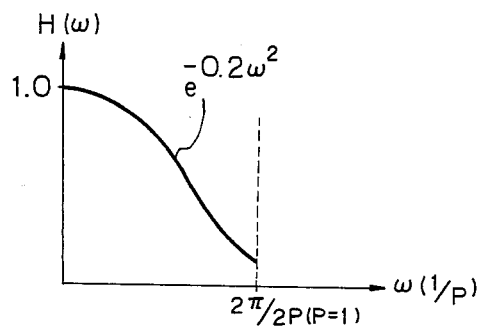
Figure 17:
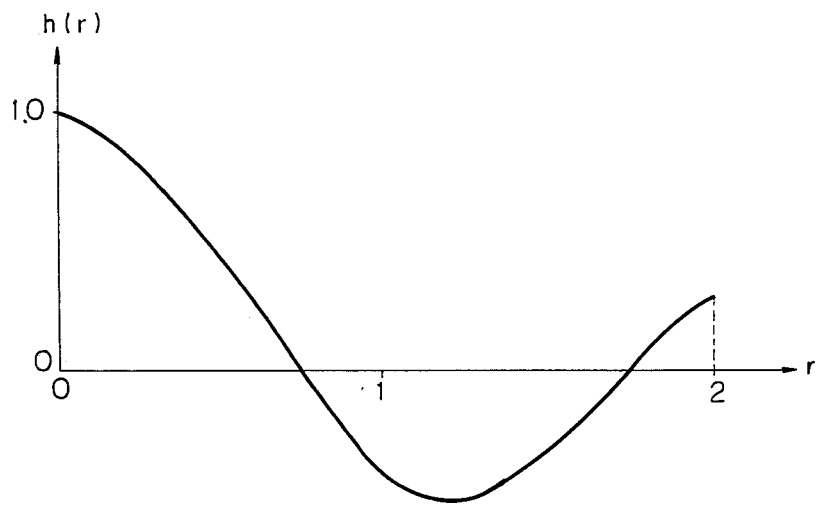

FIGS. (11B and 11B-1–11B-3) and (11C and 11C-1, 11C-2) collectively are flowcharts demonstrating magnification change processing which a microprocessor of FIG. 11A performs;

FIGS. 11D and 11D-1–11D-4 collectively represent a block diagram showing a main scan magnification computing unit which is shown in FIG. 11A;

FIGS. 11E and 11E-1–11E-4 collectively represent a block diagram showing a subscan magnification computing unit as also shown in FIG. 11A;

FIGS. 12A and 12A-1, 12A-2 collectively represent a block diagram showing an essential part of a second embodiment of the present invention;

FIG. 12B is a flowchart demonstrating a part of magnification change processing as performed by a microprocessor of FIG. 12A;

FIG. 12C is a block diagram showing a modification to a computing unit of FIG. 12A;

FIGS. 13A and 13A-1–13A-3 collectively represent a block diagram showing an essential part of a third embodiment of the present invention;

FIG. 13B is a flowchart demonstrating a part of magnification change processing as performed by a microprocessor of FIG. 13A;

FIG. 13C is a block diagram showing a modification to a computing unit of FIG. 13A;

FIG. 14 is a block diagram showing an essential part of a fourth embodiment of the present invention;

FIGS. 15A and 15A-1–15A-3 collectively represent a block diagram showing a fifth embodiment of the present invention;

FIGS. 15B and 15B-1, 15B-2 collectively represent a block diagram showing a subscan magnification computing unit in accordance with the embodiment of FIG. 15A;

FIG. 16 is a graph representative of a frequency response characteristic of a scanner; and FIG. 17 is a graph showing magnification computing interpolation coefficients with MTF compensation added thereto.

DESCRIPTION OF THE PREFERRED EMBODIMENTS

Before entering into a detailed description of the embodiments shown in FIGS. 11A, 12A, 13A, 14 and 15A, their outlines will be described.

Referring to FIG. 11A, there is shown an image reader (except for printer PRT) which is usable with either a digital copier and a facsimile apparatus and accommodated in a housing 1a, FIG. 1. A scanner SCR functions to read an A3 document at a density of 400 dpi (pixels per inch) and 6 bits per pixel (64 tones), applies shading compensation, MTF compensation and others to the resultant data, and delivers the 6-bits original image data after converting them into logical ONEs and ZEROs on a pixel basis. It is to be noted that the reading density and the number of tones mentioned are only illustrative and may be replaced with others. While a light source 5 illuminates a document DOC, an image sensor 7 having 5000 pixels to read an A3 document in the transverse direction receives a reflection from the document DOC. An electrical output of the image sensor 7 is amplified by an amplifier 22 to a predetermined level. The output of the amplifier 22, which is an analog signal whose voltage level changes with density, is converted by an analog-to-digital (AD) converter 22 into a 6-bits digital signal, i.e., image data. Then, a shading compensation circuit 24 executes shading compensation for compensating for an irregular sensitivity distribution of the elements of the 5000-pixels sensor 7 as well as for an irregular luminance distribution of the light source 5 in the transverse direction of an A3 document. The light source 5 and the image sensor 7 are driven by a driver 20 and a sensor driver 21, respectively.

In the embodiment shown in FIG. 11A, magnification change processing is effected after the shading compensation. Specifically, magnification change processing in the main scanning direction X is executed by a main scan magnification computing unit 28, then MFT compensation in the main scanning direction X is performed immediately, then magnification change processing in the subscanning direction Y is executed by a subscan magnification computing unit 29, and then MTF compensation in the subscanning direction Y is effected. Alternatively, any of such magnification change steps may be performed before shading compensation as performed by the circuit 24 or after the MTF compensation. After the magnification change processing and MTF compensation in the main scanning direction X performed by the computing unit 28, the circuit 29 executes magnification change processing and MTF compensation in the subscanning direction Y. Then, a binarizer 30 binarizes the magnification-changed image data with respect to a certain threshold level, the resultant ONEs and ZEROs being fed to the printer PRT (or a transmission processing section). Alternatively, the image data may be converted by a tone processing unit 31 into ONEs, which are representative of the presence of halftone, or ZEROs before delivered to the printer PRT (or the transmission processing section). In FIG. 11A, the image data are shown to be applied to the printer PRT.

In the flow of image data described so far, the magnification change processing and MTF compensation in the main scanning direction X are executed by a main scan magnification change and MTF compensation processing device which, in FIG. 11A, is generally constituted by a parallel 6-bit latch 25, the computing unit 28, a microprocessor 35, a random access memory (RAM) 3, and sampling circuits 64 and 65. Each of this processing device and subscan magnification computing unit 29 has four different functions: determining a new sampling point i after a change of magnification, producing original image data at original image data positions x or y adjacent to the new sampling point i, computing magnification-changed image data based on the distances between the new sampling point i and the original image data positions x or y (Ji) produced as well as on the data produced, and applying MTF compensation to the magnification-changed image data. A specific construction of the computing unit 28 is shown in FIG. 11D. Magnification change processing and MTF compensation in the subscanning direction Y are performed by the subscan magnification change and MTF compensation computing unit 29 a specific construction of which is shown in FIG. 11E.

Figure 7:
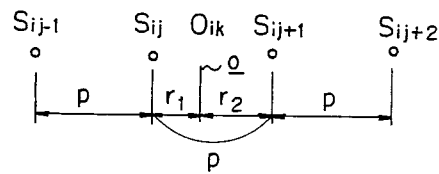
FIG. 7 is a diagram showing a relationship between a sampling position of original image data and that of magnification-changed image data, which is associated with the nearby pixel distance linear distribution scheme previously stated.

In FIG. 11A, the latch 25, a data distributing unit 26, RAM1 and RAM2 which serve as line buffer memories, and a data selector 27 facilitate collective production of a plurality of original image data on the same line which are to be referenced for the computation of magnification-changed image data, when sampling points x are determined to extract image data and, thereby, to compute the magnification-changed image data afterwards. Specifically, by using the compensation method, they collect data on a two pixel basis in the case of interpolation which uses two surrounding pixels (embodiments shown in FIGS. 11A, 12A and 14), on a four pixel basis in the case of interpolation which uses four surrounding pixels (embodiment of FIG. 13A), and on a five pixel basis in the case of interpolation which uses five surrounding pixels (embodiment of FIG. 15A). For example, in FIG. 7 in which the new sampling point O is interposed between Sij and $Sij_{+1}$, the data selector 27 produces Sij and $Sij_{+1}$ (embodiments of FIGS. 11A, 12A and 14), or $Sij_{-1}$, Sij, $Sij_{+1}$ and $Sij_{+2}$ (embodiment of FIG. 13A), or $Sij_{-2}$, $Sij_{-1}$, Sij, $Sij_{+1}$ and $Sij_{+2}$ (embodiment of FIG. 15A), at a time each. It is to be noted that the approaches [A] and [B] previously stated are the interpolation which uses two surrounding pixels (embodiments of FIGS. 11A, 12A and 14), and the approach [C] is the interpolation which uses four surrounding pixels (embodiment of FIG. 13A) and the one which uses five surrounding pixels (embodiment of FIG. 15A).

The method described above may be practiced by entering original image data Y, which are sequentially inputted in synchronism with data clock DCLK as shown in FIG. 9, in the latch 25 in response to the data clock DCLK (delayed by one pulse period of DCLK). For two pixels, one latch 25 (embodiments of FIGS. 11A, 12A and 14) will suffice and, for four pixels, three latches $25_1$ to $25_3$ will suffice (embodiment of FIG. 13A) and, for five pixels, four latches $25_1$ to $25_4$ will suffice (embodiment of FIG. 15A).

As regards the RAM1 and RAM2 serving as line memories, each of them has a capacity great enough to store 5000 pixel groups each consisting of two pixels (embodiments of FIGS. 11A, 12A and 14) or of four pixels (embodiment of FIG. 13A) or of five pixels (embodiment of FIG. 15A). While one (RAM1) is in an input mode, the other (RAM2) is in an output mode; the input-output relation is inverted on completion of one line of operation. This is implemented with a T flip-flop 36 having an output a which is coupled to the data distributing unit 26, and an output b which is coupled to the data selector 27. When the output a is H (logical high level), it causes the data distributing unit 26 to select its output A to thereby bring the RAM1 into a write (W) mode; when the output b is L (logical low level), it causes the data selector 27 to select its output B to bring the RAM2 into a read (R) mode. Concerning the addresses of the line memories RAM1 and RAM2, in an input (write) mode, addresses which are produced by incrementing address counters 38 and 43 at the DCLK period are directly used while, in an output (read) mode, those addresses are changed. The address in an output mode is the image data sampling position x=Ji immediately before the sampling point i of magnification-changed image data.

When the sampling point i of magnification-changed image data is located between Sij and $Sij_{+1}$ at a certain time and the next sampling point is also located between Sij and $Sij_{+1}$, the read address counter is stopped; when the sampling point is shifted to between $Sij_{+2}$ and $Sij_{+3}$, the read address counter is incremented by two; and when the sampling point is shifted to between $Sij_{+1}$ and $Sij_{+2}$, the read address counter is incremented by one as usual. In an enlarge mode (Rx≧100), the position of a new sampling point is determined by an operation for incrementing the counter by one and an operation for holding it stopped. In a reduce mode (Rx<100), on the other hand, such a position is determined by the combination of an operation for incrementing the counter by one and an operation for incrementing it by two. Since the reduction which the apparatus contemplates is up to 50%, incrementing the counter by one or by two suffices. However, when the reduction ratio is greater than 50%, the counter may be incremented by three or more.

Where and how much the read address counter should be incremented are computed in advance by the microprocessor 35 on the basis of magnification, Rx (%). Assuming that the start position is O, the sampling pitch P is 1 (one), and the magnification is Rx, the original image data position x immediately before the sampling point i of magnification-changed image data is represented by an integer Ji of the following equation:

$$100i/Rx = Ji + Ri \quad \text{Eq. (4)}$$

where i is 0, 1, 2, 3, . . . , Ji is an integer, and Ri is a decimal.

That is, where the sampling point i is located between Sij and $Sij_{+1}$ by way of example, Ji is the sampling point x of the original image data. Hence, all that is required is incrementing the read address counter when the integer Ji of 100i/Rx increases by one with the increase of i, incrementing the counter by two when the integer Ji increases by two with the inrease of i, and not incrementing the counter at all when the integer Ji does not increase. The decimal of 100i/Rx is representative of a distance $r_1$ between Sij and the position 0 corresponding to i. This distance data $r_1$ will be used afterwards in the computation of magnification-changed data.

The microprocessor 35 computes from i=0 to Rx−1 of the Eq. (4). Specifically, it computes an integer $J_0$ and a decimal $R_0$ with i=0, an integer $J_1$ and a decimal $R_1$ with i=1, an integer $J_2$ and a decimal $R_2$ with i=2, . . . , an integer $J_{R-1}$ and a decimal $R_{R-1}$ with i=Rx−1. When the integers Ji and the decimals Ri are computed with i=0 to Rx−1 only, they are applicable to the entire length of original image data line. That is, since the sampling points of magnification-changed image data occur at the period of Rx in all cases, what is required is simply allocating the value of i=0 to i=Rx, the value of i=1 to i=Rx+1, the value of i=2 to i=Rx+2, and so on.

In the processing in the subscanning direction, too, Ji and Ri are computed with a magnification Ry so as to set up a sampling line.

In all of the embodiments which will be described, Ji and R of i=0 to Rx−1 and Ry−1 are computed before the start of a reading operation, i.e., when magnification Rx and Ry (%) are specified. Ji and Ri which are associated with Rx and those associated with Ry are individually transformed into data Ai and Bi which match with hardware, and written in, respectively, RAM3 (FIG. 11A) and RAM4 (FIG. 11E). As an image reading operation begins, i.e., during magnification change processing, i is sequentially incremented by 1 in synchronism with the data clock DCLK to read data (Ai, Bi) corresponding to i out of the RAM3, and the address is sequentially increased by 1 in synchronism with the line synchronizing pulse LSYNC to read data (Ai, Bi) corresponding to the "i" line out of the RAM4.

In an alternative embodiment, an exclusive microprocessor or exclusive computing means may be installed to execute the Eq. (4) timed to the data clock DCLK and the Eq. (4) timed to the line synchronizing clock LSYNC, in parallel with the magnification change processing. The resultant integers Ji of 100i/Rx and 100i/Ry, i.e., original image data sampling positions x and line sampling positions y will be directly used as addresses, and the decimals R will be used as distance data $r_1$ which is the parameter for the computation of magnification-changed image data.

Next, a relationship between the data readout from the line buffer memories RAM1 and RAM2 and the computation of magnification-changed image data will be described.

Each of the embodiments in FIGS. 11A, 12A and 14 is constructed to compute (previously discussed approach [A] or [B]) magnification-changed image data based on original image data Sij and $Sij_{+1}$ of two pixels and Ri. 6-bit original image data are alternately written in the line buffer memories RAM1 and RAM2 on a line basis and in synchronism with the data clock DCLK. At this instant, Sij is produced through the latch 25 while $Sij_{+1}$ is produced without the intermediary of the latch 25. The resultant data Sij and $Sij_{+1}$ each having 6 bits are combined to constitute 12-bit data, or one word. These data are alternately written in the RAM1 and RAM2 on a line basis. Since data are read on a word basis (12 bits) out of one of the RAM 1 and RAM2 while the other is in a write mode, Sij (6 bits) and $Sij_{+1}$ (6 bits) are applied at a time to the computing unit 28.

In the embodiment of FIG. 13A in which three latches $25_1$, $25_2$ and $25_3$ are installed, the latch data $Sij_{-1}$, $Sij$ and $Sij_{+1}$ each having 6 bits and data $Sij_{+2}$ which is not routed through the latches and has 6 bits also, are combined to constitute a parallel 24-bit word and written in the RAM1 and RAM2 and read thereoutof on a parallel 24-bit basis. Hence, $Sij_{-1}$ (6 bits), Sij (6 bits), $Sij_{+1}$ (6 bits) and $Sij_{+2}$ (6 bits) are applied simultaneously to the computing unit 28.

In the embodiment of FIG. 15A, magnification changed image data are computed using original image data $Sij_{-2}$, $Sij_{-1}$, $Sij_{+1}$ and $Sij_{+2}$ and Ri of 5 pixels. 5 pixels of original image data each having 6 bits are alternatively applied to the line memories RAM1 and RAM2 directly in synchronism with the data clock DCLK. At this instant, $Sij_{-2}$, $Sij_{-1}$, Sij and $Sij_{+1}$ are produced from the latches $25_4$ to $25_1$ while, at the same time, $Sij_{+2}$ is produced without the intermediary of the latches. These data $Sij_{-2}$, $Sij_{-1}$, Sij, $Sij_{+1}$ and $Sij_{+2}$ each having 6 bits are combined to constitute a word having 30 bits in total. Such data are alternately written in the RAM1 and RAM2 on a line basis. Since the data are read out of one of the RAM1 and RAM2 while the other is in a write mode, $Sij_{-2}$, $Sij_{-1}$, Sij, $Sij_{+1}$ and $Sij_{+2}$ are fed at a time to the computing unit 28.

If desired, the latch 25 or the latches $25_1$ to $25_3$ or $25_1$ to $25_4$ may be inserted between the data selector 27 and the computing unit 28 in order to write only 6-bit data by one line in the RAM1 and RAM2. Although such an alternative arrangement delays the delivery of one line of magnification-changed image data by 1 pixel (in FIG. 11A), by 3 pixels (in FIG. 13A), or by 4 pixels (in FIG. 15), in any case the capacity of each of the RAM1 and RAM2 required is reduced to 6 bits×1 line. This is effective to reduce the capacity of line buffer memories in those applications in which several pixels of delay is not critical.

So long as the RAM1 is in a write mode (a=H and b=L), the address counter 38 is incremented as usual at the period of DCLK. On the other hand, when the RAM1 is in an output mode (a=L and b=H) a read address for reading out image data at the sampling position x (Ji) of original image data is set up by any of the following methods.

The first method is to change the frequency of a count clock which is applied to the address counter. Assuming that the frequency of the data clock DCLK is $f_0$, the frequency $f_R$ for a change of magnification by R % is expressed as:

$$f_R = f_0 \cdot 100/R \text{(Hz)} \qquad \text{Eq. (5).}$$

This method is accurate and sure because the deviation of f? from $f_0$ directly translates into the deviation between original image and the sampling point of magnification-changes image. While the RAM1 or RAM2 is in a read mode, the address counter is driven by $f_R$ to sample (or latch) the output of the RAM1 or RAM2 again in response to the data clock DCLK, thereby producing desired combined data. Such eliminates the need for information associated with the integer Ji in the result of the Eq. (4). Thus, in this approach, assuming that the magnification Rx is 50% to 400%, and that the minimum unit of Rx is 1%, there are required 350 groups of pulses $f_R = f_0 \cdot 100/Rx$. These pulses are produced by an exclusive microprocessor.

The second method is as follows. Paying attention to the integer Ji of the result of the Eq. (4), the method begins with defining, with respect to i=0 to $Rx_{-1}$, a series [Ai] which is expressed using the sampling position $Xi_{-1}$ of the preceding magnification-changed image data and the current sampling position $X_1$, as follows:

| (1) In Reduce Mode | |
|---|---|
| when integer is increased by one ($Ji - Ji_{-1} = 1$): | Ai = H |
| when integer is increased by two ($Ji - Ji_{-1} = 2$): | Ai = L |
| (2) In Enlarge Mode | |
| when integer is increased by one ($Ji - Ji_{-1} = 2$): | Ai = H |
| when the integer is not increased ($Ji - Ji_{-1} = 0$): | Ai = L |

The above series [Ai] is written in the RAM3 (FIG. 1A) (before reading). For the subscanning direction, the same operation is performed up to i=0 to $Ry_{-1}$, and the results arre written in the RAM 4 (FIG. 11E). Such applies to all of the embodiments shown in FIGS. 11A, 12A, 13A, 14 and 15A.

In the embodiment of FIG. 14, the data clock DCLK and pulses 2DCLK which are twice higher in frequency than the data clock DCLK are prepared as count pulses. In the event of computation of magnification-changed image data, the series [Ai] is read out of the RAM3, and i=0 to Rx−1 are repeatedly read out. In the embodiment of FIG. 14, in a reduce mode (Rx<100), the count pulses for the address counter (38 or 43) adapted for the readout of the line memory (RAM1 or RAM2) are switched such that DCLK is selected when Ai is H, and 2DCLK when Ai is L. In an enlarge mode (Rx≧100), AND of Ai and DCLK is used for the count pulses for the address counter 38 or 43 so that the address counter is incremented when Ai is H and not incremented when Ai is L. Such applies to a selected magnification ratio Ry in the subscanning direction as well.

All the embodiments of the present invention include the RAM3 and RAM4 which are adapted to store the previously mentioned series Ai which are derived from the result of the Eq. (4) on Rx and Ry as computed by the microprocessor 35. Also stored in the RAM3 and RAM4 are data Bi the content of which differs from one embodiment to another, as explained later.

An advantage attainable with storing Ai in the RAM3 and RAM4 before reading an image, and reading Ai and Bi during image reading out of the RAM 3 and RAM4 in synchronism with, respectively, the data clock DCLK and the line clock LCLK, and setting up a read address in the main scanning direction X based on Ai is as follows. Such, coupled with the fact that nearby data Sij and $Sij_{+1}$ are read out at the same time (embodiments of FIG. 11A, 12A and 14), or the nearby data $Sij_{-1}$, Sij, $Sij_{+1}$ and $Sij_{+2}$ are read out at the same time (embodiment of FIG. 13A), or the nearby data $Sij_{-2}$, $Sij_{-1}$, Sij, $Sij_{+1}$ and $Sij_{+1}$ are read out at the same time (embodiment of FIG. 15A), the computing units 28 and 29 adapted to compute magnification-changed image data are simplified in construction, as described in detail later. It is to be noted that the data Ai read out of the RAM4 is used to determined a position for extracting line data in the subscanning direction Y.

In the count pulse switching system shown in FIG. 14, in an enlarge mode (Rx>100 and Ry≧100), ENABLE terminals of the counters 38 and 43 may be turned to L when Ai is L so as to disenable them.

The third method is a one which is practiced in the embodiment of FIG. 11A. The address counters 38 and 43 are incremented by the data clock DCLK. Up-down counters 39 and 44 are provided which are independent of the address counters 38 and 43 and supplied with an up-count command in an enlarge mode (Rx≧100) and a down-count command in a reduce mode (Rx<100). AND of DCLK and Ai is supplied to the up-down counters 39 and 44 so that they count only when Ai is L. In this construction, in a reduce mode, for example, the up-down counters 39 and 44 are incremented to "1" by the first L of Ai and, then adders 37 and 42 add 1 to the counts of the address counters 38 and 43, respectively, the sums being used as read addresses of the RAM1 and RAM2, respectively. Thereafter, the up-down counters 39 and 44 are incremented to "2" by the next L of Ai, the resultant counts being added o the counts of the address counters 38 and 43, respectively. Such a procedure is repeated to determine the positions x (Ji) of the sampling points. In an enlarge mode, on the other hand, it is necessary for data to be read out with the read addresses not shifted. In this case, since the address counters 38 and 43 up-count, the up-down counters 39 and 44 are sequentially decremented by one responsive to each L of Ai so as to compensate for the up-counting of the counters 38 and 43.

Sampling positions in the subscanning direction are designated in the same manner as those in the main scanning direction.

Hereinafter will be described the computation of magnification-changed image data in the main scanning direction (X magnification-changed image data). The same computation also applies to the computation of magnification-changed data in the subscanning direction (Y magnification-changed image data). The embodiment of FIG. 11A practices the previously stated approch [A], the embodiment of FIG. 12A the approch [B], and the embodiment of FIG. 13A the approch [C]. How such different approaches are practiced will be described.

[A] Nearest Pixel Setting (Embodiment of FIG. 11A)

Computation involved in this method is comparatively simple. All that is selecting one of $S_{ij}$ and $S_{ij+1}$ which is closer to the magnification-changed data sampling position i (O in FIG. 7). If the decimal Ri computed together with the integer Ji by the microprocessor 35 based on the Eq. (4), i.e., if [distance $r_1$ between O and $S_{ij}$]/P (P denoting the sampling pitch of original image data; in this embodiment, (1) is smaller than 0.5, $S_{ij}$ is selected; if it is greater than 0.5, $S_{ij+1}$ is selected. In the embodiment of FIG. 11A, when computed Ji and Ri as well as the previously mentioned Ai, the microprocessor 35 additionally computes a series Bi which becomes H if $r_1$/P is smaller than 0.5 and L if otherwise, the series Bi being written in the same address of the RAM3 as the series Ai. This processing is effected before an image is read. On start of an image reading operation, Ai and Bi are read out of the RAM3 in synchronism with the data clock DCLK. Fed as a select signal to, in this particular embodiment, to a data selector 80XA (FIG. 11D) of the computing unit 28, Bi designates $S_{ij}$ when it is H and desigantes $S_{ij+1}$ when it is L.

[B] Near Pixel Distance Linear Distribution (FIG. 12A)

This method is more complicated than the method [A] because it has to execute the Eq. (1). In this case, the accuracy of the distance $r_1$/P and $r_2$/P is the problem, i.e., whether it only needs to be considered on a 0.1 basis or should be scaled more minutely, or whether even scaling it on a rough 0.25 basis, or one fourth of P, suffices. This problem directly translates into a problem of the degree of accuracy which is necessary for a digital copier system or for a facsimile system, and corresponds to the quality of images required. From the computation standpoint, it is preferable that each of $r_1$/P and $r_2$/P be a reciprocal of a 2's power, because computations such as $\frac{1}{2}$, $\frac{1}{4}$ and $\frac{1}{8}$ can be implemented only with the bit shift of subject data.

First, $Ri = r_1/P$ is divided on a 0.25 ($\frac{1}{4}$) basis based on the result of the Eq. (4). Specifically, the minimum unit of Ri is determined to be $\frac{1}{8}$, and the division of Ri is determined to be $\frac{1}{4}$. Let the division be as follows by way of example.

when $0 \leq r_1/P < \frac{1}{8}$: $Ri = r_1/P32$ 0, $Bi = 0$ when $\frac{1}{8} \leq r_1/P < \frac{3}{8}$: $Ri = r_1/P = \frac{1}{4}$, $Bi = 1$ when $\frac{3}{8} < r_1/P \leq \frac{5}{8}$: $Ri = r_1/P = \frac{1}{2}$, $Bi = 2$ when $\frac{5}{8} < r_1/P \leq 7/8$: $Ri = r_1/P = \frac{3}{4}$, $Bi = 3$.

Here, under the condition of $\frac{7}{8} < r_1/P < 1$, 0 and $S_{ij-1}$ are the same in position. Although this suggests the possibility of a method which provides Bi=4 based on such a classification, it cannot be practiced unless Bi is provided with three bits. Hence, in the above situation, it is more preferable that x be carried by one, the integer Ji be incremented by one, and the decimal Ri be made zero; locating O between $S_{ij+1}$ and $S_{ij+2}$, and providing Bi=0. This allows a signal having only two bits to suffice Bi and, thereby, simplifies hardware. Again, the approach [B] is practiced by writing such Bi in the same address of the RAM3 as Ai.

In FIG. 12A in which the above system is practiced, the four distance segments (Bi=0 to 4) determine A and B which are included in the following equation:

$$A \cdot S_{ij} + B \cdot S_{ij30\ 1} = O_{ik}$$

where A denotes a coefficient corresponding to $r_1$/P, B denotes a coefficient corresponding to $r_2$/P, $S_{ij}$ and $S_{ij+1}$ are representative of the contents of 6-bit data, and Oik is representative of the content of magnification-changed image data (6 bits). Therefore, the image data $O_{ik}$ is produced by causing the X magnification-change image data computing unit 80XB to compute 4 different values of $A \cdot S_{ij}$ and 4 different values of $B \cdot S_{ij+1}$, then causing data selectors 28b and 28c to select one of the four values each in correspondence to Bi, and them adding the values selected.

In the embodiment of FIG. 12A, coefficients A and B corresponding to Bi are selected as shown below in Table 1.

TABLE 1

|   |   | Bi | A | B |
|---|---|----|---|---|
| a | $0 \leq r_1/P < \frac{1}{8}$ | 0 | 1 | 0 |
| b | $\frac{1}{8} \leq r_1/P < \frac{3}{8}$ | 1 | $\frac{3}{4}$ | $\frac{1}{4}$ |
| c | $\frac{3}{8} \leq r_1/P < \frac{5}{8}$ | 2 | $\frac{1}{2}$ | $\frac{1}{2}$ |
| d | $\frac{5}{8} \leq r_1/P < \frac{7}{8}$ | 3 | $\frac{1}{4}$ | $\frac{3}{4}$ |

Reciprocals of 2's powers are readily attainable by the bit shift of of signal lines and, therefore, with very simple hardware.

Referring to FIG. 12C, a modification to the X magnification-changed data computing unit 80XB of FIG. 12A is shown. The computing unit 80XB of FIG. 12C comprises a read only memory (ROM) 28g. Magnification-changed data Oik which are determined by Sij (6 bits, from the minimum to the maximum value), $Sij_{+1}$ (6 bits, from the minimum to the maximum value), and Bi are calculated beforehand and stored in the ROM 28g. During image read and magnification change processing, the data $O_{ik}$ are read out with the ROM 28g address by Sij and $Sij_{+1}$. Since Sij has 6 bits, $Sij_{+1}$ has 5 bits (the upper 5 bits suffice because the coefficient B is smaller than 1), and Bi has 2 bits, the ROM 28g only needs be a ROM with addresses of 13 bits and 8k×8 bits and, therefore, the computations performed beforehand are not so troublesome. The hardware for the computation of magnification-changed data is extremely simple.

[C] Cubic Function Convolution

This method requires an extremely complicated calculation as represented by the Eq. (3) and, apparently, is unfeasible for hardware. Nevertheless, the accuracy of magnification change attainable with this method is superior to that of the previous methods [A] and [B]. While the accuracy of distance is an important consideration in this method [C] as in the method [B], the following description will also concentrate on the case wherein $r_1/P$ is divided into four segments with the same principle as the method [B].

The Eq. (3) may be rewritten, for simplicity, as follows:

$$A.S_{ij-1}+B.S_{ij}+C.S_{ij+1}+D.S_{ij+2}=O_{ik} \quad \text{Eq. (7)}.$$

Since the denominator of the Eq. (3) is a standardized coefficient, it is omissible from the parameters. Based on the Eq. (2), A, B, C and D are computed with respect to four different cases, i.e., $r_1/P=0$, $\frac{1}{4}$, $\frac{1}{2}$ and $\frac{3}{4}$, as tabulated below.

|   | $\gamma_1/P$ | A | B | C | D |
|---|---|---|---|---|---|
| a | 0 | 0 | 1 | 0 | 0 |
| b | ¼ | −9/64 | 57/64 | 19/64 | −3/64 |
| c | ½ | −⅛ | ⅝ | ⅝ | −⅛ |
| d | ¾ | −3/64 | 19/64 | 57/64 | −9/64 |

One possible approach which may be contemplated is preparing four different values for each of $A.S_{ij-1}$, $B.S_{ij}$, $C.S_{ij+1}$ and $D.S_{ij+2}$ (Sij and others ranging from 0 to 63) based on the above coefficients, as has been the case with the computing unit 80XB for practicing the method [B], selecting one of each four values in correspondence to Bi, and adding them together. This approach, however, renders each computation more troublesome than in the case of [B], while making hardware somewhat complicated.

In the light of the above, the coefficients A, B, C and D are approximated as shown below in Table 2, in order to relieve the load on hardware. In this instance, $A+B+C+D=1$ should necessarily hold.

TABLE 2

|   | $\gamma_1/P$ | Bi | A | B | C | D |
|---|---|---|---|---|---|---|
| a | $0 \leq r_1/P < \frac{1}{4}$ | 0 | 0 | 1 | 0 | 0 |
| b | $\frac{1}{4} \leq r_1/P < \frac{1}{2}$ | 1 | −⅛ | ⅞ | ¼ | 0 |
| c | $\frac{1}{2} \leq r_1/P < \frac{3}{4}$ | 2 | −⅛ | ⅝ | ⅝ | −⅛ |
| d | $\frac{3}{4} \leq r_1/P < \frac{7}{8}$ | 3 | 0 | ¼ | ⅞ | −⅛ |

This reduces the load on hardware considerably because the denominator of each coefficient is not greater than 8. An X magnification-changed image data computing unit 80XC shown in FIG. 13A computes magnification-changed image data in accordance with the approach [c], using the coefficients shown in Table 2.

Again, the computing unit may be implemented with a ROM, as shown in FIG. 12C. In such a case, use is made of a ROM 63, as shown in FIG. 13C. The address of the ROM 63 has 17 bits in total, i.e., 3 bits for $Sij_{-1}$, 6 bits for Sij, 5 bits for $Sij_{+1}$, 3 bits for $Sij_{+2}$, and 2 bits for Bi. Although the memory capacity which is 128K bytes may render the computation of data to be stored in the ROM 63 beforehand somewhat troublesome, such a method will simplify hardware assigned to the computation of magnification-changed image data.

Next, MTF compensation will be described.

A first method available for MTF compensation is to predetermine compensation coefficients beforehand in correspondence to magnifications. Specifically, a set of equations for MTF compensation which use the compensation coefficients (filter coefficients) of FIGS. 5A to 5D are prepared and selectively used based on the magnification R. Immediately after the computation of X magnification-changed image data (output of the data selector 80XA in FIG. 11D, output of the X magnification-changed image data computing unit 80XB of FIGS. 12A and 12C, and output of the X magnification-changed image data computing unit 80XC), only the X direction MTF compensation is effected because Y direction magnification change processing has not been performed yet.

Form the compensation coefficients (filter coefficients) V to Z shown in FIG. 4A and the image data distrubtion shown in FIG. 4B, an MTF-compensated value Mik of image data Oik observed is produced as:

$$Mik=Y.Oi_{-1}k+V.Oik_{-1}+W.Oik_{+1}+Z.Oi_{-1}k+X.Oik \quad \text{Eq. (8)}.$$

Because $$Mik=V.Oi_{-1}k+W.Oik_{+1}+X/2.Oik+Y.Oik_{-1}+Z.Oi_{-1}k+X/2.Oik$$

for MFT compensation in the X direction only, what is required is simply providing an MTF-compensated value of $$Mik=V.Oik_{-1}+W.Oik_{-1}+X/2.Oik \quad \text{Eq. (9)}.$$

Likewise, for MFT compensation in the direction Y only, what is required is providing an MFT-compensated value of $$Mik=Y.Oi_{-1}k+Z.Oi_{-1}k+X/2.Oik \quad \text{Eq. (10)}.$$

In the first embodiment shown in FIG. 11D, an X direction MTF compensation computing unit 110XA is constructed to perform each of four sets of MTF compensation equations prepared by substituting the compensation coefficients of FIGS. 5A to 5D for the Eq. (9), and to extract by means of a data selector 98 the values which are produced by use of those equations which correspond to a specified magnification R. The second embodiment of FfIG. 12A and the third embodiment of FIG. 13A are also construced to perform MTF compensation in the manner described.

Figure 8:
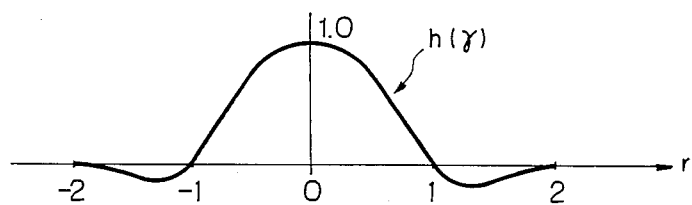
FIG. 8 is a graph showing the values of an interpolating function which is adapted for the cable function convolution scheme.

A second method available is such that MTF compensation is added to the computation for a magnification change. In FIG. 8, h(γ) is representative of an interpolation function which is used in the computation of magnification-changed image data (method [C]) on the assumption that MTF compensation in the input system is 100%. In practice, however, MTF compensation attainable with a scanner is not more than 10% to 40% although dependent upon reading speed and density. MTF compensation available with a scanner SCR which the embodiments to follow contemplate is about 15%, and such a frequency response characteristic H(ω) may be approximated as represented by a curve in FIG. 16. The curve in turn may be approximated as $$H(\omega)=e^{-0.2\omega^2}(H(\pi)=0.14).$$

The interpolation coefficient h(γ) obtained through Fourier transform is shown in FIG. 17. Magnification change processing with MTF compensation is performed by producing Oik from the Eq. (3) and using the h(γ).

Then, $r_1/P$ is divided into four segments, i.e., 0, ¼, ½ and ¾ as has been the case with the approach [C], so as to determine the coefficients A to D of the Eq. (7). In this case, the coefficients A to D are approximated to those which can be implemented with simple hardware and easy computation. Further, when Sij and O coincide in position, terms associated with $Sij_{-1}$ are necessary in addition to those of the Eq. (7) and, consequently, there holds the following equation:

$$E.Sij_{-1}+A.Sij_{-1}+B.Sij+C.Sij_{+1}+D.Sij_{+2}=Oik \quad \text{Eq. (11)}.$$

Since Oik shown above has already undergone X direction magnification-changed image data computation and MFT compensation, it is the X direction MTF-compensated and magnification-changed image data Mik. Coefficients A to E are shown below in Table 3.

TABLE 3

|   | | Bi | A | B | C | D | E |
|---|---|---|---|---|---|---|---|
| a | $0 \leq r_1/P < ¼$ | 0 | −⅜ | 5/4 | −⅜ | ¼ | ¼ |
| b | $¼ \leq r_1/P < 2/4$ | 1 | −1 | 5/2 | −½ | 0 | 0 |
| c | $2/4 \leq r_1/P < ¾$ | 2 | −1 | 3/2 | 3/2 | −1 | 0 |
| d | $¾ \leq r_1/P < 1$ | 3 | 0 | −½ | 5/2 | −1 | 0 |

Table 3 implies that the X direction magnification-change image data computation and X direction MTF compensation computation can be performed at the same time by using coefficients the number of which is greater by one than in the case of the X direction computation which uses Table 2 (embodiment of FIG. 13A). The X direction magnification-changed image data computation with the MTF compensation which is based on the coefficients of Table 3 is performed in the embodiment of FIG. 15A.

While the foregoing description has concentrated on the magnification-changed image data computation and MTF compensation computation for the direction X, those for the direction Y are peformed in the same manner. The difference is that while the former pays attention to the arrangement of original image data in the main scanning direction X, the latter pays attention to the arrangement of original image data in the sub-scanning direction Y.

Hereinafter will be described hardware constructions and operations of various embodiments of the present invention.

FIRST EMBODIMENT (FIGS. 11A-11E)

In the first embodiment shown in FIG. 11A, original image data read by the scanner SCR are fed to the shading compensation circuit 24 on a line-by-line basis and, as regards one line of data, serially on a parallel 6-bit basis (6 bits constituting one word which is representative of density of one pixel). The circuit 24 delivers one line of data to the latch 25 and data distributing unit 26 within one period of the line synchronizing pulses LSYNC and with each word in the line synchronized to the data clock DCLK. When the output of the circuit 25 is the data $Sij_{+1}$ of a certain pixel, the output of the latch 25 is the data Sij occurred one pixel before that pixel. These data Sij and $Sij_{+1}$ are applied to the data distributing unit 26 in parallel 12 bits.

The T flip-flop 36 inverts the signal levels on its outputs Q and Q every time the line synchronizing pulse LSYNC arrives. Hence, assuming data representative of the first line, the data distributing unit 26 distributes the input 12 bits to the RAM1 which is controlled to a write mode. At this instant, the 12-bit data appearing on the input terminal B of the data selector 27 are fed to the main scan or X computing unit 28 while, at the same time, the RAM2 is controlled to a read mode. While data representative of the second line are being fed to the unit 26, the unit 26 delivers the input 12 bits to the RAM2 which is controlled to a write mode. At this instant, the 12-bit data on the input terminal A of the data selector 27 are fed to the X computing unit 28 while, at the same time, the RAM1 is controlled to a read mode.

By the above procedure, data on two neaby pixels on the "n" line are written in the RAM1 in parallel while, at the same time, data on two nearby pixels on the "n−1" line are read out of the RAM2 in parallel. Data on two nearby pixels on he "n+1" line are written in the RAM1 in parallel while, at the same time, data on nearby two pixels on the "n" line are read out of the RAM1 in parallel. In this manner, the RAM1 and RAM2 are switched by the line synchronizing pulses LSYNC to alternately write and read data.

As stated above, while 12 bits of data which are the parallel combination of data on nearby two pixels on the "n" line are being written in the RAM1 or the RAM2, 12 bits of data which are the parallel combination of data on two nearby pixels on the "n−1" line are read out of the RAM2 or the RAM1 and fed to the X computing unit 28. Specifically, original image data are fed to the X computing unit 28 in a form of data on nearby two pixels which are put side by side, and delayed by just one line from the data which are output from the circuit 24. In this manner, data readout from the buffer memories RAM1 and AM2 is delayed by just one line relative to the entry o data thereinto.

The read/write address of the RAM1 is determined by a sampling circuit 64, and that of the RAM2 by a sampling circuit 65. The sampling circuit 64 will be described first. While the RAM1 is controlled to a write mode, the signal a is high level, the signal b is low level, and an AND gate 40 is disabled to prevent count pulses from being fed to the up-down counter 39 which, therefore, produces an output representative of 0. Applied with the data clock DCLK, or count pulses, the address counter 38 is incremented by 1 every time one pulse of DCLK arrives. The adder 37 adds the count data output from the counters 39 and 38 and delivers the sum data to the RAM1 as address data. This allows 12 bits of data, or parallel data on nearby two pixels, to be sequentially written in the RAM1 in synchronism with the data clock DCLK. That is, one line of data are fully written in the RAM1.

While the RAM1 is controlled to a read mode, the signal a is L and the signal b is H. Hence, when the signal c is L, the AND gate 40 is enabled to deliver the data clock DCLK to the up-down counter 39 as counter pulses. The up-down counter 39 up-counts if a signal $d_1$ is H (reduce mode) and down-counts if it is L (enlarge mode). A signal c is representative of the previously stated data Ai and adapted to control the stop/proceed of the count. In a read mode, the sum of the counts of the counters 39 and 38 is used as a read address for the RAM1. It is noteworthy that when the signal $d_1$ is H while the signal c is L, the counter 39 up-counts by 1 every time one pulse DCLK appears so as to increment the read address for the RAM1 by two and when the signal $d_1$ is L while the signal c is L, the counter 39 down-counts by 1 every time one pulse DCLK appears, in turn stopping the read address for the RAM1. The signal c is equal to Ai.

While the sampling circuit 65 is exactly the same in construction as the sampling circuit 64 except that not the signal b but the signal a is applied to an AND gate 45. This is to control the RAM2 to a write mode while the RAM1 is in a read mode (b being H, a being L), and to control the former to a read mode while the latter is in a write mode (b being L, and a H), thereby equalizing the read address to the sum of the counts of the counters 44 and 43.

As regards Ai, the microprocessor 35 responds to a read start command (ST turning from L to H) by reading a specified magnification Rx (%) and, based on this ratio, computes Jr and Ri for each of i=0 to Rx−1. Under a condition of Rx<100 (reduction), the microprocessor 35 turns Ai to L when a relation $Ji - Ji_{-1} \geq 2$ holds and turns it to H when a relationship $Ji - Ji_{-1} \leq 1$ holds; under a condition of Rx≧100 (enlargement), the microprocessor 35 makes Ai H when a relationship $Ji - Ji_{-1} \geq 1$ holds and makes it L when a relationship $ji - ji_{-1} \leq 0$ holds; if Ri≦0.5, the microprocessor 35 turns Bi to H; and if Ri>0.5, the microprocessor turns it to L. These Ai and Bi are written in the addresses i of the RAM3 (FIG. 11A) and RAM4 (FIG. 11E). During this storing step, the microprocessor 35 applies one pulse to an OR gate 49X before writing data $A_o$ and $B_o$ which correspond to i=0, thereby loading an address counter 48X with data which is representative of Rx. After the delivery of $A_o$ and $B_o$ to the RAM3, the microprocessor 35 applies one pulse to an OR gate 51X to increment the address counter 48X by 1, then delivers data $A_1$ and $B_1$ corresponding to i=0 to the RAM3, and then feeds one pulse to the OR gate 51X. Such a procedure is repeated up to i=Rx−1. Consequently, data $A_o$ and $B_o$ corresponding to i=0 are stored in the address 0 of the RAM3, data $A_1$ and $B_1$ corresponding to i=1 in the address 1, ..., data $A_{R-1}$ and $B_{R-1}$ corresponding to i=Rx−1 in the address Rx−1.

It is to be noted that the above description also applies to the processing of Ai and Bi which correspond to Ry of the subscanning direction as well as to writing thereof in the RAM4, on condition that Rx be interpreted as Ry and the data clock as the line clock.

When the scanner SCR has started on an actual image reading operation in response to a command, data representative of the specified magnification Rx is loaded in the address counter 48X in response to a line synchronizing pulse LSYNC. Every time one pulse of the data clock DCLK appears, the counter 48X is incremented by 1 so that data $A_{R-1}$ and $B_{R-1}$ corresponding i=R−1 are sequentially read out from data $A_o$ and $B_o$, which correspond to i=0, with the read address sequentially increased every time one data clock DCLK appears. The data Ai is applied as the signal c to the sampling circuits 64 and 65 while, at the same time, the data Bi is applied to a data selector 80XA (FIG. 11D). The data selector 80XA outputs Sij as magnification-changed image data Oik when Bi is H, and $Sij_{+1}$ when it is L, in synchronism with the data clock DCLK.

As shown in FIG. 11D, the image data Oik changed in magnification in the X direction are fed to an X-direction MTF compensation computing unit 100XA resulting that MTF-compensated magnification-changed data are applied to the subscanning, or Y, magnification change compute unit 29. This unit 29 applies Y magnification change processing and Y MTF compensation to the input data, the output of the unit 29 being fed to the binarizer 30 and the tone processing unit 31. In this particular embodiment, the tone processing unit 31 comprises a ROM which stores 64 kinds of tone representation data distribution patterns corresponding to density, a cyclick line counter which is initialized at a count of 64, and a cyclick data clock counter which is also initialized at a count of 64. The read address of the ROM is determined of Oik, line count data, and data clock count data. Specifically, Oik specifies designates one of the patterns stored in the ROM, the data clock counter designates a main scanning address of the pattern selected, and the line counter designates a subscanning address of the same pattern, whereby 1-bit image data in the pattern is read out. While the microprocessor 35 commands the output of binary data (i=H), the output of the binarizer 30 is fed to the printer PRT via gate circuits 32 to 34. While the microprocessor 35 commands the output of tone data (i=L) the output of the tone processing unit 31 is applied to the printer PRT.

As shown in FIG. 11D, i the X-direction MTF compensation compute unit 100XA, a latch 81 delays magnification-changed image data (Oij) by one period of the data clock DCLK, and a latch 82 further delays it by one period of the data clock DCLK. The latches 82 and 81, therefore, provide, respectively, the magnification-varied image data $Oik_{-1}$ and Oik which are necessary for executing the Eq. (9), $Oik_{+1}$ appearing on the input of the latch 81. These data are routed to an XMTF computing unit 100XA. The XMTF computing unit 100XA includes an adder 83 to which are applied data (2.Oik) produced by shifting all of the six bits of the data Oik up by one bit, and data (½.Oik) produced by extracting only upper five of the six bits of the data Oik. The adder 83 delivers to an adder 94 data which is representative of 5/2.Oik. An adder 84 applies to a complement unit 90 data which is representative of the sum of $Oik_{-1}$ and $Oik_{+1}$. The complement unit 90 in turn delivers to the adder 94 data which is representative of $-(Oik_{-1}+Oik_{+1})$. Consequently, the adder 94 feeds to an input terminal A of the data selector 98 an MTF compensation value which is produced by applying the coefficients of FIG. 5A to the Eq. (9). Adders 85 and 86, a complement unit 91, and an adder 95 deliver to an input terminal B of the data selector 98 an MTF compensation value which is produced by applying the coefficients of FIG. 5B to the Eq. (9B). An adder 87, a complement unit 92, and an adder 96 deliver to an input terminal C of the data selector 98 an MTF compensation value which is produced by applying the coefficients of FIG. 5C to the Eq. (9). Further, adders 88 and 89, a complement unit 93 and an adder 97 deliver to an input terminal D of the data selector 98 an MTF compensation value which is produced by applying the coefficients of FIG. 5D to the Eq. (9).

On the other hand, the microprocessor 35 checks the specified magnification ratios Rx and Ry immediately before an image is read. Under a condition of Rx and Ry<100, the microprocessor 35 delivers to the data selector 98 and a data selector of a YMFT computing unit 100Y (FIG. 11E) selection command data RR1 and RR2 which select the A input as an output. Under a condition of $100 \leq Rx$ and Ry<200, the microprocessor 35 delivers to it selection command data RR1 and RR2 for selecting the B input as an output. Under a condition of $200 \leq Rx$ and Ry<300, the microprocessor 35 delivers to it selection command data RR1 and RR2 for selecting the C input as an output. Further, under a condition of $300 \leq Rx$ and Ry, the microprocessor 35 delivers to it selection command data RR1 and RR2 for selecting the D input as an output. As a result, the X MTF computing unit 28 feeds to the Y magnification-changed computing unit 29 magnification-changed image data Mik which have been computed using the MTF compensation coefficients, which match with the specified magnification Rx.

A reference will be made to FIG. 11E for describing the construction of the Y magnification change computing unit 29.

The magnification-changed image data Mik undergone X direction magnification change computations and MTF computations are fed to a gate 103 of a sampling circuit 65Y timed to the data clock DCLK. After the data Ai and Bi have been written in the RAM3, data Ai and Bi computed on the basis of Ry are written in the RAM4. In the event of image reading, an address counter 48Y counts the line clock LSYNC to determine read addresses of the RAM4. In this case, therefore, Ai and Bi with their i incremented in response to each pulse of the line clock LSYNC (timed to the progress of subscanning) and not to the data clock DCLK are read out of the RAM4.

In the sampling circuit 65Y, an address counter 43Y, an up-down counter 44Y, an AND gate 45Y, and an adder 42Y are generally constructed and arranged in the same manner as in the main scanning sampling circuit 65 (FIG. 11A), except that they count the line clock LSYNC and not the data clock DCLK. Namely, the function assigned to them is to determine sampling positions Y in the subscanning direction. Count data outputted by the address counter 43Y is representative of a subscanning position as counted from the point of start of reading of one page of image. Output data of the adder 42Y is representative of a sampling position y in the subscanning direction. When the output data of the address counter 43Y and that of the adder 42Y coincide with each other, i.e., when the subscanning position for image reading coincides with the sampling position y, a comparator 102 delivers it H output to a latch 129 and an OR gate 130. Also applied to the OR gate 130 is an output of the latch 129. Hence, the OR gate 130 feeds a gate enable (H) signal to data gate 103 and AND gates 108 and 109 when the image scanning line number is Ji(y) and when it is $Ji_{+1}$ (y+1). It is noteworthy here that the OR gate 130 continuously feeds the gate enable (H) signal throughout the period wherein data associated with the line of the sampling position Ji(y) and the next line arrive.

Data Bi read out of the RAM4 is set in a latch 131, and an OR gate 132 delivers the same data Bi throughout a period which corresponds to two consecutive lines. A Y magnification change computing unit 80Y which corresponds to the data selector 80XA of FIG. 11D includes an R-S flip-flop 104 which is set at a positive-going edge of a signal, which becomes H when the image subscanning position reaches the sampling position Ji(y), and reset by a signal t which becomes H in response to a pulse LSYNC which appears immediately thereafter. Specifically, the flip-flop 104 is reset when the subscanning position reaches the sampling position (y) and is reset when the subscanning advances to the next line. Since the OR gate 132 delivers the same data Bi over the two consecutive lines in which the flip-flop 104 is set and, then, reset as mentioned above, an AND gate 105 to which an output Q of the flip-flop 104 is coupled delivers its H output to the data gate 103 and the AND gates 108 and 109 via an OR gate 107 while the flip-flop 104 is set by the signal s and the data Bi is H (commanding selection of the preceding one of the two consecutive lines).

An AND gate 106 to which a Q output of the flip-flop 104 is fed produces a high level output when the flip-flop 104 is reset by the signal t and the data Bi is L (commanding selection of the subsequent one of the two lines), the H output being fed to the data gate 103 and the AND gates 108 and 109. While the data Bi is H, the data gate 103 and the AND gates 108 and 109 are enabled for a period of only one line when the image subscanning reaches the sampling line No. y(ji); while the data Bi is L, they are enabled for a period of only one line when the subscanning advances to the line No. y+1 (Ji+1) next to the sampling line No. y(Ji). In this manner, while the data Bi is H, one line of data on the line No. y as designated by the data Ji which is derived from the Eq. (4) are stored in the memory and, while the data Bi is L, one line of data on the line No. y+1 next to Ji are stored in memory.

By the above procedure, computation of magnification-changed image data in the subscanning direction (in this particular embodiment, selection of one of the sampling line and the next line) is completed.

Next, MTF compensation in the subscanning direction will be described. Based on the Eq. (10), there are produced magnification-changed image data which underwent Y direction MTF compensation, i.e., final data undergone all of the necessary magnification change processings and MTF compensations because, at this stage, magnification-changed image data in the main scanning and subscanning directions have been completed and, in addition, the MTF compensation in the main scanning direction has been completed. Line buffer memories 81Y and 82Y each has stored one line of magnification-changed image data which had been subjected to magnification change processings in the main and subscanning directions as well as to MTF compensation in the main scanning direction. Assuming that the output image data of the buffer memory 82Y are $Mi_{-1}k$, the output image data of the buffer memory 82Y are Mik which are one line behind the data Mik, and the image data arriving at the input terminal of the buffer memory 82Y are $Mi_{+1}k$ which are one line behind the data Mik. These data are fed to an YMTF computing unit 100Y which has the same construction as the XMTF computing unit 100XA of FIG. 11D. The YMTF computing unit 100Y includes a data selector (corresponding to 98) to which the previously mentioned RR2 is applied. The YMTF computing unit 100Y executes four different equations with $Oik_{-1}$ replaced with $Mi_{-1}$, Oik replaced with Mik, and $Oik_{+1}$ replaced with $Mi_{+1}k$ (i.e., equations with the coefficients of FIGS. 5A to 5C applied to the Eq. (10)), producing data which is representative of the solution of one of the equations. It is this output of the computing unit 100Y that serves as complete magnification-varied image data to which magnification change processings and MTF compensation processings in the main and subscanning directions were applied.

Comparing the structural elements of FIG. 11E and those of FIGS. 11A and 11D, the latchs 129 and 131, OR gates 130, 132 and 133, the computing unit 80Y, and the sampling circuit 65Y shown in FIG. 11E constitute subscanning direction magnification change computing means, which is the match of main scanning direction magnification change computing means consising of the sampling circuit 65 of FIG. 11A and the data selector 110XA of FIG. 11D. The buffer memories 81Y and 82Y of FIG. 11E are line buffer memories for delaying data by one pixel in the subscanning direction and corresponding to the latches 81 and 82, which are adapted to delay data by one pixel in the main scanning direction. The YMTF computing unit 100Y of FIG. 11E is identical in construction with the XMTF computing unit 100XA of FIG. 11D and operated to perform the previously stated four sets of computations associated with the Eq. (10) and produce data representative of a solution of one of the equations.

The microprocessor 35 controls magnification change processing as described hereinafter with reference to FIGS. 11B and 11C.

First, referring to FIG. 11B, when a power source is switched on (STEP 1), the microprocessor 35 sets inputs and output ports at a standby level while clearing registers, counters, timers, flags and others which are built therein (STEP 2). Then, the microprocessor 35 reads data Rx representative of a specified magnification Rx (%) in the main scanning direction and stores it in a register Rsx (STEP 3x) to prepare for the computation of sampling position data in the main scanning direction and the entry thereof into the RAM3, and then controls an output port g to L (STEP 4x). This disables and AND gate 50 to prevent count pulses from being fed to the address counter 48. Then, the microprocessor 35 sets at its output port $n_1$ the data representative of the specified magnification Rsx which is stored in the register Rsx (STEP 5x) and delivers it to a preset data input terminal P of the address counter 48X. Thereupon, the microprocessor 35 delivers one pulse to its output port $f_1$ (STEP 6x) to load the address counter 48X with the data Rsx, whereby the address counter 48x is initialized.

Subsequently, the microprocessor 35 sets its port $RW_1$ at a write command level to control the RAM3 to a write mode (STEP 7x), while clearing its address register i to replace the content of the register i with a one which is representative of 0 (STEP 8x). Consequently, the previously mentioned condition of i=0 is set up. Then, the microprocessor 35 clears a register j and loads registers Bi and Ai with H (STEP 9x) and stores the contents Bi and Ai of the registers Bi and Ai in the RAM3 (STEP 10x). In this step, since i is 0, $B_0=H$ and $A_0=H$ are stored in the address R of the RAM3. Next, the register i is incremented by 1 (STEP 11x), whereby the value of i is increased by 1. Since i is equal to or greater than 2 (equal to 2 at this stage), an integer Ji and a decimal Ri which are expressed as $100i/Rsx = Ji + Ri$ are computed (STEP 13x). Then, the content of a present result register ji is transferred to a last result register $ji_{-1}$ (STEP 14ax), and the integer ji is stored in the present result register ji (STEP 14bx).

Thereupon, Bi is set up by STEPs 15x to 17x, and Ai is set up by STEPs 18x to 25x. Then, the microprocessor 35 applies one pulse to its output port $h_1$ (STEP 22x) to increment the write address of the RAM3 to thereby advance the write address. In STEP 10x, the microprocessor 35 writes the previously set Bi and Ai in the RAM 3. This is followed by incrementing i by 1 (STEP 11x), computing Ji and Ri (STEP 13x), setting up Bi and Ai based on the computed Ji and Ri and Rsx (STEPs 15x to 25x), updating the write address of the RMA3 (STEP 22x), and writing the Bi and Ai in the RAM3 (STEP 10x). Then i=Rsx+1 is reached, it means that all of the Bi and Ai correspond to i=0 to Rsx−1 have been stored in the RAM3. Hence, the program advances from STEP 12x to STEP 60 of FIG. 11C.

STEP 60 is similar to STEPs 3x to 25x except that Rsx of STEPs 3x to 25x is interpreted as Rsy, $n_1$ is interpreted as $n_2$, $F_1$ is interpreted as $f_2$, RAM3 is interpreted as RAM4, and $h_1$ is interpreted as $h_2$. Specifically, sampling position data Ai and magnification change computation data Bi are computed and, then, stored in the RAM 4 in correspondence to i. From STEP 60, the operation advances to magnification change processing control which occurs in the event of image reading. It is to be noted that when the program advances from STEP 8x to STEP 9x, $A_0=H$ is written in the address 0 of the RAM3. This does not accurately correspond to $Ji-Ji_{-1}$ because, at this stage, $Ji_{-1}$ is unknown. Nevertheless, when i becomes Rsx−1, the counter 48 will be initialized next (i=Rsx) by a carrier which indicates Rsx count over of the counter 48X. Hence, i=0 and i=Rsx are the same and, therefore, the computation of $A_0$ under the condition of i=0 can be replaced with that under the condition of i=Rsx. $J_{R-1}$ corresponding to i=Rsx−1 is used for $Ji_{-1}$.

At STEP 12x, therefore, the microprocessor 35 continuously sees if the computation of Ai and Bi and entry thereof into the RAM3 are completed up to i=Rsx. Specifically, although the entry of Ai and Bi up to i=0 to Rsx−1 may suffice, Ai and Bi are calculated and stored even under the condition of i=Rsx (synonymous with i=0). When i=Rsx holds, the counter 48X has counted over Rsx to make the write address of the RAM3 zero and, hence, $B_0$ and $A_0$ written in STEP 9x has been replaced with $B_{Rsx}$ and $A_{Rsx}$, respectively. Consequently, $A_0$ stored in STEPs 9x and 10x is updated with accuracy.

In FIG. 11C, as the program advances from STEP 60 to magnification change processing control which is associated with image reading, the microprocessor 35 waits until a read start command signal ST becomes H to command the start of reading (STEP 26). While the signal ST does not arrives, the microprocessor 35 reads magnification command data Rx and Ry entered to see if they are the same as those stored in the registers Rsx and Rsy (STEP 27). If they are not identical, meaning that either one of the specified magnifications Rx and Ry has been changed, the program returns to STEP 3x of FIG. 11B to repeat the calculation of Bi and Ai corresponding to a new magnification Rx and entry of the resultant data into the RAM3, and the calculation of Bi and Ai corresponding to Ry and entry thereof into the RAM4.

On the change of the read start command signal ST to H, the microprocessor 35 determines whether the scanner SCR is ready (STEP 28) and whether the printer PRT is ready (STEP 29). If any one of them is not ready, the microprocessor 35 waits until both of them become ready (STEP 30). If both of the scanner SCR and the printer PRT are ready, two alternative sequence of events occur: when two-level image processing (document; character image processing) is commanded, H is set on the output port i (STEP 31) and the gates 32 to 34 are so conditioned to deliver an output of the binarizer 30 to the printer PRT while, when tone image processing (photograph image processing) is commanded, L is set on the output port i (STEP 32) and the gates 32 and 34 are so conditioned as to deliver an output of the tone processing unit 31 to the printer PRT.

Next, the microprocessor 35 references the content of the specified magnification register Rsx to see which one of reduction and enlargement is selected (STEP 33x). If reduction is selected, the microprocessor 35 sets H on the output port $d_1$ (STEP 34x) and controls the up-down counters 39 and 44 to an up-count mode. If enlargement is selected, the microprocessor 35 sets L on the ouput port $d_1$ (STEP 35X) and control the up-down counters 39 and 44 to a down-count mode. Then, the microprocessor 35 determines a particular one of the ranges of $Rx<100$, $100 \leq Rx<200$, $200 \leq Rx<300$, and $300 \leq Rx$ in which the specified magnification Rx lies (STEPS 51x, 53x, 55x and 57x). In the case of $Rx<100$, the microprocessor 35 chooses a selection command signal RR1, which is to be fed to the data selector 98 of the XMTF computing unit 100XA, that selects the A input as an output (i.e., that commands the output of a result produced with the coefficients of FIG. 5A) (STEP 52x). In the case of $100 \leq Rx<200$, the microprocessor 35 chooses a selection command signal RR1 which selects the B input as an output (i.e., which commands the output of a result produced with the coefficients of FIG. 5B) (STEP 54x). In the case of $200 \leq Rx<300$, the microprocessor 35 chooses a selection command signal RR1 which selects the C input as an output (i.e., which commands the output of a result produced with the coefficients of FIG. 5C) (STEP 56x). Further, in the case of $300 \leq Rx$, the microprocessor 35 chooses a selection command signal RR1 which selects the D input as an output (i.e., which commands the output of a result produced with the coefficients of FIG. 5D) (STEP 57x). Then, the microprocessor 35 controls the RAM3 to a read mode.

As for Ry, the microprocessor 35 uses the same logic as stated above to determine whether an image is to be reduced or enlarged, specifies an up/down mode of the counter 44Y, detects a particular Rsy range, and chooses a signal RR2 based on the Rsy range detected (STEP 70). This STEP 70 is similar to STEPs 33x to 35x, 51x to 57x, and 36x except that Rsx, $d_1$, and RAM3 should be interpreted as Rsy, $d_2$, and RAM4, respectively.

Thereafter, the microprocessor 35 sets H on the output port g (STEP 37) and enables the AND gate 50. This is followed by applying an H-level start signal ATS to the scanner SCR and the printer RPT (STEP 38). In response, the scanner SCR starts reading an image to serially output line synchronizing pulses LSYNC, data clock DCLK, and original image data on a line basis. For example, data on an odd line are written in the RAM1, and data on an even line are written in the RAM2; while the data on the odd line are written in the RAM1, the data on the even line are read out of the RAM2; while the data on the even line are written in the RAM2, the data on the odd line are read out of the RAM1. In short, original image data are written in the line buffer memories RAM1 and RAM2 and read thereoutof, as shown in FIG. 10.

While the image is read as stated above, the address counter 48X is initialized by the line synchronizing pulse LSYNC and a count over signal which the counter 48X itself generates (every time the value of the specified magnification Rsx is counted) and, then, counts up the data clock DCLK. Consequently, the address which the address counter 48X applies to the RAM3 becomes 0 on arrival of one pulse LSYNC and, then, increased by one every time a pulse DCLK appears. After the maximum value $Rsx-1$, the address is initialized again to become 0 due to count-over of the address counter 48X and, then, increased one by one. Such is repeated over one period of the line sync pulses LSYNC. Since the RAM3 is in a read mode, each of Ai, Bi and $i=0$ to $Rx-1$ is sequentially read out from $i=0$ out of the RAM3 in synchronism with the data clock DCLK; when they are read out up to $i=Rx-1$, they are read out from $i=0$ again. Ai is applied as the signal c to inverters 41 and 46, and Bi to a data selector 28a.

Under a condition of $c=Ai=H$ ($Ji-Ji_{-1} \leq 1$ in a reduce mode, and $Ji-Ji_{-1} \geq 1$ in an enlarge mode), the AND gates 40 and 45 are disabled to maintain the counters 39 and 44 stopped so that the magnification-changed image data are sampled at the same sampling pitch as that of the original image data ($P=1$). During this period of time, the magnification is 1, i.e., the magnification-changed image data are identical with the original image data (no thinning or double-writing is performed). In the case of $c=Ai=L$ ($Ji-Ji_{-1} \geq 2$ in a reduce mode, and $Ji-Ji_{-1}<1$ in an enlarge mode), in a reduce mode, the counters 39 and 44 are in an up-count mode and, therefore, up-count as the address-counters 38 and 43 do. In this condition, the read address of the RAM1 and RAM2 is increased by 2 in response to each pulse DCLK, whereby the original image data are sampled on an every second pixel basis. On the other hand, in an enlarge mode, the counters 39 and 44 which are in a downcount mode down-count against the up-counting address counters 38 and 43, resulting that the read address of the RAM1 and RAM2 is not changed despite the arrival of the clock DCLK and, hence, data on the same pixel of the original image data is sampled repeatedly.

By the sampling procedure described above, original image data are sampled at a pitch corresponding to the specified magnification Rx. Under a condition of $Bi=H$ ($Ri \leq 0.5$), the data selector 80XA turns Sij of the sampled original image data into Oik; under a condition of $Bi=L$ ($Ri>0.5$), the data selector 80XA turns $Sij_{+1}$ of the sampled original image data into Oik. In this manner, sampled original image data are MTF-compensated in the main scanning direction by the XMTF computing unit 110XA.

In the Y magnification change computing unit 29 shown in FIG. 11E, data readout from the RAM 3 is effected on the basis of the count of the line clock LSYNC and not on the basis of the count of the data clock DCLK. Data Ai and Bi are read out of the RAM4 and applied to the sampling circuit 65Y. Hence, in the subscanning direction, image data (intermediate data subjected to magnification change processing for the main scanning direction) are sampled in the same fashion as in the main scanning direction. The resultant image data are MTF-compensated in the subscanning direction by a YMTF computing unit 100Y. The YMTF computing unit 100Y includes a data selector (corresponding to 98) to which the data RR2 is applied.

As stated above, the computing unit 29 samples image data and computes magnification-changed image data each based on data Ai and Bi, which are stored in the RAM4 and correspond to Ry, and MTF-compensates them based on data RR2 which also corresponds to Ry. It follows that the computation of magnification-changed image data and MTF compensation in the main scanning direction and those in the subscanning direction are effected in conformity to, respectively, Rx and Ry although they are independent of each other and Rx and Ry are different from each other.

It will be seen that the first embodiment of the present invention as shown in FIG. 11A adopts the previously stated approach [A] for setting up magnification-changed image data.

SECOND EMBODIMENT (FIGS. 12A AND 12B)

FIG. 12A shows an essential part of a second embodiment, mainly those portions which are different from the first embodiment, while FIG. 12B shows only that portion of operation which differs from the control as performed in the first embodiment. In the second embodiment, An X magnification change computing unit comprises an X magnification-varied image data computing unit 80XB, and an X MTF compensation computing unit 110XB having the same construction as the computing unit 110XA of FIG. 11D. A Y magnification change computing unit (not shown), on the other hand comprises a Y magnification change computing unit 35 made up of two line buffer memories (not shown) each being capable of storing one line of image data, and a computing unit (not shown) identical in construction with 80XB; and a Y MTF compensation computing unit (not shown) identical in construction with the combination of the line buffer memories 81Y and 82Y and YMTF computing unit 100Y as shown in FIG. 11E. In short, what distinguishes this embodiment from the first embodiment is only the magnification change computing units and, therefore, the following description will concentrate on such units.

Referring to FIG. 12A, the X magnification-changed image data computing unit 80XB is adapted to compute magnification-changed image data Oik using the approach [B] mentioned earlier. Specifically, data produced by multiplying image data Sij (0 to 63) by the four different coefficients A of Table 1 are applied to input ports a to d of a data selector 28b, the input ports a to d corresponding, respectively, to a to d as shown in the leftmost column of Table 1. More specifically, applied to the input port a are all of the bits of Sij, i.e, Sij, applied to the input port b are the data representative of the sum of the upper five bits and the upper four bits of Sij, applied to the input port c are the upper five bits of Sij, i.e., $\frac{1}{2}$ Sij, and applied to the input port d are the upper four bits of Sij, i.e., $\frac{1}{4}$Sij. Also, data produced by multiplying image data $Sij_{-1}$ by the four different coefficients B of Table 1 are applied to input ports a to d of the data selector 28c, the input ports a to d also corresponding to a to d of Table 1. Applied to the input port a are data representative of 0, applied to the input port b are the upper four bits of $Sij_{+1}$, i.e., $\frac{1}{4}Sij_{+1}$, applied to the input port c are the upper five bits of $Sij_{+1}$, i.e., $\frac{1}{2}Sij_{+i}$, and applied to the input port d are data representative of the sum of the upper five bits and the upper four bits of $S_{ij+1}$, i.e., $\frac{3}{4}Sij_{+1}$.

One of the inputs a to d of each of the data selectors 28b and 28c appears on the output A or B of the latter depending upon the signal Bi. Specifically, when the signal Bi is representative of 0, the input a appears on the outputs A and B; when it is representative of 1, the input b appears on the outputs A and B; when it is representative of 2, the input c appears on the outputs A and B; and when it is representative of 3, the input d appears on the outputs A and B. Those values of Bi are shown in Table 1. An adder 28d produces magnification-changed image data Oik which is representative of the sum of the output A of the data selector 28b and the output B of the data selector 28c. The selection data Bi applied to the data selectors 28b and 28c are written in the RAM 3 before image reading. The Y magnification-changed image data computing unit (not shown) includes two sets of line buffer memories which are connected in series to the input terminal of the computing unit 80XB, so that outputs of those buffer memories are applied in parallel to the computing unit 80XB.

The magnification change control performed by the microprocessor 35 in this embodiment is substantially similar to that of the embodiment of FIGS. 11B and 11C, except that data Bi set up by STEPs 15x to 17x of FIG. 11B relying on the approach [A] are replaced with data Bi (those of Table 1) which are derived from the approach [B], as represented by STEPs 41 to 50x of FIG. 12B. Specifically, in STEPs 41x to 47x, a particular one of ranges $0 \leq Ri < \frac{1}{8}$, $\frac{1}{8} \leq Ri < \frac{3}{8}$, $\frac{3}{8} \leq Ri < \frac{5}{8}$, $\frac{5}{8} \leq Ri < \frac{7}{8}$, and $\frac{7}{8} \leq Ri < 1$ in which a decimal Ri, which is calculated with each value of i, is determined. If $0 \leq Ri < \frac{1}{8}$, data representative of 0 is set in the register Bi (STEP 42x); if $\frac{1}{8} \leq Ri, \frac{3}{8}$, data representative of 1 is set in the register Bi (STEP 44x); if $\frac{3}{8} \leq Ri < \frac{5}{8}$, data representative of 2 is set in the register Bi (STEP 46x); and if $\frac{5}{8} \leq Ri < \frac{7}{8}$, daa representative of 3 is set in the register Bi (STEP 48x). Further, if $\frac{7}{8} \leq Ri < 1$, Ri is raised to a unit of 1 to increment the register j by one (STEP 49x), and 0 is set in the register Bi. The data Bi set up as described is written in the RAM3 together with the data Ai. The other part of the control is the same as that of the first embodiment. While an image is read, the data Bi and Ai produced by the above procedure are read out of the RAM3 to be fed to the data selectors 28b and 28c, respectively. Consequently, magnification-changed image data Oik are produced from the adder 28d as those which are calculated with the Eq. (6).

The sequence of steps described above are applied in the same manner to Ry.

FIG. 12C shows a modification to the X magnification-changed image data computing unit 80XB of FIG. 12A. As shown, the computing unit 80XB includes a ROM 28g in which magnification-changed image data Oik which are computed with the Eq. (6) using 0 to 63 of Sij, 0 to 63 of $Sij_{+1}$, four kinds of coefficients A of Table 1, and four kinds of coefficients B of Table 1 as parameters are stored with those parameters used as addressed. The read address of the ROM 28g is determined by Sij, $Sij_{+1}$ and Bi which are produced from the data selector 27. Magnification-changed image data Oik produced by executing the Eq. (6) with the coefficients A and B (Table 1), Sij and $Sij_{+1}$ are read out of the ROM 28g.

THIRD EMBODIMENT (FIGS. 13A AND 13B)

FIG. 13A shows a major part of a third embodiment of the present invention, particularly those portions which are different from the first embodiment, while FIG. 13B shows only those portions of processing control which are different from the first embodiment. In this particular embodiment, the X magnification change computing unit 28 comprises an X magnification-changed image data computing unit 80XC, and an X MTF compensation computing unit 110XC (not shown) which is identical in construction with the computing unit 110XA of FIG. 11D. A Y magnification change computing unit (not shown), on the other hand, comprises a Y magnification change computing unit made up of two line buffers (not shown) for storing one line of image data each, and a computing unit (not shown) identical in construction with the computing unit 80XB; and a Y MTF compensation unit (not shown) having the same construction as the combination of the line buffer memories 81Y and 82Y and Y MFT computing unit 100Y of FIG. 11E. In short, the only difference between this embodiment and the third embodiment resides in the magnification change computing units and, therefore, the following description will concentrate on them.

In FIG. 13A, the X magnification-changed image data computing unit 80XC functions to compute magnification-changed image data Oik using the approach [C]. Specifically, data which are the product of the four kinds of coefficients A shown in Table 1 and original image data $Sij_{-1}$ are applied to a data selector 52; the products of the four kinds of coefficients B shown in Table 2 and original image data Sij are applied to a data selector 53; the products of the four kinds of coefficients C shown in Table 1 and original image data $SiJ_{+1}$ are applied to a data selector 54; and the products of the four kinds of coefficients D shown in Table 2 and original image data $Sij_{-2}$ are applied to a data selector 55. Each of the data produces data representative of those values which are computed with any of the four kinds of coefficients A to D (each consisting of four coefficients, Table 2), the sum of those values being outputted by an adder 56 as magnification-changed image data Oik.

A complement unit 57 is adapted to transform subtraction data $(-\frac{1}{8})$ into adding data, i.e., to convert subtraction into addition.

The inputs a to do of each of the data selectors 52 to 55 is selected to be the output A, B, C or D by the signal Bi. When the signal Bi is representative of 0, the input a is selected to be any of the outputs A to D, when Bi is representative of 1, the input b is selected; when Bi is representative of 2, the input c is selected; and when Bi is representative of 3, the input d is selected. Those values of the signal Bi is shown in Table 2. The sum of the outputs A to D of the data selectors 52 to 55 is produced as magnification-changed image data Oik from the adder 56. The selection data Bi to be applied to the data selectors 52 to 55 are stored in the RAM3 before image reading.

The processing control performed by the microprocessor 35 in accordance with this embodiment (FIG. 13A) is essentially the same as that of the first embodiment of FIGS. 11B and 11C, except that Bi set up by STEPs 15x to 17x of FIG. 11B using the approach [A] are replaced with Bi (Table 2) which are set up by STEPs 41x to 50x using the approach [C]. Specifically, in STEPS 41x to 47x, in which one of the ranges $0 \leq Ri < \frac{1}{8}$, $\frac{1}{8} \leq Ri < \frac{1}{2}$, $\frac{1}{2} \leq Ri < \frac{3}{4}, \frac{3}{4} \leq Ri < \frac{7}{8}$, and $\frac{7}{8}, Ri \leq 1$ a decimal, which is computed with each value of i, lies is determined. If $0 \leq Ri < \frac{1}{8}$, data representative of 0 is set in the register Bi (STEP 42x); if $\frac{1}{8} \leq Ri < \frac{1}{2}$, data representative of 1 is stored in the register Bi (STEP 44x); if $\frac{1}{2} \leq Ri < \frac{3}{4}$, data representative of 2 is stored in the register Bi (STEP 46a); and if $\frac{3}{4} \leq Ri < \frac{7}{8}$, data representative of 3 is stored in the register Bi (STEP 48x). Further, if $\frac{7}{8} < Ri < 1$, Ri is raised to a unit of 1 to increment the register j by one (STEP 49x), and 0 is set in the register Bi. Bi set by such a procedure are written in the RAM3 together with Ai.

The other part of the processing control is similar to that of he first embodiment. While an image is read, the data Bi are read out of the RAM3 together with the data Ai and applied to the data selectors 52 to 55. The magnification-changed image data Oik which are outputted by the adder 56 are generally identical with those produced with the Eq. (7).

FIG. 13C shows a modificatin to the computing unit 80XC of FIG. 13A. As shown, the computing unit 80XC includes a ROM 63 in which magnification-changed image data Oik computed with the Eq. (7) using 0 to 63 of $Sij_{-1}$, 0 to 63 of Sij, 0 to 63 of $Sij_{+1}$, 0 to 63 of $Sij_{+2}$, four kinds of coefficients A shown in Table 2, four kinds of coefficients B, four kinds of efficients C, and four kinds of efficients D as parameters are stored with those parameters used as addresses. The read address of the ROM 63 is determined by $Sij_{-1}$, Sij, $Sij_{+1}$, $Sij_{+2}$ read out of the data selector 27 as well as the data Bi. Data Oik computed with the Eq. (7) using the coefficients A to D (Table 1) as specified by Bi, and $Sij_{-1}$, Sij, $Sij_{+1}$ and $Sij_{+2}$ are read out of the ROM 63.

FOURTH EMBODIMENT (FIG. 14)

FIG. 14 shows those portions of a fourth embodiment which are different from the first embodiment. This particular embodiment is characterized by the sampling circuits 64 and 65 and, as regards the rest of the structural elements, identical with the first embodiment. Those portions of this embodiment other than the sampling circuits 64 and 65 may be the same as any of the second and third embodiments. While the sampling circuit 64 of FIG. 14 holds the RAM1 in a write mode (a=H and b=L), AND gates 68 and 69 are disabled and an AND gate 67 is abled, so that the address counter 38 is incremented by the data clock DCLK. That is, every time one data clock pulse DCLK arrives, original image data is written in the RAM1. While the sampling circuit 64 holds the RAM1 in a read mode (a=L and b=H), the AND gate 67 is disabled and, in a reduce mode (d=H), the AND gate 68 is disabled also. In this condition, DCLK and 2DCLK are fed to the address counter 38 when the data Ai is H and L, respectively, via an AND gate 71 or 72, an OR gate 70, the AND 69, and an OR gate 66. In an enlarged mode (d=L), the AND gate 69 is disabled so that when the data Ai is H, DCLK is fed to the address counter 38 via the AND gate 68 and OR gate 66 while, when the data Ai is L, no clock is applied to the counter 38.

The other sampling circuit 65 is essentially the same in construction as the sampling circuit 46 except that the signals a and b are replaced with each other, the signal a being fed to AND gates 75 and 76 and the signal b to an AND gate 74. This is because while the RAM1 is in a write mode, the RAM2 is in a read mode and, while the former is in a read mode, the latter is in a write mode.

By the constructions of the sampling circuits 64 and 65 described above, data write and read sampling similar to tgat of the first embodiment (FIG. 11A) is performed with the RAM1 and RAM2. Specifically, while in the first embodiment the every second original image data sampling is effected by the up-down counters 39 and 44 and the adders 37 and 42 by double-counting the data clock DCLK to advance the address at the rate of two addresses per pulse DCLK, in the fourth embodiment 2DCLK is applied to the address counter so that the counter is incremented by two by one pulse DCLK to advance the address by two for each pulse DCLK.

FIFTH EMBODIMENT (FIG. 15A)

FIG. 15A shows a fifth embodiment which constitutes a modification to the embodiment of FIG. 13A and, therefore, only a part thereof which is different from the FIG. 13A embodiment. In this particular embodiment, the computation of main scanning direction magnification-changed image data and its associated MTF compensation calculation are effected simultaneously based on the Eq. (11) and, at the same time, the computation of subscanning direction magnification-changed data and its associated MTF compensation computationare effected. Main scanning direction compute processing will be explained first. In this particular embodiment, each of the RAM1 and RAM2 is designed to accommodate nor more than one line of original image data so as to reduce the capacity require. In this construction, data on nearby pixels cannot be produced in parallel. This is compensated for by providing the computing unit 28 with four latches $25_1$ to $25_4$ which produce image data on nearby five pixels. The pixel data output from the latches $25_1$ to $25_4$ and the coefficients shown in Table 3 are used to output magnification-changed and MTF-compensated image data.

A data selector 111 produces one of four different values which are the products of $E.Sij_{-2}$ of the Eq. (11) and the coefficients E of Table 3; a data selector 112 produces one of four different values which are the products of $A.Sij_{-1}$ of the Eq. (11) and the coefficients A of Table 3; a data selector 113 produces one of four different values which are the products of $B.Sij$ of the Eq. (11) and the coefficients B of Table 3; a data selector 114 produces one of four different values which are the products of $C.Sij_{+1}$ of the Eq. (11) and the coefficients C of Table 3; and a data selector 115 produces one of four different values which are the products of $D.Sij_{+2}$ of the Eq. (11) and the coefficients D of Table 3. Which one the four values is to be produced is dependent on the data Bi which is fed from the RAM4 to each of the data selectors 111 to 115. The outputs of the data selectors 111 to 115 are applied to an adder 116 which then produces one Mik of the results of computations which are performed with the coefficients of Table 3 applied to the Eq. (11), the particular data Mik being designated by the data Bi. As stated earlier in relation to the Eq. (11) and Table 3, the output Mik is the result of magnification change processing in the main scanning direction, plus the computation which provides optimum MTF compensation for each value of the variable R.

In this particular embodiment, the Y magnification change computing unit 29 is similar to the X magnification change computing unit 28 of FIG. 15A except that line buffer memories are substituted for the latches $25_1$ to $25_4$ of the computing unit 28. For example, in the computing unit 29 shown in FIG. 15B, magnification-changed image data Mik undergone magnification change computation and MTF computation in the main scanning direction are fed to a line buffer $81_1$ and a computing unit 28Y in synchronism with the data clock DCLK. The output of the line buffer $81_1$ is applied to the computing unit 28Y and a line buffer $81_2$ the output of which is in turn delivered to the computing unit 28Y and a line buffer $81_3$. The output of the line buffer $81_4$ is applied to the computing unit 28Y and a line buffer $81_4$. In this construction, image data $Mi_{-2k}$, $Mi_{-1k}$, $Mik$, $Mi_{+1k}$ and $Mi_{+2k}$ which, although their associated lines neighbor and are different from each other, assume the same address with respect to the direction of lines are applied to the computing unit 28Y at the same time. Constructed in exactly the same manner as the computing unit 28, the computing unit 28Y executes the Eq. (11) with $Mi_{-2k}$, $Mi_{-1k}$, $Mik$, $Mi_{+1k}$ and $Mi_{+2k}$ substituted for $Sij_{-2}$, $Sij_{-1}$, $Sij$, $Sij_{+1}$ and $SiJ_{+2}$, which are applied to the computing unit 28, the result being routed to a gate 103.

The data Ai and Bi produced with Ry are written in the RAM4 after the Ai and Bi have been written in the RAM3. In the event of image reading, the address counter 48Y counts the line clock LCYNC to provide read addresses of the RAM4. Hence, in this instance, the increment of i of the data Ai and Bi which are read out of the RAM4 occurs in response to the line clock LCYNC (timed to the progress of subscanning) and not to the data clock DCLK. An address counter 43Y, an up-down counter 44Y, an AND gate 45Y, and an adder 42Y are generally analogous to the sampling circuit 65 (FIG. 11A) which is assigned to the main scanning direction, except that they count the line clock LSYNC in place of the data clock DCLK so as to determine a sampling position Y in the subscanning direction. The output of the address counter 43Y is representative of a subscanning position as counted from the start of one page of image reading, and that of the adder 42Y is representative of a sampling position y in the subscanning direction. When the outputs of the counter 43Y and adder 42Y coincide with each other, i.e., when the subscanning direction coincides with the sampling position y, the output of a comparator 102 turns from L to H. This enables a gate 103 to deliver the output of the computing unit 28Y to the following binarizer 30 and tone processing unit 31. That is, when the image scanning line No. is Ji(y), the output of the computing unit 28Y is delivered as processed data.

The remaining construction of the fifth embodiment is the same as the third embodiment. The processing procedure is also the same as the third embodiment except that STEPs 51x to 57x of FIG. 11C are omitted. An advantage attainable with the fifth embodiment is that since the computations for magnification processing and MTF compensation are collectively implemented with the same equation, hardware for the computations is simplified and the number of computing steps is cut down, compared to a case wherein the two different kinds of computations are executed with different equations.

It will be seen from the above that the present invention achieves various unprecedented advantages as enumerated below.

(1) Any of the foregoing embodiments produces magnification-changed image data in synchronism with reading of an original image, i.e., on a real-time basis because nereby ones of original image data are sampled at a predetermined pitch and in synchronism with data clock based on a specified magnification ratio R, whose minimum unit is 1%, so as to compute and output varied-magnification image data Oij timed to the data clock DCLK.

(2) Magnification-varied image data are synchronous to the data clock, i.e., such image data are produced by real-time processing because all of reading means, sampling means and magnification-changed image data setting means are operable in synchronism with a data clock DCLK associated with original image data. This allows any subsequent instrument which receives the magnification-changed image data to process the data by raster scanning. Therefore, the present invention may be applied to a digital copier, a facsimile apparatus, and others which record, transfer and/or transmit image data in parallel with image reading, to make the most of the electrical magnification changes. Further, minute variable magnification on the order of 1% is attainable over a wide range.

(3) When original image data are to be transferred timed to data clock DCLK, i.e., in the event of image reading, original image data sampling position information and position information previously written in magnification change processing information storing means are read out in synchronism with the data clock DCLK. Hence, a period of time necessary for computing such information is saved to allow the period of data clock DCLK to be shortened correspondingly. Consequently, image reading rate and/or transfer rate as well as magnification-changed data transfer rate corresponding thereto can be increased to enhance high-speed image processing.

(4) Data Bi representative of a decimal Ri in terms of a division whose denominator is a 2's power is computed and, based on this data Bi, bits of original image data are extracted. Hence, data extracted so automatically serve as numerical values for magnification-changed image data computation which are the products of original image data and a decimal corresponding to Ri. All that is required for magnification-varied image data computation is, therefore, adding the numerical values which are indicated by the data bits produced by the above procedure. This eliminates the need for division and multiplication and, thereby, reduces the number of computing bits while speeding up the computation. The result is a simple hardware construction and high-speed computation.

(5) Since MTC compensation computations are effected in matching relation to specified magnifications Rx and Ry, images are free from deterioration otherwise caused by a change of magnification. Moreover, a magnification-changed image data computation in the main scanning direction and an MTF compensation computation in that direction are executed in a pair while a magnification-changed image data computation in the subscanning direction and an MTF compensation calculation in that direction are also executed in a pair. Hence, even if the magnification Rx in the main scanning direction and the magnification Ry in the subscanning direction are different from each other, optimum MTF compensation is achievable in both of the main and subscanning directions to suppress degradation of the whole image due to a magnification change.

(6) Since both of magnification-changed image data computation and MTF compensation computation are implemented with a single equation at the same time, the number of computing steps necessary for image data processing is remarkably reduced to thereby cut down the number of means required.

Various modifications will become possible for those skilled in the art after recovering the teachings of the present disclosure without departing from the scope thereof.

What is claimed is:

1. A processing device for changing magnification of image data, comprising:

computing means for computing an integer $J_i$ and a decimal $R_i$ of an equatin $100i/[\text{specified magnification } R(\%)] = J_i + R_i$, where i is an integer, $0 \leq R_i < 1$, and $J_i$ is an integer;

sampling position designating means for changing i by 1 at a time in synchronism with a data clock which determines a pixel unit of original image data, under a condition of $R < 100$, incrementing a designated position x for sampling original image data by 2 when an equation $J_i - J_{i-1} = 2$ is reached and incrementing said position x by 1 when an equation $J_i - J_{i-1} = 1$ is reached, and, under a condition of $R \geq 100$, incrementing said position x by 1 when an equation $J_i - J_{i-1} = 1$ is reached and maintaining an existing value of said position x when an equation $J_i - J_{i-1} = 0$ is reached;

sampling means for counting the data clock to sample original image data located at the position x and at least one original image data which neighbors said original image data; and magnification-changed image data setting means for determining magnification-changed image data at a position i based on a correlationship between $R_i$, the original image data at the position x, and the at least one original image data which neighbors said original image data, in synchronism with the data clock.

2. A processing device as claimed in claim 1, wherein the magnification-changed image data setting means determines original image data at the position x to be the magnification-change image data when a relation $R_i \leq 0.5$ holds, and determines original image data at a position x+1 to be the magnification-changed image data when a relation $R_i > 0.5$ holds.

3. A processing device as claimed in claim 1, wherein the magnification-changed image data setting means adds a weight of $R_i$ to original image data at the position x and a weight of $1 - R_i$ to original image data at a position x+1, each of the resultant sums being determined to be the magnification-changed image data.

4. A processing device as claimed in claim 1, wherein the magnification-changed image data setting means produces magnification-changed image data by a cubic function convolutional equation whose parameters are $R_i$, original image data at the position x, and two original data which occur, respectively, before and after said original image data.

5. A processing device for changing magnification of image data, comprising:

storing means for storing one line of original image data;

means for controlling said storing means to a write mode and a read mode alternately;

address counting means for applying a write/read position x to said storing means;

computing means for computing an integer $J_i$ and a decimal $R_i$ of an equation $100i/[\text{specified magnification } R(\%)] = J_i + R_i$, where i is an integer, $0 \leq R_i < 1$, and $J_i$ is an integer;

sampling position designating means for, while the storing means is in a write mode, applying a data clock DCLK which determines a pixel unit of original image data to the address counting means as count pulses and, while said storing means is in a read mode, changing i by 1 at a time in synchronism with said data clock DCLK, under a condition of $R>100$, feeding count pulses 2DCLK having a twice higher frequency than said data clock DCLK to said address counting means as count pulses when an equation $Ji-Ji_{-1}=2$ is reached and feeding the data clock DCLK to said address counting means when an equation $Ji-Ji_{-1}=1$ is reached, and, under a condition of $R \geqq 100$, feeding said data clock DCLK to said address counting means when said equation $Ji-Ji_{-1}=1$ is reached and interrupting count pulses to said address counting means when an equation $Ji-Ji_{-1}=0$ is reached, thereby designating the read position x of original image data; and magnification-changed image data setting means for determining magnification-changed image data at a position i based on a correlationship between Ri, original image data at a designated position x which is read out of the storing means, and at least one original image data which neighbors said original image data, in synchronism with the data clock DCLK.

6. A processing device as claimed in claim 5, wherein the magnification-changed image data setting means determines original image data at the designated position x to be the magnification-changed image data when a relation $Ri \leqq 0.5$ holds, and determines origional image data at a position $x+1$ to be the magnification-changed image data when a relation $Ri>0.5$ holds.

7. A processing device as claimed in claim 5, wherein the magnification-changed image data setting means adds a weight of Ri to original image data at the position x and a weight of $1-Ri$ to original image data at the position $x+1$, each of the resultant sums being determined to be the magnification-changed image data.

8. A processing device as claimed in claim 5, wherein the magnification-changed image data setting means produces magnification-change image data by using a cubic function convolutional equation parameters of which are Ri, original image data at the position x, and two original image data which occur, respectively, before and after said original image data.

9. A processing device for changing magnification of image data comprising:
storing means for storing one line of original image data;
means for controlling said storing means to a write mode and a read mode alternately;
address counting means;
up-down counting means;
adding means for applying a sum of count data produced by said address counting means and count data produced by said up-down counting means to the storing means as address data;
computing means for computing an integer Ji and a decimal Ri of an equation $100i/[\text{specified magnification }(\%)]=Ji+Ri$, where i is an integer, $0 \leqq Ri<1$, and Ji is an integer;
sampling position designating means for, while the storing means is in a write mode, feeding a data clock DCLK which determines a pixel unit of original image data to the address counting means as count pulses and, while said storing means in a read mode, changing i by 1 at a time in synchronism with said data clock DCLK, under a condition of $R<100$, delivering an up-count command to the up-down counting means and delivering said data clock DCLK to said address counting means as count pulses, and, under a condition of $R \geqq 100$, delivering a down-count command to said up-down counting means and delivering said data clock DCLK to said address counting means, not applying said data clock DCLK to said up-down counting means when an equation $Ji-Ji_{-1}=1$ is reached, and applying the data DCLK to said up-down counting means as well when an equation $Ji-Ji_{-1}=0$ is reached, thereby designating the read position x of original image data; and magnification-changed image data setting means for determining magnification-changed image data at a position i based on a correlationship between Ri, original image data at a designated position x read out of the storing means, and at least one original image data which neighbors said original image data, in synchronism with the data clock DCLK.

10. A processing device as claimed in claim 9, wherein the magnification-changed image data setting means determines original image data at the designated position x to be the magnification-changed image data when a relation $Ri \leqq 0.5$ holds, and determines original image data at a positin $x+1$ to be the magnification-changed image data when a relation $Ri>0.5$ holds.

11. A processing device as claimed in claim 9, wherein the magnification-changed image data setting means adds a weight of Ri to original image data at the position x and a weight of $1-Ri$ to original image data at a position $x+1$, each of the resultant sums being determined to be the magnification-changed image data.

12. A processing device as claimed in claim 9, wherein the magnification-changed image data setting means produces magnification-changed image data by using a cubic function convolutional equation whose parameters are Ri, original image data at the position x, and two original image data which occur, respectively, before and after said original image data.

13. A processing device for changing magnification of image data, comprising:
computing means for computing, based on a specified magnification R(%), original image data sampling position information each corresponding to a respective one of magnification-changed image data sampling positions i, and deviation information representative of a deviation between said original image data sampling position and said magnification-changed image data sampling position;
magnification change processing information storing means for storing the original image data sampling position information and deviation information in correspondence with the data sampling positions i;
reading means for changing i by 1 at a time in synchronism with a data clock associated with original image data and reading the original image data sampling position information and deviation information out of said magnification change processing information storing means in correspondence with i;
sampling means for counting the data clock DCLK to sample original image data, which is specified by the original image data sampling information read out, and at least one original image data which neighbors said original image data; and magnification-changed image data setting means for determining magnification-changed image data at the position i based on a correlationship between the original image data sampled and the deviation information read out, in synchronism with the data clock DCLK.

14. A process device as claimed in claim 13, wherein the computing means computes an integer Ji and a decimal Ri of an equation 100i/[specified magnification $R(\%)$]=Ji+Ri, where i is an integer of 0 to R−1, $0 \leq Ri < 1$, and Ji is an integer, to hold a value $Ji_{<1}$ of an instant when i is smaller by 1, to compute an original image data sampling position information data Ai which is representative of an amount of change in the sampling position of original image data that corresponds to a value of R and that of $Ji - Ji_{-1}$, and to compute as deviation information data Bi which is representative of a particular one of a plurality of subdivisions between 0 and 1.

15. A processing device as claimed in claim 14, wherein the sampling means comprises:
   buffer memory means for storing one line of original image data;
   means for controlling said buffer memory means to a write mode and a read mode alternately;
   address counting means for applying a write/read address to said buffer memory means; and
   sampling means for, while the buffer memory means is in a write mode, delivering the data clock DCLK to said address counting means as count pulses and, while said buffer memory means is in a read mode, changing i by 1 at a time in synchronism with said data clock DCLK, under a condition of R<100, delivering to said address counting means on one of said data clock DCLK and count pulses 2DCLK which have a twice higher frequency than said data clock DCLK, in correspondence to the data Ai, and, under a condition of $R \geq 100$, setting up or interrupting the delivery of said data clock DCLK to said address counting means in response to the data Ai, thereby designating the read position x of original image data.

16. A processing device as claimed in claim 14 wherein the sampling means comprises:
   buffer memory means for storing one line of original image data;
   means for controlling said buffer memory means to a wire mode and a read mode alternately;
   address counting means;
   up-down counting means;
   adding means for applying a sum of count data produced by said address counting means and count data produced by said up-down counting means to the buffer memory means as address data; and
   sampling position designating means for, while the buffer memory means is in a write mode, delivering the data clock DCLK to the address counting means as count pulses and, while said buffer memory means is in a read mode, changing i by 1 at a time in synchronism with said data clock DCLK, under a condition of R<100, delivering an up-count command to the up-down counting means, delivering said data clock DCLK to the address counting means as count pulses, and setting up or interrupting the delivery of said data clock DCLK to said up-down counting means in response to the data Ai, and, under a condition of $R \geq 100$, delivering a down-count command to said up-down counting means, delivering said data clock DCLK to said address counting means, and setting up or interrupting the delivery of said data clock DCLK to said up-down counting means in response to the data Ai, thereby designating the read position x of original image data.

17. A processing device as claimed in claim 14, wherein the magnification-changed image data setting means determines original image data at the designated position x to be the magnification-changed image data when the data Bi is representative of a relation $Ri \leq 0.5$, and determines original image data at a position x+1 to be the magnification-changed image data when the data Bi is representative of a relation $Ri > 0.5$.

18. A processing device as claimed in claim 14, wherein the magnification-changed image data setting means adds to original image at the position x a weight of Ri which is represented by the data Bi, and adds to the original image data at a position x +1 a weight of 1=Ri which is represented by the data Bi, the sums each being determined to be the magnification-changed image data.

19. A processing device as claim in claim 14, wherein the magnification-changed image data setting means produces magnification-changed image data by using a cubic function convolutional equation whose parameters are Ri represented by the data Bi, original image data at the position x, and two original image data which occur, respectively, before and after said original image data.

20. A processing device for changing magnification of image data, comprising:
   computing means for computing an integer Ji and a decimal Ri of an equation 100i/[specified mangification $R(\%)$]=Ji+Ri, where i is an integer, $0 \leq Ri < 1$, and Ji is an integer, and computing data Bi which is representative of said decimal in terms of a division a denominator of which is a 2's power;
   sampling position designating means for changing i by 1 at a time in synchronism with a data clock which determines a pixel unit of original image data, under a condition of R<100, incrementing a designated position x for sampling original image data by 2 when an equation $Ji - Ji_{-1} = 2$ is reached and incrementing said position x by 1 when an equation $Ji - Ji_{-1} = 1$ is reached, and, under a condition of $R \geq 100$, incrementing said position x by 1 when said equation $Ji - Ji_{-1} = 1$ is reached, and holding an existing value of said position x when an equation $Ji - Ji_{-1} = 0$ is reached;
   sampling means for counting the data clock to sample original image data at the position x and at lest one original image data which neighbors said original image data; and
   magnification-changed image data setting means for extracting those bits of the original image data at the position x and neighboring data which correspond to the data Bi, and determining magnification-changed image data at a position i based on said bits extracted.

21. A processing device as claimed in claim 20, wherein the magnification-changed image data setting means computes magnification-changed image data based on nearby pixel distance linear distribution.

22. A processing device as claimed in claim 20, wherein the magnification-changed image data setting means computes magnification-changed image data based on convolutional interpolation.

23. A processing device for changing magnification of image data, comprising:
  storing means for storing one line of original image data;
  means for controlling said storing means to a write mode and a read mode alternately;
  address counting means for applying a write/read position x to the storing means;
  computing means for computing an integer Ji and a decimal Ri of an equation $100i/[\text{specified magnification } R(\%)] = Ji + Ri$, where i is an integer, $0 \leq Ri < 1$, and Ji is an interger, and computing data Bi which is representative of said decimal Ri in terms of a division a denominator of which is a 2's power;
  a sampling position designating means for, while the storing means is in a write mode, delivering data clock DCLK which determines a pixel unit of original image data to the address counting means as count pulses and, while said storing means is in a read mode, changing i by 1 at a time in synchronism with the data clock DCLK, under a condition of $R < 100$, delivering count pulses 2DCLK having a twice higher frequency than said data cloak DCLK to said address counting means as count pulses when an equation $Ji - Ji_{-1} = 2$ is reached and delivering said data clock DCLK to said address counting means when an equation $Ji - Ji_{-1} = 1$ is reached, and, under a condition of $R \geq 100$, delivering said data clock DCLK to said address counting means when said equation $Ji - Ji_{-1} = 1$ is reached and interrupting the delivery of the count pulses to said address counting means when an equation $Ji - Ji_{-1} = 0$ is reached, thereby designating the read position x of original image data.

24. A processing device as claimed in claim 23, wherein the magnification-changed image data setting means computes magnification-changed image data based on near pixel distance linear distribution.

25. A processing device as claimed in claim 23, wherein the magnification-changed image data setting means computes magnification-changed image data based on convolutional interpolation.

26. A processing device for changing magnification of image data, comprising:
  storing means for storing one line of original image data;
  means for controlling said storing means to a write mode and a read mode alternately;
  address counting means;
  up-down counting means;
  adding means for applying a sum of count data produced by said address counting means and count data produced by said up-down counting means to the storing means as address data;
  computing means for computing an integer Ji and a decimal Ri of an equation $100i/[\text{specified magnification } R(\%)] = Ji + Ri$, where i is an integer, $0 \leq Ri < 1$, and Ji is an integer, and computing data Bi which is represeentative of said decimal in terms of a division a denominator of which is a 2's power.
  sampling position designating means for, while the storing means is in a write mode, delivering a data clock DCLK which determines a pixel unit of original image data to the address counting means as count pulses and, while said storing means is in a read mode, incrementing i by 1 at a time i synchronism with said data clock DCLK, under a condition or $R < 100$, delivering an up-count command to said up-down counting means and delivering said data clock DCLK to said address counting means as count pulses, delivering said data clock DCLK to said up-down counting means as well when an equation $Ji - Ji_{-1} = 2$ is reached, and not delivering count pulses to said up-down counting means when an equation $Ji - Ji_{-1} = 1$ is reached, and, under a condition of $R \geq 100$, delivering a down-count command to said up-down counting means and delivering said data clock DCLK to said address counting means, not delivering said data clock DCLK to said up-down counting means when said equation $Ji - Ji_{-1} = 1$ is reached, and delivering said data clock DCLK to said up-down counting means as well when an equation $Ji - Ji_{-1} = 0$ is reached, thereby designating the read position x or original image data; and
  magnification-changed image data setting means for extracting those bits of the original image data at the position x and at least one original image data which neighbors said original image data that correspond to the data Bi, and determining magnification-changed image data at a position i based on said bits extracted.

27. A processing device as claimed in claim 26, wherein the magnification-changed image data setting means computes the data based on near pixel distance linear distribution.

28. A processing device as claimed in claim 26, wherein the magnification-changed image data setting means computes the data based on convolutional interpolation.

29. A processing device for changing magnification of image data, comprising:
  computing means for computing original image data sampling position information for producing magnification-changed image data which correspond to a sepcified magnification R;
  sampling position designating means for designating an original image data sampling position x based on said original image data sampling position information;
  sampling means for sampling original image data at said position x designated;
  magnification-changed image data setting means for determining magnification-changed image data which corresponds to said original image data sampled; and
  MTF (Modulation Transfer Function)-compensating means provided with MTF compensation computation data which cover a predetermined range of magnifications R, for applying MTF compensation to image data before or after a change of magnification on the basis of said computation data.

30. A processing device as claimed in claim 29, wherein the MTF-compensating means comprises:
  compensation computing means using compensation computation data each corresponding to a respective one of magnification subranges which is provided by dividing the predetermined range, said compensation computing means corresponding in number to said subranges, and selecting means for selecting one of said compensation computing means in response to the specified magnification R to produce an output of said one compensation computing means as MFT-compensated data.

31. A processing device as claimed in claim 30, wherein the computing means computes an integer Ji and a decimal Ri of an equation $100i/$[specified magnification $R(\%)] = Ji + Ri$, where i is an integer, $0 \leq Ri < 1$, and Ji is an integer;

said sampling position designating means changing i by 1 at a time in synchronism with a data clock which determines a pixel unit of original image data, under a condition of $R < 100$, incrementing the position x by 2 when an equation $Ji - Ji_{-1} = 2$ is reached, and incrementing said position x by 1 when an equation $Ji - Ji_{-1} = 1$ is reached, and, under a condition of $R \geq 100$, incrementing said position x by 1 when said equation $Ji - Ji_{-1} = 1$ is reached, and holding an existing value of said position when an equation $Ji - Ji_{-1} = 0$ is reached;

said sampling means counting the data clock to sample original image data at the position x and at least one original image data which neighbors said original image data;

said magnification-changed data setting means determining magnification-changed image data at a position i based on a correlationship between Ri, original image data at the position x, and at least one original image data which neighbors said original image data, in synchronism with the data clock.

32. A processing device as claimed in claim 31, wherein the magnification-changed image data setting means determines original image data at the position x to be the magnification-changed image data when a relation $Ri \leq 0.5$ holds, and determines original image data at a position $x + 1$ to be the magnification-changed image data when a relation $Ri > 0.5$ holds.

33. A processing device as claimed in claim 31, wherein the magnification-changed image data setting means adds a weight of Ri to original image data at the position x and a weight of $1 - Ri$ to original image data at the position $x + 1$, the sums each being determined to be the magnification-changed image data.

34. A processing device as claimed in claim 31, wherein the magnification-changed image data setting means produces magnification-changed data based on a cubic function convolutional equation whose parameters are Ri, original image data at the position x, and two original image data which occur, respectively, before and after said original image data.

35. A processing device as claimed in claim 31, wherein the sampling means comprises:
buffer memory means for storing one line of original image data;
means for controlling said buffer memory means to a write mode and a read mode alternately;
address counting means for applying a write/read position to the buffer memory means; and
sampling position designating means for, while the buffer memory means is in a write mode, delivering the data clock DCLK to said address counting means as count pulses and, while said buffer memory means is in a read mode, changing i by 1 at a time in synchronism with the data clock DCLK, under a condition of $R < 100$, delivering one of said data clock DCLK and count pulses 2DCLK having a twice higher frequency than said data clock DCLK to said address counting means as count pulses in response to the data Ai, and, under a condition of $R \geq 100$, setting up or interrupting the delivery of said data clock DCLK to said address counting means in response to the data Ai, thereby designating the read position x of original image data.

36. A processing device as claimed in claim 31, wherein the sampling means comprises:
buffer memory means for storing one line of original image data;
means for controlling said buffer memory means to a write mode and a read mode alternately;
address counting means;
up-down counting means;
adding means for applying a sum of count data produced from said address counting means and count data produced from said up-down counting means to the buffer memory means as address data; and
sampling position designating means for, while the buffer memory means is in a write mode, delivering the data clock DCLK to the address counting means as count pulses and, while said buffer memory is in a read mode, changing i by 1 at a time in synchronism with said data clock DCLK, under a condition of $R < 100$, delivering an up-count command to the up-down counting means, delivering said data clock DCLK to said address counting means as count pulses, and setting up or interrupting the delivery of said data clock DCLK to said up-down counting means in response to the data Ai, and under a condition of $R \geq 100$, delivering a down-count command to said up-down counting means, delivering said data clock DCLK to said address counting means, and setting up or interrupting the delivery of said data clock DCLK to said up-down counting means in response to said Ai, thereby designating the read position x of original image data.

37. A processing device for changing magnification of image data, comprising:
first computing means for computing original image data sampling position information for producing magnification-changed image data which correspond to a specified magnification Rx in a main scanning direction;
second computing means for computing original image data sampling position information for producing magnification-changed image data which correspond to a specified magnification Ry in a subscanning direction;
first sampling position designating means for designating a sampling position x of original image data on the basis of said original image data sampling position information which is computed by said first computing means;
second sampling position designating means for designating a sampling position y or original image dat on the basis of the original image data sampling position information which is computed by the second computing means;
first sampling means for sampling original image data at the position x;
second sampling means for sampling original image data at the position y;
first magnification-changed image data setting means for determining magnification-changed image data which corresponds to the original image data sampled by said first sampling means;
second magnification-changed image data setting means for determining magnification-changed image data which corresponds to the original image data sampled by the second sampling means;

main scanning direction MTF-compensating means provided with main scanning direction MTF compensation computation data which cover a predetermined range of magnifications Rx, for applying MTF compensation to image data before or after a change of magnification in the main scanning direction on the basis of said computation data; and subscanning direction MTF-compensating means provided with subscanning direction MTF compensation computation data which cover a predetermined range of magnifications Ry, for applying MTF compensation to image data before or after a change of magnification in the subscanning direction on the basis of said computation data.

38. A processing device as claimed in claim 37, wherein each of the main scanning and subscanning direction MTF-compensating means comprises compensation computing means which use compensation computation data each corresponding to a respective one of subranges which are defined by dividing the range of magnifications, said compensation computing means corresponding in number to said subranges, and selecting means for selecting one of said compensation computing means in response to the specified magnification Rx or Ry to produce an output of said one compensation computing means as MTF-compensated data.

39. A processing device as claimed in claim 37, wherein each of the first and second computing means computes an integer Ji and a decimal Ri of an equation 100i/[specified magnification R (%)]=Ji+Ri, where i is an integer, $0<Ri<1$, and Ji is an integer;

each of the first and second sampling position designating means changing i by 1 at a time in synchronism with a data clock which determines a pixel unit of original image data or a line clock, under a condition or $R<100$, incrementing the position x or y by 2 when an equation $Ji-Ji_{-1}=2$ is reached, and incrementing said position x or y by 1 when an equation $Ji-Ji_{-1}=1$ is reached, and, under a condition of $R\geq 100$, incrementing said osition x or y by 1 when said equation $Ji-Ji_{-1}=1$ holds, and holding an existing value of said position x or y when an equation $Ji-Ji_{-1}=0$ holds;

each of said first and second sampling means counting the data clock or the line clock to sample original image data at the position x or y and at least one image data which neighbors said original image data;

each of said first and second magnification-changed image data setting means determining magnification-changed image data at a position i based on a correlationship between Ri, original image data at the position x or y, and at least one original image data which neighbors said original image data, in synchronism with the data clock and line clock.

40. A processing device as claimed in claim 39, wherein each of said first and second magnification-changed image data setting means determines original image data at the position x or y to be the magnification-changed image data when a relation $Ri\leq 0.5$ holds, and determines original image data at a position x+1 or y+1 to be the magnification-changed image data when a relation $Ri>0.5$ holds.

41. A processing device as claimed in claim 39, wherein each of the first and second magnification-changed image data setting means adds a weight of Ri to original image data at the position x or y and a weight of 1−Ri to original image data at a position x+1 or y+1, the resultant sum being produced as mganification-changed image data.

42. A processing device as claimed in claim 39, wherein each of the first and second magnification-changed image data setting means produces magnification-changed image data by using a cubic function convolutional equation whose parameters are Ri, original image data at the position x or y, and two original image data which occur, respectively, before and after said original image data.

43. A processing device as claimed in claim 39, wherein the first sampling means comprises:

buffer memory means for storing one line of original image data;

means for controlling said buffer memory means to a write mode and a read mode alternately;

address counting means for applying a write/read position to the buffer memory means; and sampling position designating means for, while the buffer memory means is in a write mode, delivering the data clock DCLK to said address counting means as count pulses and, while said buffer memory means is in a read mode, changing i by 1 at a time in synchronism with said data clock DCLK, under a condition of $R<100$, delivering one of said data clock DCLK and count pulses 2DCLK having a twice higher frequency than said data clock DCLK to said address counting means as count pulses in response to the data Ai and, under a condition of $R\geq 100$, setting up or interrupting the delivery of said data clock DCLK to said address counting means in response to said data Ai, thereby designating the read position x of original image data.

44. A processing device as claimed in claim 39, wherein the first sampling means comprises:

buffer memory means for storing one line of original image data;

means for controlling said buffer memory means to a write mode and a read mode alternately;

address counting means;

up-down counting means;

adding means for applying a sum of count data produced from said address counting means and count data produced from said up-down counting means to the buffer memory means as address data; and sampling position designating means for, while the buffer memory means is in a write mode, delivering the data clock DCLK to the address counting means as count pulses and, while said buffer memory means is in a read mode, changing i by 1 at a time in synchronism with said data clock DCLK, under a condition of $R<100$, delivering an up-count command to the up-down counting means, delivering said data clock DCLK to said address counting means as count pulses, and setting up or interrupting the delivery of said data clock DCLK to said up-down counting means in response to the data Ai, and, under a condition of $R\geq 100$, delivering a down-count command to said up-down counting means, delivering said data clock DCLK to said address counting means, and setting up or interrupting the delivery of said data clock DCLK to said up-down counting means in response to said data Ai, thereby designating the read position x of original image data.

45. A processing device for changing magnification of image data, comprising:
- computing means for computing original image data sampling position information Ji for producing magnification-changed image data which correspond to a specified magnification, and devication information Ri representative of a deviation between a sampling position and a magnification-changed image data allocated position;
- sampling position designating means for designating a sampling position or original image data based on said original image data sampling position information;
- sampling means for sampling original image data at said sampling position designated; and
- magnification-changed image data setting means for producing magnification-changed image data to which a magnification change and MTF compensation were applied simultaneously, by applying original image data sampled by said sampling means to an MTF compensation magnification change equation which is a combination of interpolation computation corresponding to the deviation information Ri and MTF compensation computation.

46. A processing device as claimed in claim 45, wherein the computing means computes an integer Ji and a decimal Ri of an equation $100/[\text{specified magnification } R(\%)] = Ji + Ri$, where i is an integer, $0 \leq Ri < 1$, and Ji is an integer;
- the sampling position designating means changing i by 1 at a time in synchronism with a data clock which determines a pixel unit of original image data or a line clock, under a condition of $R < 100$, incrementing the sampling position of original image data by 2 when an equation $Ji - Ji_{-1} = 2$ is reached, and incrementing the designated position by one when an equation $Ji - Ji_{-1} = i$ is reached, and, under a condition of $R \geq 100$, incrementing the designated position by 1 when said equation $Ji - Ji_{-1} = 1$ is reached, and holding an existing value of the designated position when an equation $Ji - Ji_{-1} = 0$ is reached;
- the sampling means sampling original image data at the designated position and at least one original image data which neighbors said original image data, by counting the data clock or the line clock;
- the magnification-changed data setting means determining magnification-changed image data at a position i based on a correlationship between Ri, original image data at the designated position, and at least one original image data which neighbors said original image data, in synchronism with the data clock or the line clock.

47. A processing device as claimed in claim 45, wherein the magnification-changed image data setting means produces magnification-changed image data by using a cubic function convolutional equation whose parameters are Ri, original image data at the designated position, and four original image data two of which occur before said original image data and the other two, after said original image data.

48. A processing device as claimed in claim 45, wherein the sampling means comprises:
- buffer memory means for storing one line of original image data;
- means for controlling said buffer memory to a write mode and a read mode alternately;
- address counting means for applying a write/read address to said buffer memory means; and
- readout controlling means for, while the buffer memory means is in a write mode, delivering the data clock DCLK to said address counting means as count pulses and, while said buffer memory means is in a read mode, changing i by 1 at a time in synchronism with said data clock DCLK, under a condition of $R < 100$, delivering one of said data clock DCLK and count pulses 2DCLK having a twice higher frequency than said data clock DCLK to said address counting means as count pulses in response to the data Ai, and, under a condition of $R \geq 100$, setting up or interrupting the delivery of said data clock DCLK to said address counting means in response to said data Ai, thereby designating the read position of original image data.

49. A processing device as claimed in claim 45, wherein the sampling means comprises:
- buffer memory means for storing one line of original image data;
- means for controlling said buffer memory means to a write mode and a read mode alternately;
- address counting means;
- up-down counting means;
- adding means for applying a sum of count data produced by said address counting means and count data produced by said up-down counting means to the buffer memory means as address data; and
- readout controlling means for, while the buffer memory means is in a write mode, delivering the data clock DCLK to the address counting means as count pulses and, while said buffer memory means is in a read mode, changing i by 1 at a time in synchronism with said data clock DCLK, under a condition of $R < 100$, delivering an up-count command to the up-down counting means, delivering said data clock DCLK to said address counting means as count pulses, and setting up or interrupting the delivery of said data clock DCLK to said up-down counting means in response to the data Ai, and, under a condition of $R \geq 100$, delivering a down-count command to said up-down counting means, delivering said data clock DCLK to said address counting means, and setting up or interrupting the delivery of said data clock DCLK to said up-down counting means in response to said data Ai, thereby designating the read position or original image data.

* * * * *